Oct. 9, 1934. F. S. SMITH 1,975,805
ART AND APPARATUS FOR STERILIZING
Original Filed Aug. 2, 1932 12 Sheets-Sheet 3

INVENTOR
Franklin S. Smith
BY HIS ATTORNEYS
Janney Blair & Curtis

Oct. 9, 1934.  F. S. SMITH  1,975,805
ART AND APPARATUS FOR STERILIZING
Original Filed Aug. 2, 1932   12 Sheets-Sheet 4
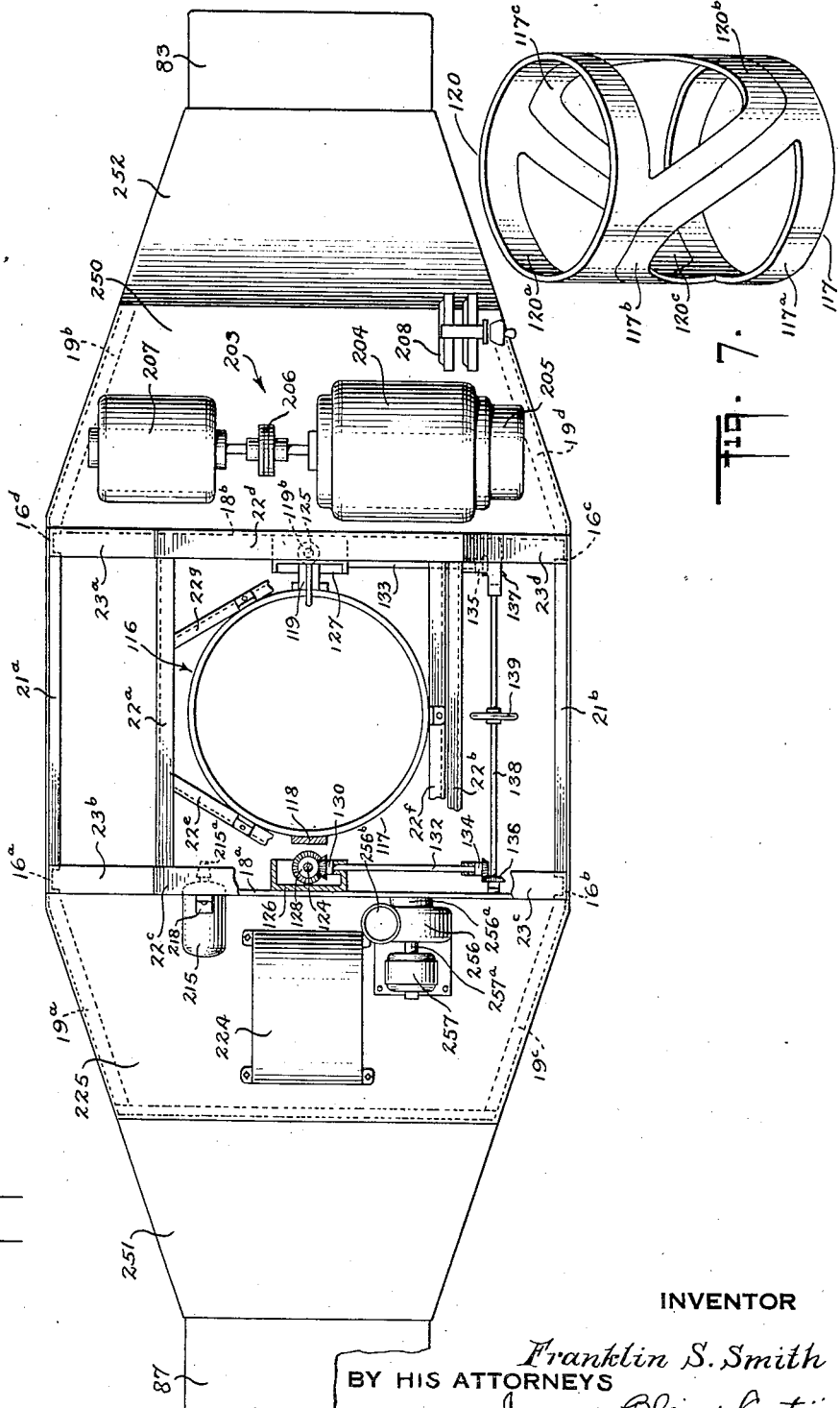

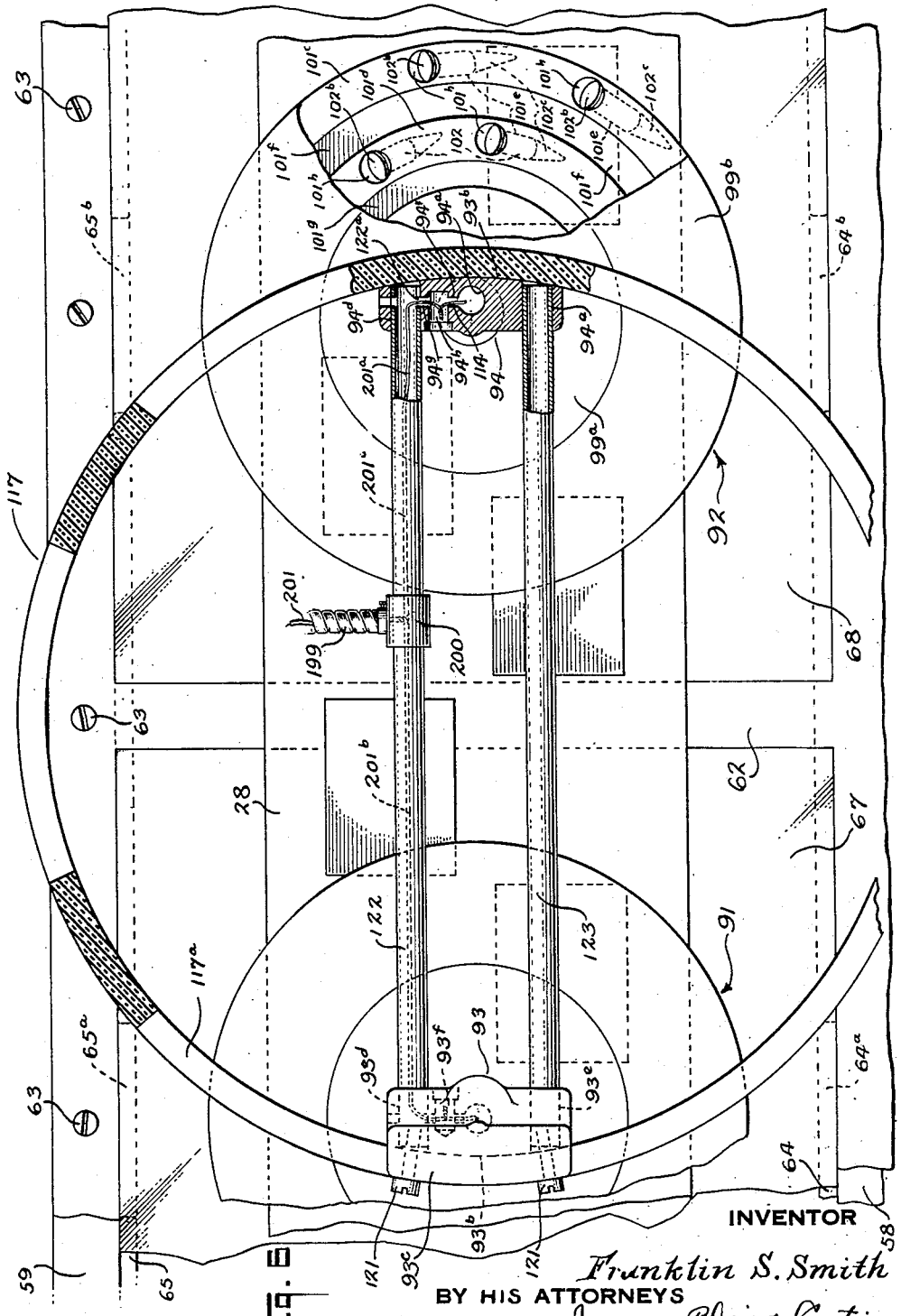

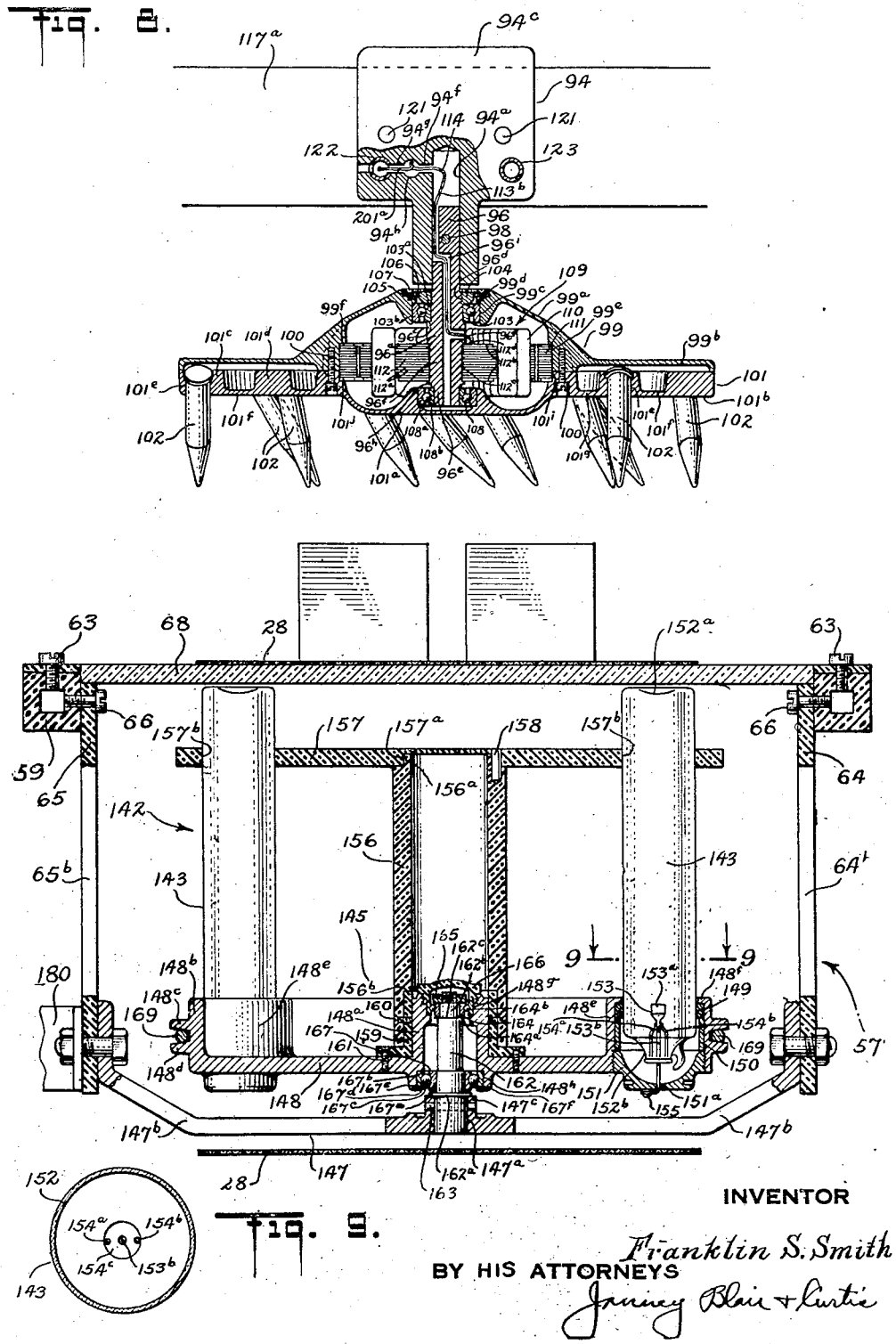

Oct. 9, 1934.  F. S. SMITH  1,975,805
ART AND APPARATUS FOR STERILIZING
Original Filed Aug. 2, 1932  12 Sheets-Sheet 7
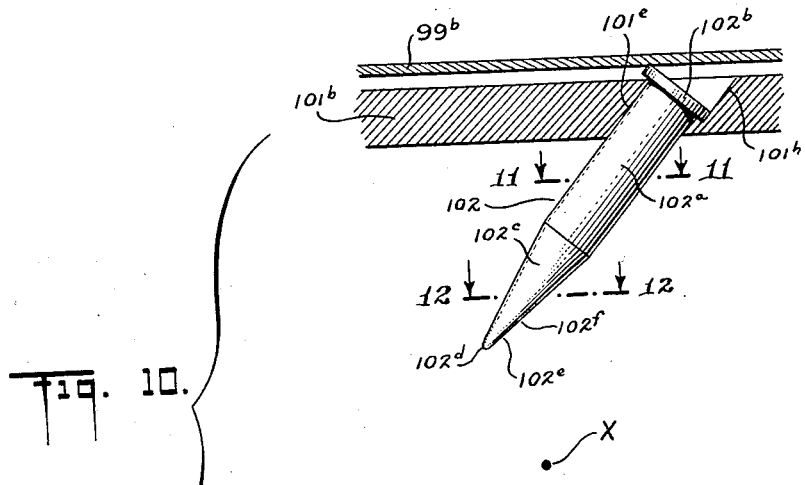
Fig. 10.
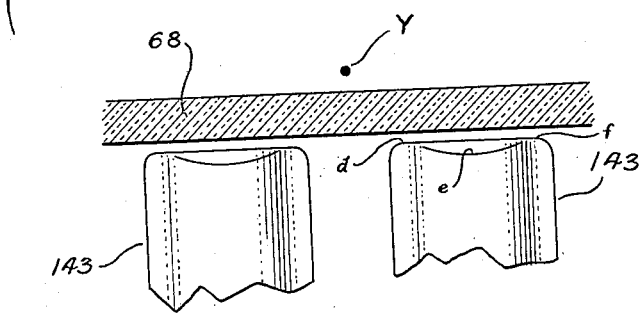
Fig. 11.  Fig. 12.
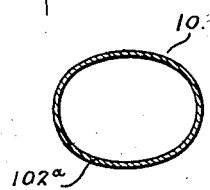 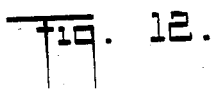
INVENTOR
Franklin S. Smith
BY
Janney Blair + Curtis
ATTORNEYS

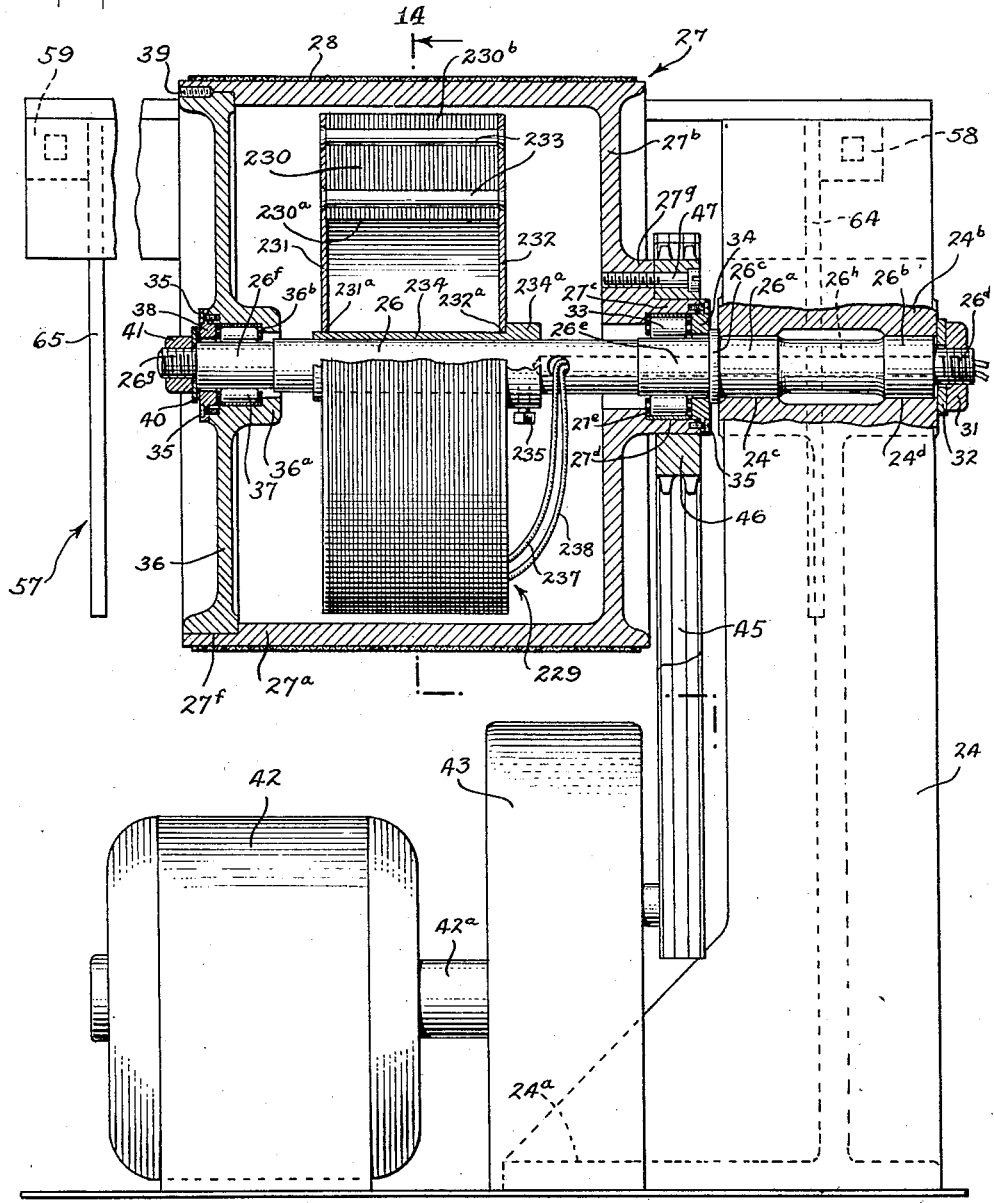

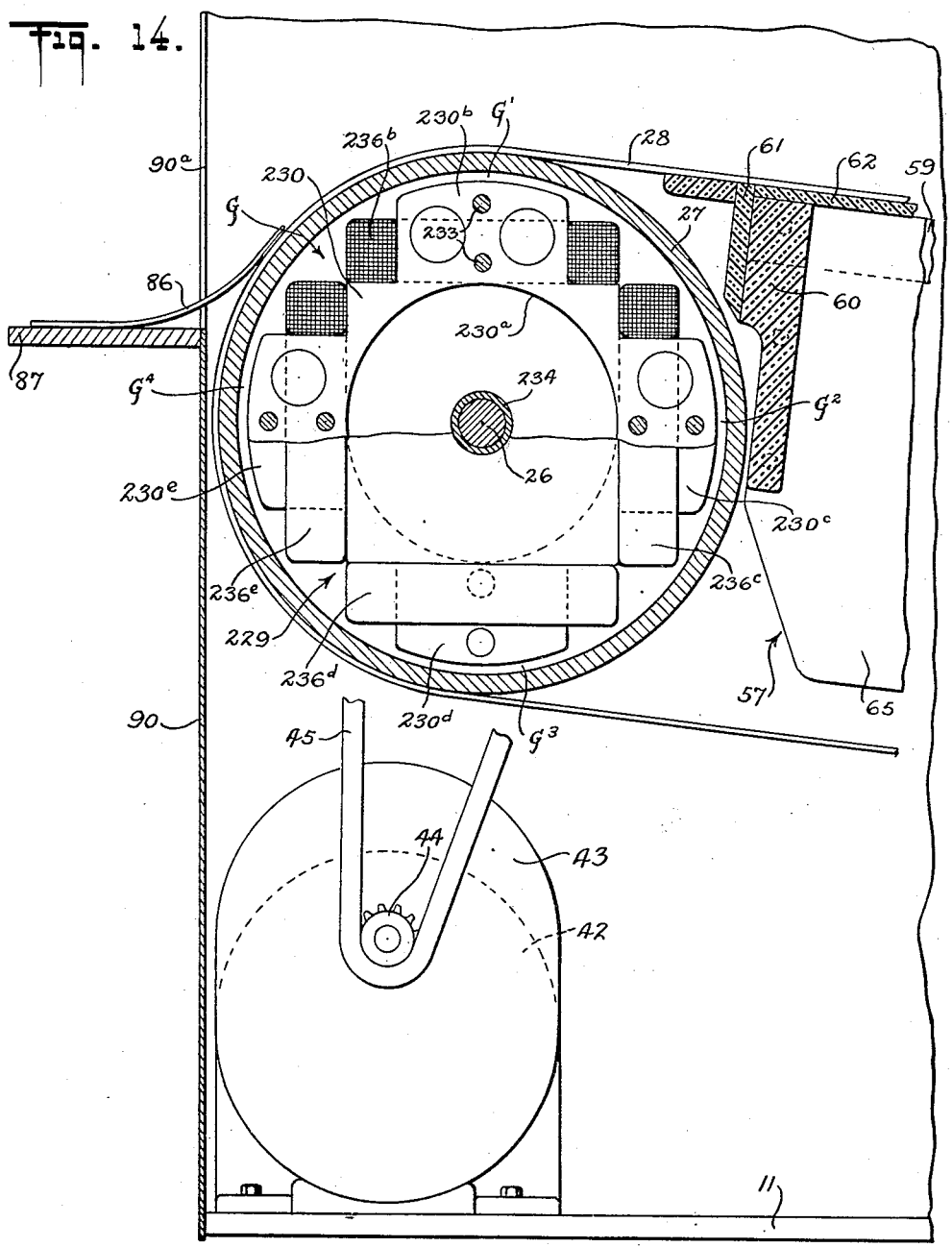

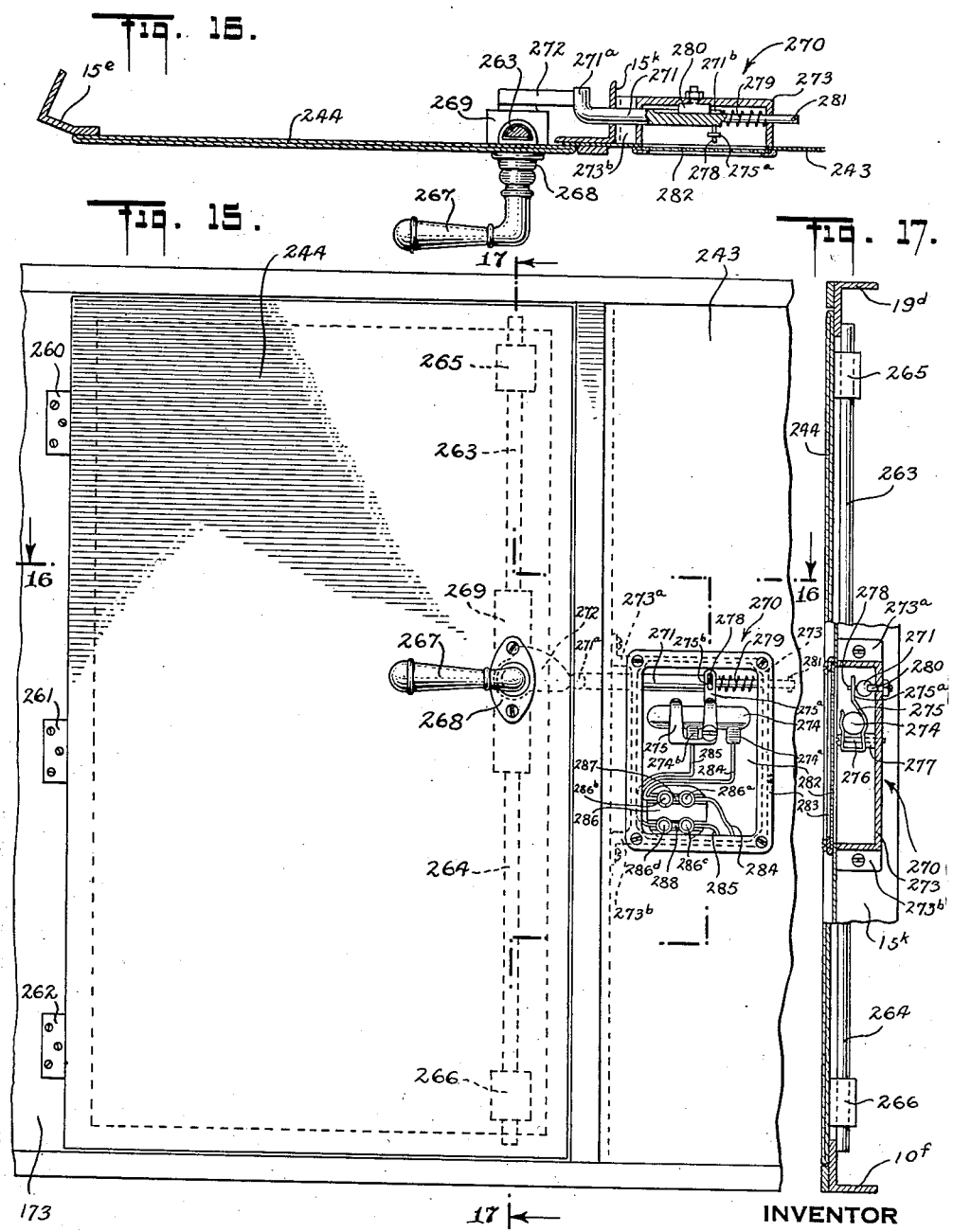

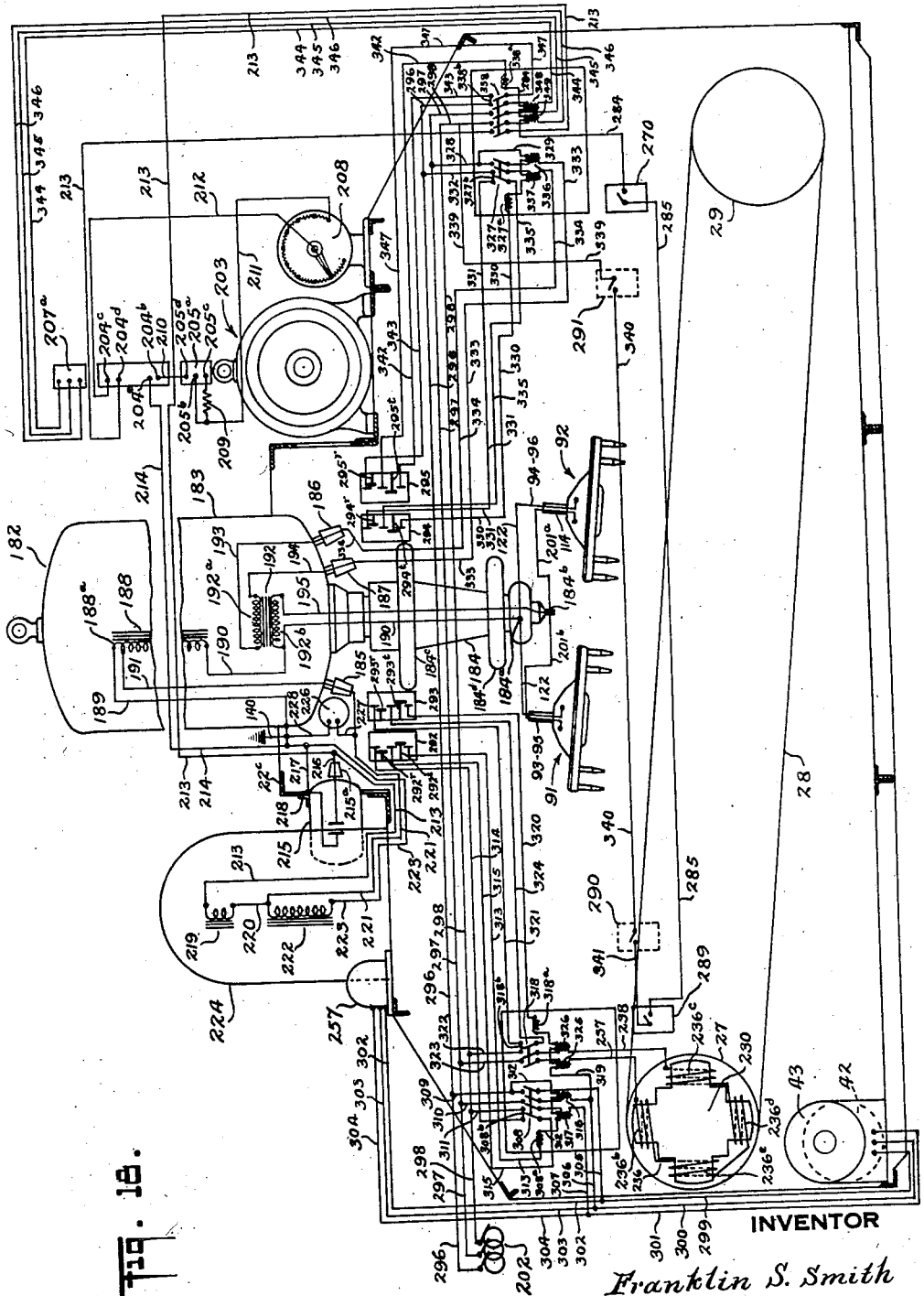

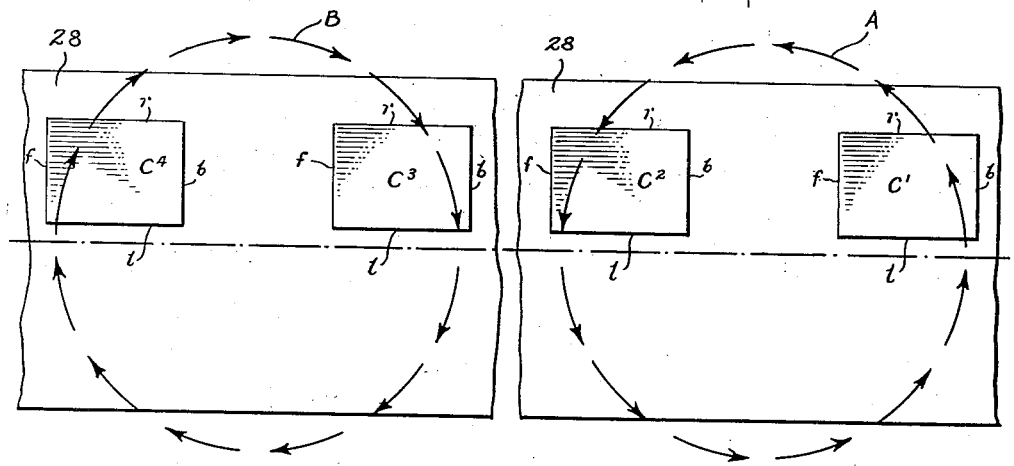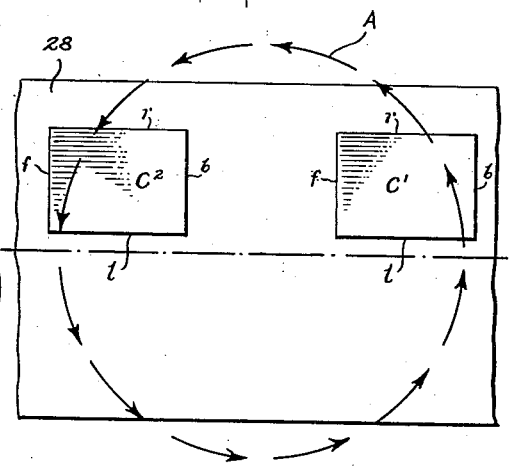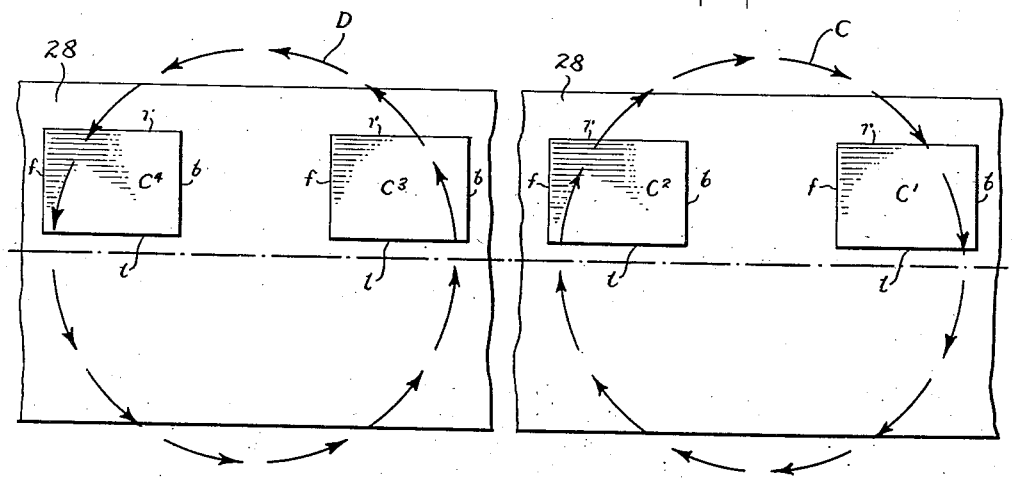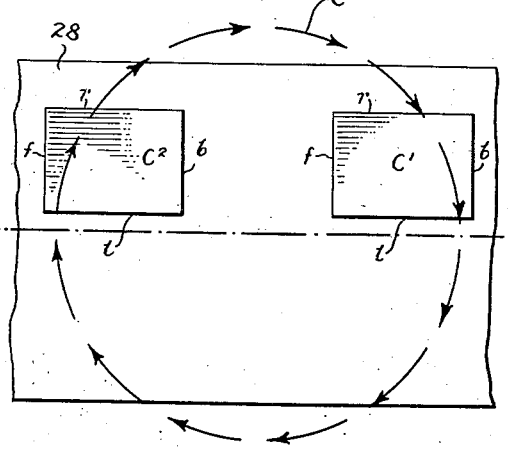

Patented Oct. 9, 1934

1,975,805

UNITED STATES PATENT OFFICE 1,975,805

ART AND APPARATUS FOR STERILIZING

Franklin S. Smith, New Haven, Conn.

Application August 2, 1932, Serial No. 627,291
Renewed December 27, 1933

44 Claims. (Cl. 175—311)

This invention relates to an art and apparatus for destroying insect life in food and other products.

One of the objects of this invention is to provide a thoroughly reliable art and apparatus for subjecting food and other products containing insects and/or their eggs, larvae and pupae to a quick and dependable treatment for destroying such insect life without in any way damaging the product treated. Another object is to provide an art and apparatus of the above-mentioned character which is well adapted to be used in conjunction with another food or product-handling apparatus, such as packaging and/or wrapping machines, without decreasing the output of the other machines and without in any way sacrificing efficiency and reliability of treatment as set forth above. Another object is to provide an art and apparatus of the above-mentioned character in which a thoroughness and reliability of treatment of food and other products is assured with a minimum of size, weight and cost of apparatus. Another object is to provide an art and apparatus of the above-mentioned character which is well adapted to handle products of various kinds and sizes which lends itself to an ease and dependability of control and which is thoroughly foolproof and safe. Another object is to provide an art and apparatus of the above-mentioned character in which highly efficient and thoroughly reliable results are achieved with apparatus of minimum size, weight and cost, and maximum dependability and safety. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which is shown one of the various possible embodiments of the electrical and mechanical features of my invention, Figure 1 is a front elevation of the apparatus, certain parts being broken away to more clearly disclose certain features of the invention and other parts being shown in section;

Figure 5 is a plan view of the apparatus, substantially as seen along the line 5—5 of Figure 1;

Figure 6 is a horizontal sectional view, on an enlarged scale, of certain features of the invention substantially as seen along the line 6—6 of Figure 1;

Figure 7 is an isometric view of a piece of insulating tubing showing the manner of producing a portion of the electrode supporting structure therefrom;

Figure 8 is a vertical cross-sectional view of certain parts of the apparatus, substantially as seen along the line 8—8 of Figure 1;

Figure 9 is a cross-sectional view, on an enlarged scale, of an electronic conduction device, substantially as seen along the line 9—9 of Figure 8;

Figure 10 is a detached elevation view, on an enlarged scale, of an electrode member and an electronic conduction device in cooperating relation therewith;

Figure 11 is a horizontal cross-sectional view of an electrode member as seen along the line 11—11 of Figure 10;

Figure 12 is a horizontal cross-sectional view of the tip portion of an electrode member as seen along the line 12—12 of Figure 10;

Figure 13 is a vertical sectional view, on an enlarged scale, of certain parts of the apparatus substantially as seen along the line 13—13 of Figure 1;

Figure 14 is a vertical sectional view, on an enlarged scale, of certain features of the apparatus substantially as seen along the line 14—14 of Figure 13;

Figure 15 is a detached front elevation, on an enlarged scale, of a portion of the casing for the apparatus including a door by means of which access is had to the apparatus;

Figure 16 is a horizontal cross-sectional view of a portion of the casing substantially as seen along the line 16—16 of Figure 15;

Figure 17 is a vertical sectional view of a portion of the casing substantially as seen along the line 17—17 of Figure 15;

Figure 18 is a wiring diagram for the treating apparatus;

Figures 19 and 20 are fragmentary plan views of the conveyor belt showing packaged products thereon and indicating diagrammatically certain electrical actions on the packages resulting from the different electrodes;

Figures 21 and 22 are fragmentary plan views of the conveyor belt showing packages thereon and indicating diagrammatically certain electrical actions on the packages resulting from the motion of the electronic conduction devices.

Similar reference characters refer to similar parts throughout the several views in the drawings.

Figure 1:
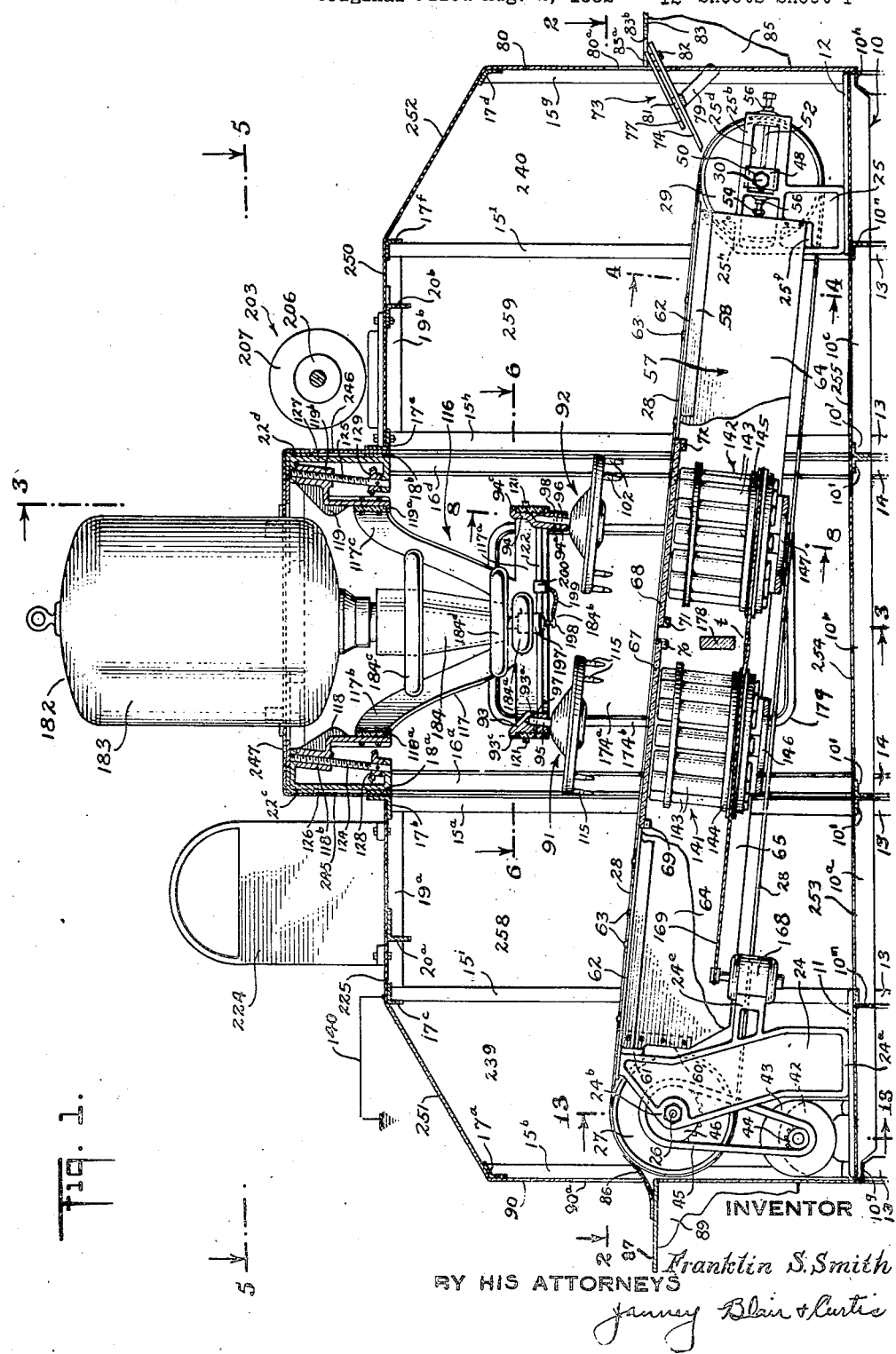
Figure 2:
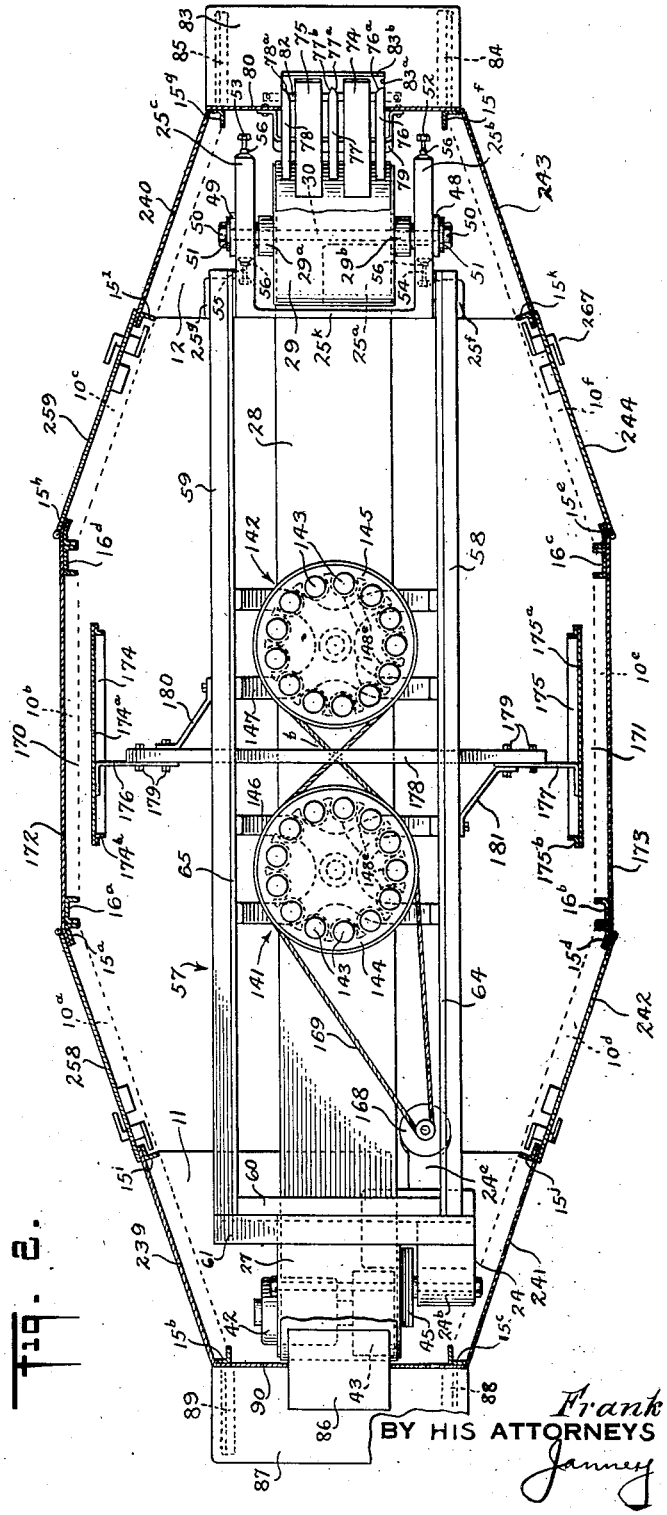
Figure 2 is a plan view of the apparatus substantially as seen along the line 2—2 of Figure 1.

Referring now to the drawings and more particularly to Figures 1 and 2, there is shown a substantially horizontal octagonal frame 10 preferably elongated in form and comprising a plurality of angle-iron side sections $10^a$, $10^b$ and $10^c$ and $10^d$, $10^e$ and $10^f$ with end sections $10^g$ and $10^h$ preferably fastened together as by welding. The horizontal frame is strengthened by the transversely extending angle-iron sections $10^i$—$10^j$ and $10^k$—$10^l$ conveniently welded to the side sections $10^a$, $10^b$ and $10^c$, and $10^d$, $10^e$ and $10^f$. Further strengthening is effected by the transversely extending angle iron-sections $10^m$ and $10^n$, preferably parallel to the end sections $10^g$ and $10^h$, which are conveniently welded to the angle-iron sections $10^a$—$10^d$ and $10^c$—$10^f$, respectively.

To the opposite ends of frame 10 are fastened the mounting plates 11 and 12 which are preferably of cast iron and so dimensioned that their edge portions are directly supported by the angle-iron sections $10^g$, $10^m$, $10^a$ and $10^d$ for the plate 11, and $10^h$, $10^n$, $10^c$ and $10^f$ for the plate 12.

The mounting plates 11 and 12 are conveniently bolted to the supporting angle-iron sections of frame 10 and serve to strengthen the frame as well as to present plane supporting surfaces upon which various portions of the apparatus are mounted, as will appear more fully hereinafter.

Figure 3:
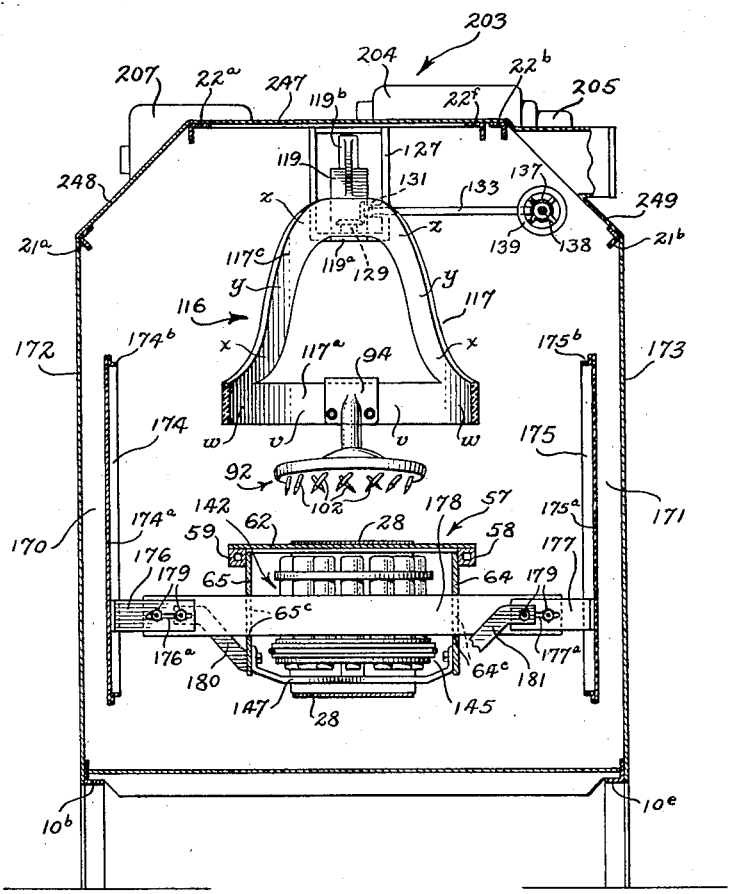
Figure 3 is a sectional elevation of the apparatus substantially as seen along the line 3—3 of Figure 1.

While the horizontal frame 10 may be directly laid on the shop, mill, or factory floor adjacent other machinery, such as packaging or wrapping machines, for reasons of cleanliness and economy, the frame is preferably supported on legs 13 of angle-iron and additional legs 14 of channel-iron conveniently welded to the frame (see also Figure 3). To assure firmness and rigidity of the frame and to prevent creeping along the floor as a result of the vibrations encountered in actual use, the legs are preferably fastened to the floor in any suitable fashion, such as by lag screws or by bolts.

To the octagonal horizontal frame 10 are fastened, as by welding, the vertical angle-iron sections $15^a$, $15^b$, $15^c$, $15^d$, $15^e$, $15^f$, $15^g$, and $15^h$ spaced about the octagonal frame conveniently at its corners (see Figure 2) and the additional vertical channel-iron sections $15^i$, $15^j$, $15^k$ and $15^l$ preferably spaced intermediate the long sides $10^a$, $10^d$, $10^f$ and $10^c$, respectively. The various vertical angle-iron sections serve as a skeleton frame-work by which the casing or housing for the apparatus is supported, and they further serve to support certain parts of the treating apparatus, all as will appear more fully hereinafter.

Additional support for certain parts of the apparatus is preferably achieved by, illustratively, four vertical channel-iron sections $16^a$, $16^b$, $16^c$ and $16^d$ which are conveniently mounted adjacent the angle-iron sections $15^a$, $15^d$, $15^e$ and $15^h$, respectively, at corners of the frame 10 adjacent its mid-section.

The various vertical angle-iron and channel-iron sections are maintained in their respective vertical positions by suitable horizontal transversely extending angle-iron sections preferably secured to the vertical sections by welding. Thus, (Figure 1) the upper ends of the angle-iron sections $15^b$ and $15^c$ are fastened to the horizontal cross-member $17^a$; the corner sections $15^a$ and $15^d$ to the horizontal section $17^b$, and the mid angle-iron sections $15^i$ and $15^j$ to the horizontal section $17^c$. Likewise, the end corner sections $15^f$—$15^g$, the corner sections $15^e$—$15^h$, and the mid-sections $15^k$—$15^l$ are respectively fastened to the horizontally extending angle-iron sections $17^d$, $17^e$ and $17^f$. The upper ends of channel-iron sections $16^a$ and $16^b$ are secured to the horizontal cross-member $18^a$, and similarly the upper ends of channel-iron sections $16^c$ and $16^d$ are secured to the horizontal cross-member $18^b$.

Relative movement between the angle-iron sections $15^a$ and $15^i$, and between the angle-iron sections $15^h$ and $15^l$ is prevented by the horizontal longitudinally extending angle-iron sections $19^a$ and $19^b$, respectively, (see Figure 1); in a similar manner the angle-iron sections $15^i$—$15^d$ and $15^e$—$15^k$ are preserved in proper spaced relation by similar horizontal angle-iron sections not shown.

Suitably secured to the longitudinally extending horizontal angle-iron sections, as by welding thereto, are cross-members $20^a$ and $20^b$ which serve to strengthen the frame and additionally serve as part of the supporting structure for certain parts of the electrical treating apparatus, all as will appear more fully hereinafter.

The upper ends of the channel-iron sections $16^a$ and $16^d$ on one side of the skeleton frame-work are fastened to a horizontal longitudinally extending angle-iron section $21^a$ (see Figure 5); likewise, the upper ends of the channel-iron sections $16^b$ and $16^c$ on the other side of the skeleton frame-work are secured to the angle-iron section $21^b$.

A substantially square frame comprising angle-iron sections $22^a$ and $22^b$, and channel-iron sections $22^c$ and $22^d$, preferably welded together to form a rigid construction, is supported in a substantial horizontal position spaced above the mid-section of the skeleton frame by the slanting channel-iron sections $23^a$, $23^b$, $23^c$ and $23^d$ preferably welded to the channel-iron members $22^c$ and $22^d$ of the square frame and to the vertical channel-iron sections $16^d$, $16^a$, $16^b$, and $16^c$, respectively.

Extending crosswise of the frame $22^a$—$22^b$—$22^c$—$22^d$ and substantially tangent at points spaced 120° apart to a circle described within the frame, are illustratively three angle-iron sections $22^e$, $22^f$, and $22^g$ suitably secured to the square frame as by welding. The frame-work thus provided serves to support, in a vertical central position, a part of the treating apparatus to be described hereinafter.

Referring back to Figures 1 and 2, there are shown at 24 and 25 upstanding conveyor supporting members preferably of a webbed cast iron construction suitably fastened to mounting plates 11 and 12, respectively, by screws or bolts.

The support 24 is of a cast iron webbed construction, as above noted, (see also Figure 13) and is provided with a pedestal or base portion $24^a$ which rests on and is suitably secured to the mounting plate 11. The upper portion of the upstanding support 24 is provided with a thickened wall portion $24^b$ which is adapted to receive one end of a horizontally extending shaft 26 upon which is rotatably mounted a driving drum 27 which partially supports and transmits motion to a conveyor belt 28.

The conveyor belt 28 is preferably mounted in an inclined position spaced above the center line of the elongated octagonal frame 10 by driving drum 27 and supporting drum 29 rotatably mounted on shaft 30 which is suitably supported by the upstanding support 25.

Considering the driving drum and its associated supporting structure in greater detail, (see Figure 13) the supporting shaft 26 is provided with thickened end portions 26ª and 26ᵇ which firmly contact the contracted wall portions 24ᶜ and 24ᵈ, respectively, of the thickened wall portion 24ᵇ of support 24. Thus, in effect there is provided a two point support for the shaft 26 which enables it to withstand the lateral forces, such as the weight of the driving drum and the pull of the conveyor belt, without undue bending or displacement.

The shaft 26 is provided with a raised shoulder portion 26ª which abuts one end of the thickened wall portion 24ᵇ of the upstanding support 24, firm contact being assured by nut 31 engaging a threaded contracted end portion 26ᵈ of the shaft, and urging washer 32 against the opposite end of thickened wall portion 24ᵇ of the upstanding support. The rigid mounting for shaft 26 thus formed serves to maintain it in a horizontal position, as above-mentioned, free from lateral, longitudinal, or rotational movement.

Rotatably mounted on the horizontally extending shaft 26 is a driving drum 27 preferably formed of cast iron with a cylindrical wall portion 27ª and an integral end wall portion 27ᵇ. The end wall portion 27ᵇ is preferably provided with a thickened central or hub portion 27ᶜ which is centrally bored so as to be received over the shaft 26. The hub portion 27ᶜ is provided with an enlarged chamber portion 27ᵈ which is adapted to snugly receive the roller bearing assembly 33.

Displacement of the bearing assembly is prevented by a retaining ring 34, fastened to the hub portion 27ᶜ by screws 35, which urge the bearing assembly against a shoulder portion 27ᵉ of the hub.

The cylindrical driving drum 27, with its associated roller bearing assembly 33, is adapted to be mounted on the shaft 26 which is provided with an accurately machined portion 26ᵉ adjacent the raised shoulder portion 26ᶜ which receives the roller bearing assembly 33 and thus axially supports the driving drum 27 in a position free to rotate.

To assure an axial mounting of driving drum 27 against lateral forces, such as its own weight and the tension of the conveyor belt 28, the cylindrical wall portion 27ª of the driving drum is preferably recessed as at 27ᶠ and receives end closure member 36 in the form of a circular disk. This closure member is preferably provided with a central hub portion 36ª which is adapted to snugly receive the roller bearing assembly 37.

One end of the bearing assembly is maintained in firm contact with a shoulder portion 36ᵇ of the hub 36ª by a retaining ring 38 which presses against the other end of the bearing assembly; the retaining ring being fastened to the hub portion 36ª by suitable screws 35.

End closure member 36, with its associated roller bearing assembly 37, is mounted on an accurately machined reduced end portion 26ᶠ of the horizontal shaft 26. Its outer periphery, as above-mentioned, is received within a recessed portion 27ᶠ of the driving drum 27 and is secured thereto by suitable set-screws conveniently spaced about the periphery, the one end of which is shown at 39.

The driving drum thus constructed and rotatably mounted on the shaft 26 is prevented from longitudinal displacement by the raised shoulder portion 26ᶜ on the one end and by a suitable washer 40 and nut 41 engaging the threaded end portion 26ᵍ of the shaft 26 on the other end. A slight end play is permitted, however, to prevent localized wear of the bearings and shaft; motion toward the right, as seen in Figure 13, being prevented by the outside of the retaining ring 34 coming up against the shoulder 26ᶜ, while motion toward the left, as seen in Figure 13, is prevented by the retaining ring 38 coming up against the washer 40.

Mechanical driving energy is supplied to drum 27 by an electric motor 42, illustratively a three phase induction motor, whose shaft 42ª is directly connected to the reduction gearing 43. Both the motor 42 and reduction gearing mechanism 43 are preferably directly mounted on the mounting plate 11 and are fastened thereto by suitable screws or bolts.

Reduction gearing mechanism 43 drives a suitable toothed gear wheel 44 (see Figure 14) which transmits motion to a link belt or chain 45 serving to drive the drum 27. The outer surface of the driving drum hub 27ᶜ is adapted to receive the toothed wheel or sprocket 46 which preferably abuts a plurality of projecting portions integral with the closed end portion 27ᵇ of the driving drum, one of which is shown at 27ᵍ.

The toothed wheel or sprocket 46 is preferably fastened to the drum by screws 47 threadedly received in the projecting portions 27ᵍ of the drum end. Toothed gear wheel 44 associated with the reduction gearing mechanism 43 and the toothed wheel or sprocket 46 associated with driving drum 27 are mounted in substantial alignment and are mechanically interconnected by link belt or chain 45. Thus, upon energization of the electric driving motor 42, in a manner described more fully hereinafter, motion is transmitted by shaft 42ª, reduction gearing 43, toothed gear 44, link belt 45, and sprocket 46 to the driving drum 27 and to the conveyor belt 28.

The speed rating of the motor, the speed ratio transmission of the reduction gearing, the relative sizes of the toothed gear wheels, and the diameter of the driving drum are preferably all so proportioned that the conveyor belt is driven at a speed of illustratively 25 feet per minute.

Referring now back to Figures 1 and 2, the conveyor belt 28, in addition to being supported in part by the driving drum 27, as above set forth, is supported by the driven drum 29 which is preferably cylindrical in form and substantially identical in construction to the above-described driving drum. The driven drum is provided with hub portions 29ª and 29ᵇ (see Figure 2) which include roller bearing assemblies by which the drum is rotatably mounted on the horizontal shaft 30.

Figure 4:
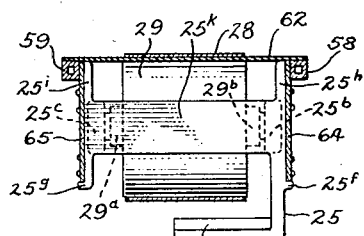
Figure 4 is a vertical cross-section of the conveyor supporting structure as seen along the line 4—4 of Figure 1.

Shaft 30 is supported by the upstanding support 25 which is preferably of a cast iron webbed construction having a lower base or foot portion 25ª, and upper outwardly extending arm portions 25ᵇ and 25ᶜ interconnected by a flat horizontal portion of reduced section 25ᵏ preferably formed integral therewith (see Figure 4).

The support 25 is preferably mounted on the mounting plate 12 and secured thereto by suitable screws or bolts so that the driven drum 29 is supported in substantial alignment with the driving drum 27. The outwardly extending arms portions 25ᵇ and 25ᶜ of the upstanding support are preferably slotted as at 25ᵈ for the arm portion 25$^b$ (see Figure 1), and similarly slotted for the arm portion 25$^c$. These slotted portions are adapted to receive the mounting blocks 48 and 49 in slidable relation.

The blocks 48 and 49 are preferably provided with central holes which snugly receive opposite ends of the shaft 30 and maintain it in a rigid horizontal position; the shaft being fastened in proper place by nuts 50 threadedly engaging opposite ends of the shaft and their associated washers 51 firmly contacting blocks 48 and 49. Nuts 50 are turned up on shaft 30 just sufficiently so that undue longitudinal motion of the shaft is prevented, nevertheless, permitting the blocks and shaft to be slid lengthwise without binding along the tracks provided by the slotted portions of arms 25$^b$ and 25$^c$ of the upstanding support.

Motion of the shaft with its associated mounting blocks in a direction lengthwise of the shaft is effectively prevented by raised shoulders provided on the outer portions of the blocks which contact the outer sides of arms 25$^b$ and 25$^c$ adjacent the slotted or track portions formed therein.

Shaft 30, and consequently the driven drum 29, may be moved toward or away from the driving drum by adjustment screws 52 and 53 acting on blocks 48 and 49 to urge them toward driving drum 27, and adjustment screws 54 and 55 acting on blocks 48 and 49, respectively, to urge them away from the driving drum. Each of the screws is threadedly received within the arm portions 25$^b$ and 25$^c$ of the upstanding support and are secured in their respective positions of adjustment by lock nuts 56. Arms 25$^b$ and 25$^c$ of the upstanding support are preferably inclined to the horizontal to the same extent as is the upper conveying surface of the conveyor belt.

Thus, as the conveyor belt, preferably of cotton or asbestos fabric having sufficient tensile strength and flexibility to transport the product to be treated, and of sufficiently high electrical characteristics to withstand the high potential gradients to which it is subjected, as it wears and stretches may nevertheless be maintained tight about the drums 27 and 29 without changing the plane of the belt supporting surface. As the conveyor belt lengthens in use, proper belt tension may be maintained by loosening the adjustment screws 52 and 53 and by tightening up on the screws 54 and 55. These adjustments force the shaft supporting blocks 48 and 49 along the slot portion of the arms 25$^b$ and 25$^c$ to change the position of driven drum 29 with respect to the driving drum 27 and to take up the slack in the conveyor belt 28, all as above-mentioned, without effecting a change in the plane of the upper supporting surface of the conveyor belt 28.

In order that the upper surface of the conveyor belt may be maintained substantially in a single plane slightly inclined to the horizontal against belt sag and the weight of the product conveyed, the belt driving tension is preferably placed on the upper belt side as by rotating the driving drum 27 in a counter-clockwise direction, as seen in Figure 1.

Further assurance that the upper surface of the conveyor belt is maintained in a single plane is achieved by the electrically insulating conveyor belt supporting structure generally shown at 57. This supporting structure preferably comprises a pair of parallel insulating supporting beams 58 and 59 preferably of a material, such as laminated "Bakelite or Dielecto," having high electrical resistance characteristics coupled with mechanical rigidity and strength, and conveniently in the form of square tubing, the opposite ends of which are fastened to the upstanding supports 24 and 25.

One end of the parallel beam structure is fastened by suitable screws or bolts to an end-plate 60 which in turn is bolted to an angle-iron section 61 mounted in a horizontal position on the upper end of the upstanding support 24 and rigidly secured thereto by suitable screws. The other end of the parallel beam structure is supported by the upstanding support 25, in a manner more particularly described hereinafter.

Beams 58 and 59 serve to support the flat elongated rectangular sheet of insulating material 62, preferably of dielecto or laminated bakelite, which is in intimate contact with the lower surface of the upper side of conveyor belt 28 and in direct supporting relation thereto.

For economical reasons, the upper insulating supporting sheet 62 preferably comprises a number of smaller sheets placed in end to end relation and suitably fastened to the parallel supporting beams 58 and 59 by screws 63 (see also Figure 8). To effectively prevent bending of the parallel beams 58 and 59 under the weight of the product conveyed by the belt 28, the belt supporting structure 57 preferably includes a pair of flat elongated insulating members 64 and 65 which are fastened in edgewise relation to the parallel beams 58 and 59 respectively as by screws 66 (see also Figures 8 and 13).

These flat insulating members are preferably fastened interiorly of the parallel beams 58 and 59 and afford substantial resistance to the downward bending of the insulating conveyor belt supporting frame. One end of the parallel edgewise mounted side members is fastened to the end plate 60 by suitable screws, while the opposite end rests upon pedestals 25$^f$ and 25$^g$ (see also Figures 2 and 4) formed integrally with the upstanding support 25 and which are preferably fastened by suitable screws to the broad portions 25$^h$ and 25$^i$ of arms 25$^b$ and 25$^c$, respectively of support 25 which contact the inner surfaces of the extreme right-hand ends of side members 64 and 65. The upper part of the extreme right-hand end of the conveyor belt supporting structure just falls short of contacting the outer periphery of drum 29 in the extreme left-hand position of the latter so that as the drum is moved to the right to compensate for belt stretch, the unsupported length of belt does not get to objectionable values.

To give a maximum length of supporting surface for the conveying portion of the conveyor belt, the upper insulating supporting sheet 62 overhangs the main body portion of the support on the right-hand end, as seen in Figure 1, and just clears the upper portion of the driven drum 29 in extreme left-hand position, while the upper portion of the angle iron 61 just clears the upper portion of the driving drum 27 and effects a result similar to the overhanging portion of the insulating sheet 62.

While an insulating supporting sheet of uniform characteristics may be used to effectively support the conveyor belt, the mid portion of the supporting sheet or conveyor frame top is cut away at two points spaced along the length of the conveyor supporting structure and replaced by substantially square plates of solid dielectric material, such as Pyrex glass or fused quartz, 67 and 68, the purpose of which will appear more fully hereinafter in the consideration of certain electrical actions of the apparatus.

The Pyrex sheets are preferably of such widths (see Figure 8) that they are received between the insulating supporting beams 58 and 59 and firmly rest upon the cut-away upper edges of the insulating side members 64 and 65 and are thus maintained with their upper surfaces substantially flush with the upper surface of the insulating sheet 62 so as to give an unbroken supporting surface for the conveying portion of the belt 28. The Pyrex plates are preferably of a thickness appreciably greater than that of the insulating sheet 62 and hence of considerable weight.

Additional support for the dielectric members 67 and 68 is provided by the insulating cross-members 69—70 and 71—72 which extend transversely of the conveyor belt supporting structure 57 and are fastened to the opposite side members 64 and 65 by suitable screws.

The above-described conveyor structure is supplied with articles or products to be treated from the slide generally shown at 73 preferably comprising parallel track members 74 and 75 of suitable sheet material supported by guide rails 76, 77 and 78.

The parallel track members 74 and 75 are maintained in an inclined position with their lower ends adjacent the upper surface of the driven drum 29, but spaced vertically therefrom a sufficient distance to prevent contact with either the drum or the conveyor belt upon adjustment of the drum to take up belt slack, by a lower U-shaped bracket 79 which is conveniently bolted to the sheet metal end portion 80 of the casing suitably fastened to the upper and lower angle-iron frame sections 16$^h$ and 17$^d$ and the vertical frame channel-iron sections 15$^i$ and 15$^s$ by screws or bolts.

Similarly, the lower ends of the guide rails 76, 77 and 78 are supported by the bracket 79, the guide rails being maintained spaced above the tracks 74—75 by blocks 81 which rest directly against the bracket to effect a rigid and permanent construction.

The track portions 74—75 and the guide rails 76—77—78 are preferably welded to the bracket 79 and to the raising blocks 81, respectively; the latter in turn being welded to the bracket.

The upper ends of tracks and guide rails project outwardly through an aperture portion 80$^a$ of the casing end where they are supported by a suitable U-shaped bracket 82 conveniently bolted to a horizontal shelf 83 suitably supported at its ends by right-angle brackets 84 and 85 preferably welded to the opposite vertical edges of the casing end 80

The horizontal shelf 83 is cut out as at 83$^a$ to provide a channel in substantial alignment with slide 73, the opposite edges of which contact the outside edges of the outer guide rails 76 and 78 and lend additional support to the slide structure. Alignment of the upper surfaces of track members 74 and 75 with the adjacent edge of the shelf is assured by beveling the shelf edge as at 83$^b$.

To facilitate the guidance of packaged products along tracks 74—75, the upper ends of the guide rails are well rounded off as at 76$^a$, 77$^a$, 77$^b$, and 78$^a$.

The horizontal shelf 83 is preferably spaced from the workroom or shop floor a distance equivalent to the discharge chute of, for example, a packaging machine preferably located adjacent the treating apparatus. The packaged product discharged from the packaging machine lands on shelf 83 from which they are fed, illustratively by hand, to the parallel tracks 74 and 75 of the slide 73. Under the action of gravity the packages slide down on to the extreme right-hand end of the conveyor, as seen in Figure 1.

Conveyor belt 28, as above-mentioned, is driven in a counter-clockwise direction, as seen in Figure 1, by the driving drum 27 which in turn is driven by the electric motor 42 acting through the speed reduction gearing mechanism 43 and the link belt transmission 45. The upper conveying surface of the belt 28 thus moves in a direction from right to left, as seen in Figure 1, and conveys the packaged product along predetermined, illustratively, straight-lined parallel paths slightly inclined to the horizontal, to the extreme left-hand end of the conveyor where they pass on to a slide 86 and are discharged, under the action of gravity, on to a discharge shelf 87.

Shelf 87 is preferably horizontal and extends across the entire end of the treating apparatus (see Figure 2) and is conveniently of a height above the shop floor corresponding to the height of the package receiving shelf of, for example, a wrapping machine located adjacent the treating apparatus. Packages discharged on to shelf 87 are then transported in any suitable manner, illustratively by hand, on to the receiving shelf of the adjacent wrapping machine (not shown).

Shelf 87 is preferably constructed of sheet metal and mounted in a similar fashion to the receiving shelf 83 by right angle brackets 88 and 89 conveniently welded to the shelf 87 and to the casing end wall 90 which in turn is suitably fastened by screws or bolts to the upper and lower horizontal angle-iron members 17$^a$ and 16$^a$, and vertical angle-iron members 15$^b$ and 15$^c$ of the apparatus frame-work.

A suitable aperture in the casing end is provided as at 90$^a$ through which the packages are discharged as they pass down slide 86. The slide is conveniently constructed of sheet metal substantially rectangular in form, one side of which is preferably welded to the shelf 87, while the opposite side is bent over to just clear the conveyor belt 28 as it begins to curve about driving drum 27 presenting a receiving edge for the packages as they reach the extreme left-hand side of the conveyor in their course of transportation by the conveyor belt.

As the packages of product to be treated are moved along the conveyor from the receiving end to the discharge end of the apparatus, they pass beneath the electrode members 91 and 92 and through treatment zones associated therewith, as will appear more fully hereinafter.

The electrodes, illustratively two, 91 and 92 are preferably supported in a common plane substantially parallel to the upper conveying surface of the belt 28 in substantial alignment above the center line of the belt. Electrode members 91 and 92 are maintained in spaced relation above conveyor belt 28 by metallic brackets 93 and 94, respectively, which in turn are suitably supported in a manner more fully described hereinafter.

Each electrode member 91 and 92 is preferably provided with upstanding stem portions 95 and 96, respectively, which are received within suitable hole portions 93$^a$ and 94$^a$, respectively, provided in brackets 93 and 94 and permanent fastening therein is preferably effected by wedgeshaped pins 97 and 98 passing through suitable holes provided in bracket 93, stem 95, and bracket 94 and stem 96, respectively.

For reasons of economy, as will appear more fully hereinafter, the brackets 93 and 94 are preferably mounted on a horizontal frame forming an acute angle with the common plane of the electrode members 91 and 92.

In order that the electrodes 91 and 92 may be firmly and rigidly supported by the brackets 93 and 94, respectively, the brackets are preferably of unsymmetrical construction the one, 94, being of an increased length since it extends across the wider portion of the above-mentioned angle between planes. Similarly, the stem portion 96 of the electrode 92 associated with the longer bracket 94 is preferably of an increased length to give added rigidity to the connection with the longer bracket.

Electrode members 91 and 92 are preferably of analogous construction for reasons of manufacturing economy so that a detailed discussion of but one of the electrode members 92 will now be given.

Referring now more particularly to Figure 8, there is shown at 99 an inverted dish-shaped housing preferably of cast aluminum, having high electrical conductivity, with a central humped body portion $99^a$ and a flat rim portion $99^b$.

Fastened to the inverted dish-shaped housing 99, by suitable screws 100, is a dish-shaped housing portion 101 also preferably of cast aluminum having a central downwardly extending body portion $101^a$ and a flat outwardly extending rim portion $101^b$.

The outer rim portion $101^b$ of the lower portion of the housing preferably includes two concentric thickened ring portions $101^c$ and $101^d$, each of which are provided with spaced hole portions $101^e$ (see Figure 6) in an alternate or staggered relation which are adapted to receive electrode members 102. Between concentric thickened ring portions $101^c$ and $101^d$ of the rim $101^b$ is a relatively thin interconnecting section $101^f$, and similarly between the inner thickened ring portion $101^d$ and a central downwardly extending body portion $101^a$ is a relatively thin interconnecting section $101^g$; this construction makes for a saving in material yet permits adequate mountings for the electrode members 102.

The various electrode members 102 are preferably of identical construction comprising (see Figure 10) a main cylindrical body portion $102^a$, an upper flat circular head portion $102^b$, and a lower conical sharp tip portion $102^c$. The various electrode members are preferably made of nickel steel tubing worked into the form indicated and highly polished, particularly adjacent the extreme tip portions thereof, to give smooth unbroken surfaces free from irregularities and small projections; the advantages to be derived from this construction will appear more fully hereinafter.

The various hole portions $101^e$ arranged in two concentric rings about the concentric ring portions $101^c$ and $101^d$, respectively, of the lower portion of the housing, are preferably inclined at a common angle of 50° or 60° with respect to the plane of the electrode; the center lines of the holes and consequently the center lines of the various electrode members individually associated with the holes lie in planes substantially tangent to either of the two concentric ring portions of the lower electrode housing. Thus, the extreme tip portions $102^d$ of the various electrode members lie along two concentric circles and preferably in a common plane.

Electrode 92 is preferably rotated, in a manner to be more fully described hereinafter, in such a direction that the upper head portions of the electrode members are leading with the extreme tip portions trailing; for the electrode 92 the rotation, as seen looking down on the electrode (see Figure 6) is in a counter-clockwise direction. An individual electrode member (see Figure 10) illustratively moves in a direction from left to right with its upper portion leading and with its lower tip portion trailing. A horizontal section taken through the main portion of the electrode member (see Figure 11) is elliptical in form and through the tip portion substantially egg-shaped in form (see Figure 12) thus giving a substantially stream-line construction to the slanting electrode member which effects a minimum disturbance of the ambient air, the desirability of which will appear more fully hereinafter in considering certain electrical actions of the apparatus, as the electrode is rapidly rotated as indicated above.

While various numbers of electrode members may be used in the construction of an electrode depending upon the diameter of the rotatable electrode, the number of rings of concentric electrode members, the size of electrode members, and the spacing between them, I conveniently employ electrode members spaced from each other in a circle so that their projected lengths are approximately equal to the distance between these projections.

The diameters of the illustratively two concentric circles in which the electrode members are arrayed are preferably such that the projection of the outer circle falls beyond both edges of the conveyor belt 28 (see Figure 6), while the projection of the inner circle overlaps and just falls outside of the path of travel of the packaged product or articles to be treated; the diameter of the latter circle is preferably slightly greater than the width of conveyor belt, while that of the smaller circle is slightly less.

For a conveyor belt of about 14 inches in width, the outer ring of electrode members is about 16 inches in diameter including illustratively 9 electrode members of 4 inches in length spaced 40° apart, while the inner ring of electrode members is about 10½ inches in diameter including illustratively 9 electrode members 4 inches long spaced 40° apart and alternating with the electrode members of the outer ring.

The various highly polished, illustratively nickel-steel, electrode members are removably positioned in the various above-mentioned holes provided in lower portion $101^b$ of the electrode housing and so held that their various flat head portions $102^b$ are snugly received within countersunk portions $101^h$ (see Figures 6, 8 and 10), by contact with the lower surface of the flat rim portion $99^b$ of the upper portion of the electrode housing; upper and lower portions of the housing being held in assembled relation by screws 100.

With this construction the various electrode members may be removed and replaced by other electrode members of the same kind or by electrode members of a different kind, longer or shorter, with the extreme tip portion sharper or more blunt, or of a different material, all with a minimum disturbance of the other portions of the apparatus. Furthermore, such a construction gives a good firm support to the various electrode members which in addition is well adapted to transfer the heat produced at the tip portions of the electrode members to the body of the electrode where it is readily dissipated; the construction is also of high electrical conductivity and light in weight, all of which makes for a high operating efficiency and an economy in manufacture.

The electrode housing 99 with its associated electrode members 102 is rotatably mounted, as indicated above, on the shaft 96, the upstanding or stem end of which, as above-mentioned, is suitably secured to bracket 94.

Shaft 96 is formed with a central expanded portion 96$^a$ and with an adjacent narrow portion 96$^b$ which snugly receives the inner race 103$^a$ of the ball bearing assembly 103.

The lower end of the inner race 103$^a$ of the ball bearing assembly firmly abuts a shoulder portion 96$^c$ of the shaft between the expanded and more reduced sections 96$^a$ and 96$^b$, respectively, and is held in firm abutting relation by the retaining ring 104 threadedly engaging the shaft as at 96$^d$; thus, the ball bearing assembly 103 is securely mounted on the shaft 96.

The upper portion 99$^a$ of the electrode housing is provided with a central hole portion 99$^c$ of thick wall construction adapted to snugly receive the outer race 103$^b$ of the ball bearing assembly. The upper part of the hole portion provided in the upper part of the electrode housing is of a similar diameter so as to provide a shoulder 99$^d$ which rests upon the upper end of the outer race 103$^d$ of the ball bearing assembly. Thus, the electrode housing 99—101 is rotatably mounted on the shaft 96 with its weight sustained by the ball bearing assembly 103.

To give a dirt-tight, dust-tight and grease-tight fitting between the rotatable housing 99—101 and the fixed shaft 96, the upper part of the upper portion 99 of the electrode housing is recessed as at 99$^d$ and fitted with a felt washer 105, the inner edge of which lightly contacts the outer periphery of retaining ring 104. The fitting is completed by dust plate 106 in the form of a flat ring which is received within the recessed portion 99$^d$ of the upper portion of the housing and rests upon the felt washer 105; plate and washer are secured to the housing by suitable screws 107. Dust plate 106 is preferably so mounted on the rotatable electrode housing as to clear fixed shaft 96 and its associated retaining ring or nut 104 to allow free rotation of the electrode.

To assure an axial rotation of the electrode 92 about the supporting shaft 96 and central part of the lower portion 91, the electrode housing is recessed as at 101$^h$ and snugly receives the outer race portion 108$^a$ of the ball bearing assembly 103, the inner race 108$^b$ of which is pressed onto a reduced end section 96$^e$ of the shaft. Thus, electrode housing 99—101 with its associated electrode members 102 is axially supported on shaft 96 and adapted to be rotated about its central axis with a minimum frictional resistance in the bearings and minimum windage impedance (due to the effective stream-line construction of the various electrode members).

Driving energy for rotating the electrode housing 99—101 is preferably supplied by a single phase alternating current induction motor generally shown at 109, rated illustratively 220 volt, 6 pole, 60 cycle with a synchronous speed of 1200 R. P. M., preferably including a stationary field 110 mounted on shaft 96 and a rotating armature 111 associated therewith mounted on housing 99—101.

The field 110 preferably includes a laminated iron core 112 illustratively comprising a stack of individual circular disks of suitable iron 112$^a$ and circular end plates 112$^b$ of an appreciably thicker iron. The core is provided with a central hole portion 112$^c$ which receives a reduced portion 96$^f$ of the shaft; the core is pressed onto the shaft prior to the assembly of the electrode until the upper end plate 112$^b$ abuts a shoulder portion 96$^g$ of the shaft after which the end of the reduced section 96$^f$ is mushroomed as at 96$^h$ to press against the lower end plate 112$^b$ and holds the laminated core in a compact assembled relation on the shaft.

The outer periphery of the core 112 is slotted and wound with the illustratively single phase 6 pole winding 113. Since the motor winding per se forms no part of the present invention, a detailed description of it will not be given.

One end 113$^a$ of the winding is brought out and grounded to the core as at 112$^d$, while the other end 113$^b$ is taken up through a channel portion 96$^i$ provided in the supporting shaft 96 where it is suitably connected to conductor 114 associated with bracket 94.

Concentrically spaced about the field 110 and adjacent the outer periphery of core 112 is a ring-shaped laminated armature core 111. Armature 111 is tightly received within recessed portions 99$^e$ and 101$^i$ of the upper and lower portions respectively of the electrode housing with the upper and lower edges adjacent the outer periphery abutting shoulder portions 99$^f$ and 101$^j$ of the respective upper and lower portions of the electrode housing. Thus, the induction motor armature is securely fastened to the electrode housing with its core properly aligned with that of its associated field and with a proper uniform air-gap intervening.

The armature 111 preferably includes a squirrel-cage induction winding, illustratively of the copper bar and brazed end-ring type. Since the armature winding per se forms no part of the present invention, a detailed description of its construction will not be given.

It may at this point be noted that induction motor 109 is received within electrode housing 99—101 allowing a suitable air space between the field windings and the nearby walls of the electrode housing. The relatively thin walled sections of the upper and lower portions of electrode housing rapidly transfer the heat produced in the motor core and windings (and partially given up to the air enclosed within the housing) to the outer surface of the electrode housing where it is rapidly conducted away or dissipated by the ambient air through which the electrode housing rotates upon energization of the induction motor 109, in a manner more particularly described hereinafter, illustratively by way of conductor 114 and the metallic bracket 94, shaft 96 and field core 112.

Mechanical driving energy is imparted to housing 99—101 and the associated electrode members 112 causing the latter to whirl along their prescribed circular paths in a counter-clockwise direction, as above-mentioned, at a speed of approximately 4500 feet per minute for the outer ring of electrode members, and 3000 feet per minute for the inner ring for the dimensions illustratively given above.

Electrode 91, as above-mentioned, is analogous in construction to electrode 92 with these differences, however; the induction motor associated with electrode 91 drives the latter in a clockwise direction and accordingly the electrode members 115 associated with this electrode are slanted in an opposite direction to those associated with the oppositely rotating electrode 92, with their extreme tip portions in a trailing position, in order to realize the stream-line effects mentioned above in the consideration of the action of electrode 92.

Electrodes 91 and 92 are rotated in opposite directions with the extreme tip portions of their respective electrode members whirling in, preferably, a common plane spaced above and substantially parallel to the upper conveying surface of the belt 28. These electrodes are adapted to be maintained at a high electrical potential, illustratively 150,000 volts with respect to ground, the manner and purpose of which will appear more fully hereinafter.

Electrodes 91 and 92 are maintained in spaced relation above the conveyor belt 28 in the manner indicated by the electrode supporting structure generally shown at 116 (see Figure 1) which preferably includes an insulating framework 117 which is supported by metallic brackets 118 and 119.

Insulating support 117 (see Figure 7) is preferably cut from a large tubular piece of insulating material, such as dielecto or laminated bakelite, having appreciable mechanical strength in addition to its high electrical insulation characteristics in the form indicated. From a single short length of tubing, two such insulating supports 117 and 120 may be conveniently cut having ring portions 117$^a$ and 120$^a$, respectively, and loop portions 117$^b$ and 117$^c$ and 120$^b$ and 120$^c$, respectively, located on diagrammatically opposite sides of the respective ring portions 117$^a$ and 120$^a$. Thus, two individual insulating supporting members are obtained from a minimum length of insulating tubing with a consequent saving in material and a reduction in the cost of manufacture.

Referring now back to Figure 1, the insulating supporting member 117 is preferably mounted symmetrically about a vertical axis with its ring portion 117$^a$ lowermost and substantially horizontal about which are mounted, at diagrammatically opposite points, metallic brackets 93 and 94.

Brackets 93 and 94 (see Figure 6) are preferably provided with convex curved upper portions 93$^b$ and 94$^b$, respectively, which are adapted to contact the inner curved surface of the ring portion 117$^a$ of the insulating support. Brackets 93 and 94 are further provided with over-hanging lip portions 93$^c$ and 94$^c$ (see Figure 1) which squarely rest upon the upper horizontal edge of the ring portion 117$^a$ of the insulating support which thus sustains a good portion of the weight of the electrodes and furthermore prevents displacement of electrodes and metallic brackets about a horizontal axis; the brackets are fastened to the insulating support by suitable screws 121.

To prevent bending, twisting or warping of the lower horizontal ring portion 117$^a$ of the insulating support, there are provided a pair of parallel tubular conducting compression members 122 and 123 (see Figure 6), the ends of which are snugly received within suitable holes provided in brackets 93 and 94.

Holes are provided at 93$^d$ and 94$^d$ to receive opposite ends of the conducting tube 122 in brackets 93 and 94, respectively, and similarly holes are provided at 93$^e$ and 94$^e$ to receive opposite ends of the tubular member 123 in the respective brackets 93 and 94.

The upstanding loop portions 117$^b$ and 117$^c$ of the insulating support are secured to metallic brackets 118 and 119, as mentioned above, the lower edges of the extreme upper portion of the loops 117$^b$ and 117$^c$ resting on toes 118$^a$ and 119$^a$, respectively, preferably made integral with the respective brackets 118 and 119; insulating supports and brackets are preferably bolted together to give a rigid and secure fastening well adapted to withstand twisting or turning about the horizontal axis as a result of lateral stresses accidentally applied to either the electrodes or their supports.

Brackets 118 and 119 are provided with offset threaded upper portions 118$^b$ and 119$^b$, respectively, which are slightly inclined to the vertical by an amount equivalent to the incline of the conveyor, or in effect substantially perpendicular to the upper conveying surface of the conveyor belt 28. To give a free and unencumbered mounting for the electrode supporting structure, brackets 118 and 119 are offset outwardly, the one 118 being offset toward the left, as seen in Figure 1, while the other, 119, is offset toward the right where they respectively engage parallel threaded shafts or elevation screws 124 and 125 rotatably mounted in C-brackets 126 and 127, respectively, which in turn are illustratively welded to the upper and lower horizontal iron frame sections 22$^c$—18$^a$ and 22$^d$—18$^b$, respectively.

C-brackets 126 and 127 are preferably so constructed that elevation screws 124 and 125, respectively, journaled or rotatably mounted therein are maintained perpendicular to and in substantial alignment with the upper part of the conveyor belt 28 and consequently in substantial parallel relation with the axial mountings of electrodes 91 and 92.

Elevation screws 124 and 125 respectively are adapted to be rotated by bevel gears 128 and 129 which are suitably fastened to the lower ends of the respective screws illustratively by suitable pins (not shown). Meshing with bevel gears 128 and 129 are bevel gears 130 and 131 (see Figures 3 and 5) suitably fastened to horizontal shafts 132 and 133, respectively, illustratively journaled in the associated C-brackets 126 and 127 and the horizontally extending angle-iron section 22$^b$.

Shafts 132 and 133 are rotated by bevel gears 134 and 135, respectively, co-acting with the respective bevel gears 136 and 137 secured to horizontal shaft 138, the ends of which are conveniently journaled in the horizontal transversely extending frame sections 18$^a$ and 18$^b$.

Upon manipulation of handwheel 139, suitably mounted on shaft 138 and fastened thereto by a set screw or pin, a change is made in the position of electrodes 91 and 92 with respect to the upper conveying surface of the belt 28. For example, upon rotating handwheel 139 in a clockwise direction, as seen from the left of Figure 5 looking along shaft 138, and consequent rotation of shaft 138 and its associated gears 136 and 137, there is imparted, through the respectively associated gears 134 and 135, a rotation in a clockwise direction to shafts 132 and 133, respectively.

Rotation of horizontal shafts 132 and 133 with their respective associated gears 130 and 131 co-acting with gears 128 and 129, respectively, gives a clockwise rotation of the respective elevation screws 124 and 125, as seen in a direction looking downwardly along the length of the screws. For an assumed right-hand threaded engagement between elevation screws and brackets, electrodes and supporting structure are then raised into a position illustratively shown in Figure 1.

In an analogous fashion manipulation of handwheel 139 in a counter-clockwise direction, as seen from the left of Figure 5 looking along its associated shaft 138, lowers electrodes into a position nearer the upper surface of conveyor belt. Thus, by manipulating handwheel 139, a precise setting of electrodes 91 and 92, and more particularly the extreme tip portions of their associated electrode members 115 and 112, respectively, above the upper conveying surface of belt 28, is achieved.

It may at this point be noted that as the electrode members are raised or lowered into positions more remote from or more adjacent to the conveyor, the motion is purely translatory in a direction perpendicular to the upper conveying surface of the belt; the raising or lowering of the electrodes is effected without changing their positions either longitudinally or transversely of the conveyor. A number of the particular advantages derived from this construction will appear more fully hereinafter in considering certain electrical actions and co-actions of and between the various parts of the apparatus hereinafter described.

Handwheel, elevation screws, threaded brackets and their associated interconnecting shafting and gearing are all for reasons of safety, convenience and economy in direct mechanical and electrical connection with the iron supporting framework which is preferably maintained at ground potential as diagrammatically indicated at 140 (Figure 1).

Electrodes 91 and 92, as above indicated, are maintained at a high electrical potential with respect to ground. Insulating supporting member 117 not only maintains the electrodes in spaced relation above the conveyor, but also maintains the electrodes at high electrical potential with respect to the grounded brackets and frame which in turn support the insulating member 117.

To give a firm and rigid support for the electrodes and at the same time to maintain them at their high electrical potentials, all without undue over-all size and weight of insulating material, the support 117 is cut in the form and manner described above and illustrated in Figure 7 to give a long electrical leakage path from the high potential electrodes to the grounded brackets.

Electrodes 91 and 92 are mounted by their associated metallic brackets 93 and 94, respectively (see Figures 1 and 3) at diagrammatically opposite points on the ring section 117$^a$ of the insulating support intermediate the junctions of loop portions 117$^b$ and 117$^c$ with ring portion 117$^a$. The path for the leakage flux for electrode 92 and its associated bracket 94 (see Figure 3) is along a portion of the ring 117$^a$, through points $v$ and $w$, then along both curved arms of the loop 117$^c$, and through points $x$, $y$ and $z$ to grounded bracket 119. Likewise the leakage flux from electrode 91 and its associated supporting bracket 93 maintained at high potential to the grounded supporting bracket 118 traverses similar parallel paths along the ring section 117$^a$ and the loop section 117$^b$.

Thus, a relatively long leakage path is provided for a desired height and width of insulating support, or for a desired length of insulating material calculated to withstand the high potentials employed at a maximum permissible surface leakage, a support of minimum over-all size and weight is achieved with a consequent saving in material and economy in manufacture. The extent of the reduction in over-all height and proportionate increase in the rigidity and stability of electrode mounting is gained by comparing the relatively short straight-line path between top of bracket 94 and bottom of bracket 119 with the length of path along the surface of insulating support 117 through points $v$, $w$, $x$, $y$ and $z$.

Cooperating with the electrodes 91 and 92 and spaced immediately beneath the upper part of conveyor belt 28 and the insulating sheeting 62 of the conveyor belt supporting structure 57 (Figure 1) are arranged preferably in the form of two right cylinders (Figure 2) 141 and 142 substantially coaxial with the electrodes 91 and 92, respectively, a suitable number of preferably identical electronic conduction devices 143. The extreme outside diameters of the cylinders 141 and 142 of electronic conduction devices are preferably equal to or slightly less than the diameters of the circles traced by the extreme tip portions of the outer rings of electrode members 115 and 102, respectively, as they are whirled above the conveyor (see also Figure 8), while the inner diameter of the cylinders of electronic conduction devices (as determined by the extreme diameters above mentioned less twice the cross-sectional width of the individual electronic devices comprising the cylinders) are substantially equal to or greater than the circular paths traced by the extreme tip portions of the inner rings of electrode members 115 and 102 on rotation of electrodes 91 and 92, respectively.

Preferably, the electronic conduction devices 143 are in the form of elongated cylindrical tubes of diameters substantially equal to the distance between the inner and outer rings of electrode members 115 and 102, and of such length that they are adapted to be conveniently received within the space between upper and lower sides of belt 28; illustratively the length is five or six times the diameter.

The various electronic conduction devices 143 are maintained in cylindrical groups 141 and 142 spaced from electrodes 91 and 92 respectively, as indicated above, by suitable racks 144 and 145 and their associated supporting yokes 146 and 147, respectively, preferably bolted to the side wall portions 64 and 65 of the conveyor belt supporting framework 58 (see Figure 2).

For reasons of simplicity and economy of construction, the cylindrical groups 141 and 142 of like electronic conduction devices 143 and their associated supporting structures 144—146 and 145—147 are preferably identical so that but the one group 142 and the supporting structure 145—147 is considered in detail.

Referring now more particularly to Figure 8 there is shown at 145 a circular rack preferably rotatably mounted and including illustratively a flat dish-shaped cast aluminum base 148 having a central hub portion 148$^a$ and an outer upturned rim portion 148$^b$, the outer periphery of which is provided with raised circumferential sections 148$^c$ and 148$^d$ to form a sheave, the purpose of which will appear more fully hereinafter.

Preferably made integral with the base 148 and spaced adjacent and including the outer upturned rim 148$^b$ thereof, are a number of individual socket wall portions 148$^e$ (see also Figure 2) which are adapted to receive the lower ends of electronic conduction devices 143 comprising the cylindrical group 142. The interior of the various sockets 148$^b$—148$^e$ is preferably enlarged and adapted to receive a ring 149 of yieldable material, such as felt or rubber, the upper edge of which contacts the lower edge of the inwardly extending rim 148$^f$ or reduced section of the socket which loosely receives an electronic conduction device 143. The ring 149 is forced upwardly against the inwardly extending rim 148$^f$ by a metallic circular band 150 loosely received within the socket which is held in position by a cup-shaped end-cap 151 threadedly engaging the lower slightly enlarged interior of socket 148$^b$—148$^e$.

Electronic conduction device 143 preferably includes a cylindrical thin-walled glass envelope 152, the upper closed end of which is dented in or recessed as at 152$^a$ lending strength and rigidity to the end closure. Sealed into the lower protruding end 152$^b$ of the glass envelope and preferably axial thereto is an electrode 153 having an enlarged metallic head portion 153$^a$ and a downwardly extending stem portion 153$^b$ of reduced size. The electrode 153 is partially supported by wires 154$^a$ and 154$^b$ (see also Figure 9) in their associated supporting ring portion 154$^c$ conveniently sealed into the protruding end portion 152$^b$ of the glass envelope.

The glass envelope preferably contains one of the noble gases, such as neon, at a pressure of illustratively 6 millimeters of mercury which is adapted to be ionized and rendered highly conductive when subjected to a sufficient high electrical potential gradient, as will more fully appear hereinafter.

The electrode stem 153$^b$ projects through a small hole portion 151$^a$ provided in the end cap 151 where it is bent over and fastened to the end cap by a suitable screw 155 after the electronic device is properly positioned within the socket.

In positioning the electronic device in its socket so that it is firmly held against lateral displacement in spite of slight shocks and jars that may be encountered in actual use, ring 149 of yieldable material is expanded in a radial direction so as to tightly press against the wall of the electronic device adjacent its lower portion by screwing up end cap 151 and forcing the circular band 150 to compress the ring 149 in an axial direction.

To maintain the various electronic conduction devices 143 in upright positions with their axes parallel to the central axis of the cylindrical group or arrangement of electronic conduction devices generally shown at 142, a short insulating tubular section 156, preferably of a material such as dielecto or laminated bakelite having high electrical insulating properties coupled with mechanical strength, is axially mounted on hub 148$^a$ of the base plate 148 and supports the flat circular disk 157 (in a plane substantially perpendicular thereto) of insulating material, such as dielecto or laminated bakelite, the central portion of which is recessed as at 157$^a$ and adapted to snugly fit a reduced end section 156$^a$ of the central tube 156 and be fastened thereto by a suitable pin or set screw 158, and the outer rim of which is provided with a suitable number of spaced hole portions 157$^b$ which are adapted to snugly receive the upper portions of the electronic conduction devices.

The central tubular member 156 of the electronic conduction device supporting rack 145 is mechanically supported by and electrically insulated from the metallic base plate 148 by the insulating bushing 159 conveniently formed of molded bakelite. Bushing 159 snugly fits the outer periphery of hub portion 148$^a$ of the metallic base plate 148 and is mechanically fastened thereto by suitable screws 161 spaced about the outer rim portion of bushing 159, the lower end of which is undercut as at 156$^b$ and snugly fits over the upper cylindrical part of bushing 159 to which it is fastened by suitable screws 160.

The various electronic conduction devices 143 are adjusted in rack 145 so that their upper closed end portions just clear the lower surface of the solid dielectric plate 68 supporting the upper part of the conveyor belt 28 within the region immediately beneath electrode 92. They are maintained in this position by the stem portion or terminal 153$^b$ of the electrode which, as above-mentioned, is brought out and fastened to the end cap 151 so as to effectively prevent movement of the device in either an upwardly or downwardly direction. The electronic conduction devices are further held in proper position as above-mentioned by the gripping action of the yieldable rings 149 included within each socket.

Rack 145 with electronic conduction devices 143 arrayed in a cylindrical formation about its outer portions is preferably rotatably mounted on a short upstanding shaft 162, the lower end of which is received within the central portion 147$^a$ of an H-shaped yoke, preferably of cast aluminum, the ends of the arms 147$^b$ of which are illustratively crooked upwardly and bolted to the lower edges of the insulating side members 64 and 65 of the conveyor belt supporting structure 57. The central portion of yoke 147$^a$ is preferably provided with a raised collar 147$^c$ integral therewith, upon the upper edge of which rests a branch or shoulder portion 162$^a$ of the shaft 162; permanent connection between shaft and yoke being achieved preferably by horizontal pins 163.

Shaft 162 is provided with an upper reduced portion 162$^b$ which receives the inner race 164$^a$ of the upper ball bearing assembly 164 preferably of a semi-thrust construction. The inner race is secured to the shaft by a nut 165 which holds the race against a shoulder portion 162$^c$ of the shaft. The outer race 164$^b$ of the ball bearing assembly is received within a recessed portion 148$^g$ of the hub portion 148$^a$ of base plate 148 and is maintained securely therein by end cap 166 which threadedly engages an upper interiorly-threaded portion of hub 148$^a$. End cap 166 is interiorly cupped so as to permit free movement with respect to nut 165 and the upper end of shaft 162. Shaft 163 is provided with an additional reduced portion 162$^d$ upon which is mounted the inner race 167$^a$ of the ball bearing assembly 167 in a pressed-fit relation, the outer race 167$^b$ of which is tightly received within a recessed portion 148$^h$ of the hub portion 148$^a$ of base plate 148.

Roller bearing assembly 167 preferably has semi-thrust characteristics and sustains part of the weight of the array of electronic conduction devices and their supporting rack 145; the upper end of recessed portion 148$^h$ resting directly on the upper edge of the outer race 167$^b$ of the lower ball bearing assembly. Lower ball bearing assembly 167 is preferably rendered dust-tight and grease-tight by a dust ring 167$^c$ preferably including a felt ring, the inner periphery of which rides upon the outer periphery of the inner race 167$^a$ of the ball bearing assembly, and the outer periphery of which is preferably received within a recessed portion 167$^f$ of the outer race 167$^b$ and maintained tight in this position by a spring ring 167$^d$ seated within a circumferential groove 167$^e$.

Thus, the cylindrical array of electronic conduction devices is securely supported and adapted to be rotated about an axis coincident with the axis of rotation of electrode 92 and with the extreme upper ends of the electronic devices moving in a common plane substantially parallel to that of the extreme tip portions of electrode members 102 and to the upper conveying surface of belt 28.

It may at this point be noted that the above-described rack and rotatable mounting therefor permits a maximum length of electronic conduction device between upper and lower sides of belt 28, or for a desired size and length of electronic conduction device enables a minimum size of driving and driven pulleys 27 and 29, respectively; the lower side of belt 28 passes in a return direction just clear of the lowermost portions of the supporting yoke 147 to permit a generally compact and rigid construction which, furthermore, is extremely light in weight and well adapted to be supported by the light insulating conveyor belt supporting structure 57.

As mentioned above, the cylindrical array 141 of electronic conduction devices 143 mounted in rack 144 and supported by yoke 146 are preferably of identical construction to the cylindrical array of electronic conduction devices 143 mounted in rack 145 and supported by yoke 147, all as more particularly described above.

The electronic conduction devices or gaseous conduction devices thus constructed are preferably rotated in opposite directions (see Figures 1 and 2) conveniently by an electric motor 168 illustratively of the single phase induction type which is conveniently bolted to an outwardly projecting arm portion 24e preferably made integral with the upstanding support 24.

Mechanical driving energy is conveniently transmitted to electronic conduction device rotor assemblies 141—144—146 and 142—145—147 by a belt 169 of high electrical insulating characteristics, such as a cotton fabric, which is received within sheaves or circumferential groove portions of racks 144 and 145, the detailed construction of which is more particularly set forth above, the belt preferably crossing over at a point t between rotor assemblies so as to rotate them in opposite directions.

Motor 168 is preferably driven (upon being energized in a manner described more fully hereinafter) in a counter-clockwise direction, looking downwardly on the motor as seen in Figure 2, and transmits motion by belt 169 to electronic conduction device rotor assemblies 141—144—146 and 142—145—147 in counter-clockwise and clockwise directions, respectively.

The directions of rotation of the respective electronic conduction device rotor assemblies are preferably opposite to those of their respective associated rotating electrodes spaced above the conveyor; rotation of the electronic conduction device rotor assemblies is preferably relatively slow giving them a peripheral velocity of about 500 feet per minute. The advantages of rotating the electronic conduction device rotor assemblies will appear more fully hereinafter in considering certain electrical actions and effects on the product to be treated as it is conveyed through the region between the rotating electrodes maintained at a high electrical potential and their respectively associated electronic conduction device rotor assemblies.

Under operating conditions of the treating apparatus electronic conduction devices 143 become ionized, in a manner more fully described hereinafter, and emit a dull red-orange glow (for neon) indicating that the tube is functioning properly. In order that the devices may be observed, the downwardly extending side members 64 and 65 of the conveyor belt supporting structure 57 are provided with apertures 64a and 65a, respectively, adjacent electronic conduction device rotor assembly 141—144—146 (see Figure 6) and apertures 64b and 65b adjacent electronic conduction device rotor assembly 142—145—147 (see also Figure 8).

A defective electronic conduction device may be readily detected by an absence of the above-mentioned glow of the device and a replacement of the defective electronic conduction device may then be made. In effecting the replacement of an electronic conduction device 143, the edge of the lower side of conveyor belt 28 immediately beneath the defective device is pushed clear of the space immediately beneath the particular socket supporting the defective device; the belt being of such length and physical characteristics as to permit the distortion indicated.

End cap 151 associated with socket 148b—148e (see Figure 8) holding the defective device 143 is then unscrewed from the lower portion of the socket and tube 143 is withdrawn or pulled down through the socket and taken out beneath the conveyor belt supporting structure 57, sufficient working space being provided between the arms of yoke 147. A replacement of the defective electronic conduction device is effected in a substantially reverse order, care being taken, as mentioned above in connection with the initial mounting of the electronic conduction devices in their respective sockets, that the upper end of the replaced device be properly spaced from the solid dielectric sheet 68. Thus, a defective conduction device may be readily detected and quickly and effectively replaced with a minimum expenditure of effort and with a minimum shutdown of the apparatus, all with a minimum change, alteration or disturbance of other parts of the apparatus.

As mentioned above, the lower base plates of the racks supporting the various electronic conduction devices are preferably made of metal, as well as the supporting shafts, bearings and yokes, so that paths of good electrical conductivity are provided from the various electrodes of the electronic conduction devices, through the parts above-mentioned including the electrically conductive metallic end caps to which the electrodes are directly connected, to the supporting yokes.

The electrical discharge path from the high potential electrodes 91 and 92 to ground includes condensers 170 and 171 (see Figures 2 and 3), one side of which is directly connected to ground, while the other side is connected by way of the above-mentioned electrically conducting yokes to the electronic conduction device rotor assemblies associated with the high potential electrodes.

Condensers 170 and 171 are preferably of identical construction and to reduce size and over-all height of the apparatus are preferably mounted in substantially vertical positions on opposite sides of the conveyor. To effect an economy in manufacture, a saving of material, and a general reduction in the over-all size of apparatus, the sheet metal walls 172 and 173 of the casing or housing for the treating apparatus (which are respectively fastened to upper and lower angle-iron sections 21a and 10b, and vertical channel-iron sections 16a and 16d, and to upper and lower angle-iron sections 21$^b$ and 10$^e$, and vertical channel-iron sections 16$^b$ and 16$^c$ by suitable screws or bolts) form the one or grounded plates of condensers 170 and 171, respectively. Spaced adjacent walls 172 and 173 and preferably parallel thereto are illustratively rectangular plates 174 and 175, respectively, conveniently 2 feet in width by 3½ feet in height forming with the adjacent walls the respective air condensers 170 and 171.

Plates 174 and 175 are preferably of identical construction including a sheet of flat illustratively rectangular (see also Figure 1) inexpensive electrically conductive material 174$^a$ and 175$^a$, such as sheet iron, preferably stiffened and maintained substantially flat by rectangular illustratively channel-iron, frame sections 174$^b$ and 175$^b$, respectively, to which they are preferably welded. Plates 174 and 175 are preferably mounted on right-angle brackets 176 and 177 to which they are conveniently welded.

Brackets 176 and 177 are fastened to opposite ends of the flat horizontally extending insulating beam 178 which in turn is supported by the downwardly extending side portions 64 and 65 of the conveyor belt supporting structure 57; the beam being snugly received within suitable apertures 64$^c$ and 65$^c$ in the respective side members. To resist downward bending under the weight of condenser plates 174 and 175 and their associated brackets 176 and 177, beam 178 is preferably supported in an edgewise horizontal position.

Brackets 176 and 177 are preferably slotted as at 176$^a$ and 177$^a$ and adapted to receive bolts 179 by which they are secured to opposite ends of cross-beam 178. By loosening the bolts, either or both condenser plates 174 and 175 may be moved more nearly adjacent to or more remote from walls 172 and 173, respectively, with which they form the electrical condensers 170 and 171. In accordance with the more nearly adjacent positioning of the condenser plates or the more remote positioning, the capacities of the condensers are increased or decreased proportionately.

Electrical connection between plates 174 and 175 of the respective condensers 170 and 171 (the other plates 172 and 173 of which are preferably grounded to the frame, as indicated above) are preferably connected by way of metal braces 180 and 181 to yokes 147 and 146, respectively, which in turn, as mentioned above, are directly connected to the electronic conduction device rotor assemblies 142—145—147 and 141—144—146.

One each of each of the braces 180 and 181, conveniently formed of cast aluminum, is preferably bolted to the downwardly extending insulating side members 65 and 64, respectively, of the conveyor belt supporting frame 57 where they are each received on bolts common to an arm of the H-shaped brackets 147 and 146, respectively. The other ends of the braces 180 and 181 are fastened to the ends of the insulating cross-beam 178 where they are received on bolts 179 common to right-angle brackets 176 and 177, respectively. Braces 180 and 181, in addition to serving as electrical conductors between the condensers 170 and 171 and the respective electronic conduction device rotor assemblies, act as braces lending additional mechanical support to the movable condenser plates 174 and 175 against horizontal forces tending to displace the condenser plates either longitudinally or transversely of the general treating apparatus.

The electrical condensers 170 and 171 illustratively described above, act in the high potential load circuit including electrodes 91 and 92 and their associated spaced electronic conduction device rotor assemblies 141—144—146 and 142—145—147, respectively, in a manner described more fully hereinafter, which is productive of results and advantages, a number of which are set forth below.

Across the above-mentioned load circuit including electrodes 91 and 92 and the grounded condenser plates 173 and 172 of condensers 171 and 170, respectively, there is applied high potential electrical energy, illustratively 150,000 volts at 750 cycles per second. This preferably high potential electrical energy at a relatively high frequency is illustratively obtained by way of a high potential electrical transformer 182 conveniently mounted in a vertical position (see Figure 1) with its high potential terminal 184 extending downwardly and preferably substantially coaxial with the insulating supporting member 117 which maintains electrodes 91 and 92 in spaced relation above conveyor belt 28.

Since the high potential transformer per se forms no part of the present invention, a detailed description of its construction will not be made; the construction, however, preferably includes a cylindrical tank 183 to one end of which is suitably mounted on high potential terminal 184, a low potential terminal 185 (see also Figure 18) and a second pair of low potential terminals 186 and 187. Enclosed within the transformer tank 183 is illustratively an auto-transformer winding diagrammatically shown at 188, one end of which is grounded to tank 183 by way of conductor 189, and the other end of which is connected by way of conductor 190 to contact 184$^a$ of the high potential terminal 184. A tap is taken off transformer winding 188 adjacent the grounded end thereof and connected to the low potential terminal 185 by way of conductor 191; the transformer winding section 188$^a$ included between conductors 189 and 191 forms the low potential transformer primary winding, while the complete winding 188 between grounded conductor 189 and high potential conductor 190 forms the high potential transformer secondary winding.

Enclosed within the tank or casing 183 is a second transformer 192 preferably of the high potential insulating type, a detailed description of which will not be given since this transformer per se forms no part of the present invention.

The insulating transformer includes, however, a primary winding 192$^a$ connected by way of conductors 193 and 194 to low potential terminal members 186 and 187, respectively, and a secondary winding 192$^b$, one end of which is connected to high potential conductor 190 and thus to contact 184$^a$ of the high potential terminal 184, while the other end is connected by way of conductor 195 to a second contact 184$^b$ of the high potential terminal.

The transformer 182 thus mounted in a vertical position (with its high potential terminal 184 illustratively extending downwardly with its two equalizing rings 184$^c$ and 184$^d$ so proportioned and spaced within the insulating support 117 as to be free and substantially concentric with it in various raised positions of the support) and with its lowermost end portion adjacent electrodes 91 and 92, is preferably connected to the electrodes by way of a substantially vertical tubular metallic riser 197 (see Figure 1), the upper end of which is fastened to contact 184ª forming part of terminal 184, and the lower end of which is threaded into a metallic T-fitting 198.

A flexible metallic conduit 199 has one end fastened to T-fitting 198, while the other end is secured to a metallic collar 200 (see also Figure 6) which is mounted on one of the parallel metallic tubular brace-conductors 122. Thus, a mechanically flexible electrical connection is provided between one of the above-mentioned contacts of high potential terminal 184 and the electrically conductive tubular member 122 which, as previously mentioned, is in intimate electrical contact with electrode supporting brackets 93 and 94, respectively associated with electrodes 91 and 92 by way of their respective supporting shafts 95 and 96.

Vertical riser 197 is preferably of such length that it maintains the T-fitting 198 at a position substantially midway between the highest position of tubular member 122 corresponding to the upper limit of electrodes 91 and 92 in their raised positions above the conveyor and the lowest position of tubular member 122 corresponding to the lower limit of the electrodes in their extreme lowered positions above the conveyor.

Thus, a minimum length of flexible conduit 199 is used to permit free raising and lowering of electrodes 91 and 92, the manner of which is more particularly set forth above, and assures a freedom from the obstruction of rotating electrodes 91 and 92 throughout the complete range of elevation settings of the electrodes.

Flexible conduit 199 in addition to serving as a conductor included in the electrical connection between one of the contacts associated with the high potential terminal and the electrodes, as more particularly set forth above, acts as a housing or protective sheath along with T-fitting 198 and collar 200 for a conductor 201 one end of which is electrically connected to contact 184ᵇ associated with the high potential terminal.

Conductor 201 upon reaching the hollow tubular conductor 122 continues as parallel branches 201ª and 201ᵇ (see Figure 6) through suitable channels provided in electrode supporting brackets 93 and 94 where they are connected with the induction motors associated with each of the electrodes 91 and 92. For the electrode 92, conductor 201ª is taken through a suitable hole portion 122ª of the conducting tubular member 122, and a channel portion 94ᵉ of the bracket 94 supporting electrode 92, to an enlarged chamber portion or outlet 94ʰ therein where it is conveniently spliced to conductor 114 which is taken from one terminal of the driving motor 109 associated with electrode 92 by way of channels 96ᶠ in the stem or shaft 96 rotatably supporting electrode 92, and hole and channel 94ª and 94ᶠ of the bracket to the enlarged chamber 94ʰ. In like fashion branch conductor 201ᵇ is taken through similar holes and channels to a chamber portion 93ᶠ of bracket 93 where it is conveniently spliced to a connector or lead from the drive motor associated with electrode 91.

Thus, electrical connection is established from contact 184ª of high tension terminal 184 by way of vertical riser 197, T-fitting 198, flexible conduit 199, collar 200, horizontal conducting tubular member 122, metallic bracket 94, shaft or stem 96, electrode 92 to the one terminal of the electrode driving motor which is connected to the electrode housing, as more particularly set forth above (for the electrode 91, the electrical circuit proceeds from the horizontal conducting member 122 by way of metallic bracket 93, stem or shaft 95, electrode 91 to one terminal of the driving motor associated with this electrode), and from contact 184ᵇ of the high potential terminal 184 by way of conductors 201—201ª—114 (by way of conductor 201ᵇ and the connector or lead taken to the driving motor associated with the electrode 91) to the other terminal of the driving motor associated with electrode 92.

The parallel conductive paths from contact 184ª of the high potential terminal of transformer 182 to the electrodes 91 and 92 serve as a medium for conveying electrical energy to the above-mentioned high potential load circuit including electrodes 91 and 92, electronic conduction device rotor assemblies 141—144—146 and 142—145—147, and condensers 171 and 170 in addition to their serving as a conductive medium to the terminals of the driving motors associated with the electrodes which are connected to the electrode housings.

Single phase alternating current preferably taken from a line to line connection from the three-phase source of alternating current 202 (see Figure 18), illustratively 220 volts at 60 cycles, is supplied to insulating transformer 192 included within transformer 182 by way of suitable connections, to be hereinafter more fully described, taken to the low potential terminals 186 and 187 mounted on the transformer tank 183 as mentioned above.

Insulating transformer 192 is preferably of a 1:1 ratio so that alternating current illustratively at 220 volts 60 cycles is supplied the driving motors associated with electrodes 91 and 92, as will hereinafter more fully appear upon completion of the electrical circuit between the commercial source of alternating electrical energy and the transformer.

The electrical circuit for supplying driving energy to electrodes 91 and 92 from insulating transformer 192 may be traced as follows: from one end of secondary winding 192ᵇ, by way of conductor 190, terminal contact 184ª, flexible conduit 199 and its associated fittings 197, 198 and 200, tubular conductor 122, bracket and shaft 94 and 96 to the housing of electrode 92 to which one end of the motor winding is connected, through the driving motor winding then by way of conductors 114 and 201 to the terminal contact 184ᵇ (from tubular conductor 122, by way of bracket 93 and shaft 95 to the housing of electrode 91, the driving motor associated therewith, and by way of conductors 201ᵇ and 201 to the contact 184ᵇ) of the high potential terminal 184, thence by way of conductor 195 back to the other end of the secondary winding 192ᵇ of the insulating transformer.

High potential transformer windings 188 included within transformer 182 are preferably supplied with alternating electrical energy, illustratively at 550 volts, 750 cycles, as will appear more fully hereinafter. The input or supplied alternating electrical energy is transformed in the windings 188 to electrical energy at illustratively 150,000 volts at 750 cycles which is impressed between electrodes 91 and 92 and the grounded frame of the electrical apparatus.

The electrical circuit for the high potential energy may be traced as follows: from the high potential end of winding 188 by way of conductor 190, flexible conducting conduit 199 and its associated fittings 197, 198 and 200, then by way of tubular conductor 122, conducting bracket and shaft 94 and 96 to the housing of electrode 92, (by way of tubular conductor 122, bracket and shaft 93 and 95 to the housing of electrode 91), then through the parallel load circuits including electronic conduction device rotor assembly 141—144—146 and condenser 171 (for electrode 91) and electronic conduction device rotor assembly 142—145—147 and condenser 170 (for electrode 92) to the grounded frame of the electrical apparatus and by way of conductor 189 to the grounded end of transformer winding 188.

It may at this point be noted that the secondary winding 192$^b$ of the insulating transformer is directly connected to conductor 190 and thus maintained at a high potential with respect to ground, illustratively 150,000 volts, while the primary winding 192$^a$ of the transformer, for reasons of safety of operation and economy in construction, is maintained at a maximum potential with respect to ground of but illustratively 220 volts. The primary and secondary windings of insulating transformer 192 thus need be insulated from each other so as to withstand the full potential difference or the full high potential of transformer windings 188, illustratively 150,000 volts. Since the insulating transformer per se forms no part of the present invention, as above-mentioned, a detailed description of its construction will not be made.

High potential transformer winding 188 is supplied with electrical energy, illustratively 550 volts at 750 cycles, preferably by way of a motor-generator set 203 (see Figures 1, 3, 5 and 18) which preferably includes a 550 volt, 750 cycle alternator 204 having an illustratively, built-in direct current exciter 205 directly coupled, as at 206, to a driving motor 207 conveniently of the three-phase alternating current induction type and adapted to be driven from the three-phase source of 220 volt 60 cycle alternating current diagrammatically shown at 202 (Figure 18), as will more fully appear hereinafter.

Alternator 204 and its driving motor 207 are preferably directly bolted to the horizontal angle-iron sections 17$^e$ and 20$^b$ forming part of the fabricated framework of the electrical treating apparatus.

Mounted adjacent the motor-generator set 203 is an alternator field rheostat 208 conveniently supported on horizontally extending angle-iron sections 20$^b$ and 17$^f$ of the apparatus framework and suitably fastened thereto by screws or bolts, the purpose of which will appear more fully hereinafter.

Induction motor 207 is conveniently supplied with three-phase alternating current from the illustratively three-phase, 60 cycle, 220 volt source 202 in a manner described more fully hereinafter; the supply energy is conducted to a suitable terminal board diagrammatically indicated at 207$^a$ (see Figure 18) associated with the motor.

Upon energization of induction motor 207, in a manner described more particularly hereinafter, mechanical driving energy is transmitted by motor and generator drive shafts, interconnected by coupling 206, to generator or alternator 204 and the exciter 205.

The direct current exciter 205 preferably has a field rheostat 209 included between its armature terminal 205$^b$ and field terminal 205$^c$ so that the line potential applied across armature terminals 205$^b$ and 205$^d$ may be readily controlled. The one armature terminal 205$^d$ is directly connected by way of conductor 210 to a direct current field terminal 204$^b$ of the generator or alternator 204. Armature terminal 205$^b$ of the exciter is connected by way of conductor 211 to one terminal of the alternator field rheostat 208. The other terminal of the field rheostat is connected by way of conductor 212 to the other direct current field terminal 204$^c$ of the alternator. The alternating current output of generator 204 is conveniently taken from terminals 204$^d$ and 204$^e$ of the terminal board 204$^a$ by way of suitable conductors 213 and 214, respectively, of the input portion 188$^a$ of the high potential transformer generally shown at 182, as will hereinafter more fully appear.

Alternator 204 is preferably of a comparatively cheap construction in order to reduce the total manufacturing cost of the apparatus, and consequently produces alternating current at the illustratively relatively high frequency of 750 cycles per second containing numerous harmonics of the base frequency.

To prevent excessive copper and iron losses in the high potential transformer 182, or to obtain more efficient operational characteristics of the transformer, a good portion of the higher harmonics are preferably filtered out leaving a more nearly sinusoidal input current for high potential transformer 182.

The filter circuit by which many of the objectionable harmonics of the input current are eliminated preferably includes a condenser or permittor 215 which is directly shunted across supply conductors 213—214 by way of conductor 216 connected to terminal 215$^a$ of the condenser, and conductor 217 connected to the grounded condenser tank forming the other terminal.

Permittor 215 is preferably supported by brackets 218 conveniently welded to the tank or container portion of the permittor and conveniently bolted to the horizontal angle iron frame member 22$^c$ (see also Figure 5).

The filter circuit also includes a filter coil diagrammatically indicated at 219 preferably in the form of an iron core choke coil which is preferably directly connected in series with the supply line 213 between alternator 204 and transformer 182.

Alternating current at, illustratively, 550 volts, 750 cycles is supplied the input of primary winding 188$^a$ of transformer 182 by alternator 204, the circuit of which may be traced as follows: From one terminal 204$^d$ of the alternator by way of conductor 213, low potential transformer terminal 185, conductor 191, to one end of the primary winding 188$^a$ of the high potential transformer, and from the other end of the winding 188$^a$ by way of conductor 189 to the transformer tank suitably grounded at 140 which is connected by way of conductor 214 to the terminal 204$^e$ of the alternator.

The impedance of the filter or choke coil 219 is increasingly great for the higher harmonics of the base frequency, while the permittor 215 (directly shunted across the supply circuit, as above-described) affords a path of increasingly less impedance for the higher harmonics to ground. As a result of combined action of filter coil 219 and permittor 215 illustratively comprising the filter circuit, a large proportion of the objectionable higher harmonics of the input or supply current to the transformer are successfully excluded from the transformer 182 as by directly shunting them to ground. Thus, in a simple, direct and economical manner electrical energy at a relatively high frequency, at a convenient voltage, and of a satisfactory wave form is supplied the high potential transformer 182 by which, as more particularly set forth above, it is transformed to high potential electrical energy illustratively at 150,000 volts and is supplied between electrodes 91—92 and ground.

As a result of various electrical characteristics of the high potential transformer winding 188, such as distributed capacities between adjacent turns of the winding, adjacent layers of the winding, and the like, the reactance of transformer 182 is largely capacitive. In order to better the power factor of the energy supplied the transformer and to improve the general operating conditions of the transformer, as well as of the supply alternator, an inductive load, illustratively in the form of an iron core choke, diagrammatically indicated at 222, is connected in parallel or in shunt with the transformer; one end of the inductive load 222 is directly connected to the supply line 213—219—220—221, conveniently at 221, while the other end is connected by way of conductor 223 to conductor 214 and to ground illustratively shown at 140.

Inductive load coil 222 and filter coil 219 are preferably housed within a single metallic casing or housing 224 conveniently mounted on a flat horizontal piece of sheet iron 225 (see Figure 1) preferably secured to horizontal angle-iron sections 17$^b$, 17$^c$, 22$^c$, 22$^d$, 19$^c$ and 19$^c$ of the fabricated framework by suitable screws forming part of the casing or housing for the electrical treating apparatus; the box-like casing for the choke coils is conveniently provided with feet upon which it rests and which are fastened to the horizontal sheet 225 by suitable screws or bolts (see also Figure 5).

The various individual devices including motor 207, generator 204, rheostat 208, permittor 215 and load coil and choke coil housing 224 are so mounted on top of the fabricated framework of the electrical treating apparatus as to lend a neat, trim appearance to the entire apparatus and to be in positions permitting easy access for maintenance and control purposes.

As more particularly set forth above, electrodes 91 and 92 are maintained at a high electrical potential with respect to the grounded framework of the apparatus. The approximate potential difference between electrodes and ground is preferably determined by a volt meter 226 directly connected by way of conductors 227 and 228 between the input terminal 185 of the high potential transformer 182 and ground 140 (see Figure 18) which is conveniently calibrated to read directly in terms of the high potential output of the transformer.

Considering now the electrical treatment or sterilization of a packaged product, illustratively corn-meal put up in packages or cartons of, for example, paste-board or heavy paper illustratively 2 inches by 4 inches by 6 inches, several of the packages are placed flat upon the upper conveying surface of belt 28 immediately beneath electrodes 91 and 92 thus giving a perpendicular height of packaged product of 2 inches. In furtherance of setting the apparatus to give highly efficient treatment, as will more fully appear, electrodes 91 and 92 are lowered by proper manipulation of handwheel 139, in a manner more particularly set forth above, so that the extreme tip portions of electrode members 115 and 102 associated with electrodes 91 and 92, respectively, which, as above-mentioned, preferably lie in a common plane parallel to the upper conveying surface of belt 28, are spaced above the upper surfaces of the packages or cartons approximately three-eighths of an inch for the above-mentioned packaged product.

Condensers 171 and 170 included in the parallel load circuits of electrodes 91 and 92, respectively, are set at values preferably equal to limit the load current to safe and practical values, as will appear more fully hereinafter, by suitably adjusting the movable rectangular plates 175 and 174, respectively, in a manner more particularly described above, so that they are spaced approximately 4 inches from their respectively associated grounded plate members 173 and 172.

Across the parallel load circuits from electrodes 91 and 92 and including condensers 171 and 170, respectively, there is impressed a high electrical potential, all as more particularly set forth above, upon energizing motor 207 of the motor-generator set 203 from the commercial source of supply 202 in a manner more particularly described below. By proper manipulation of the generator or alternator field rheostat 208, as by cutting in or cutting out resistance included in series with the alternator field, the alternator potential applied to the primary portion of the winding 188 of high potential transformer 182 is correspondingly decreased or increased thus proportionately changing the high potential output of the transformer.

For the various dimensions, materials and relative proportions of the apparatus illustratively set forth above, and for the assumed packaged corn-meal to be treated, the terminal voltage of the high potential transformer 182 is brought up to 150,000 volts (conveniently measured by observing volt meter 226) illustratively, by proper manipulation of alternator field rheostat 208, as above set forth; the proper voltage adjustment is preferably made with the conveyor belt 28 free from packaged products.

Upon energizing the driving motors associated with electrodes 91 and 92 preferably by way of insulating transformer 192, as more particularly set forth above, (the energization of which in turn is more fully described hereinafter), electrodes 91 and 92 are rotated preferably in opposite directions, the purpose of which will appear more fully hereinafter, with their various associated electrode members whirling along circular paths at a rate illustratively 4,500 feet per minute.

Into the regions immediately beneath the oppositely rotating electrodes 91 and 92 maintained at a high electrical potential is consecutively conveyed by belt 28, the product to be treated, illustratively packaged corn-meal, preferably in two parallel lines moving from right to left, as seen in Figure 1, upon energizing the conveyor belt driving motor 42, in a manner described hereinafter.

Assuming first a situation where the conveyor belt 28 is free from materials, articles or products to be treated, there is in the load circuit of the high potential transformer 182 a number of parallel capacities each made up of series capacities corresponding to the number of electrodes employed, illustratively two. For present purposes, it will be sufficient to consider the action that takes place in but one of the parallel branches of the load circuit proceeding from only one of the electrode structures since this action, except for certain features employed to cope with special pecularities met with in practise, as will hereinafter more fully appear, is the same for both of the electrodes employed.

Considering now that branch of the load circuit proceeding from electrode 92 and including electronic conduction device rotor assembly 142—145—147 and condenser 170 across which is impressed the high potential transformer 182 illustratively 150,000 volts at 750 cycles.

Since the lower part of electrode 92 and more particularly the extreme tip portions of the various electrode members 102 associated with electrode 92 terminate in sharp points (see Figures 8 and 10), the potential gradient in the ambient air immediately adjacent and beneath the extreme tip portions of these various electrode members is relatively high. As a result of this high potential gradient, the ambient air immediately adjacent the extreme tip portions of the electrode members breaks down or ruptures locally giving rise to many fine corona streamers which project downwardly and outwardly from the lower points of the electrodes in an umbrella-like distribution terminating on the upper surface of the solid dielectric or illustratively Pyrex glass plate 68 immediately supporting conveyor belt 28 within this region.

It may at this point be noted that while the height of the electrodes above the conveyor structure, the capacity setting of the load condensers, and the terminal voltage of the high potential transformer impressed across the load circuit are preferably so proportioned (illustratively assuming the values above set forth) that the ambient air ruptures locally and gives rise to the many fine corona streamers mentioned above prior to the introduction of a product to be treated within the region immediately beneath the electrodes, an efficient treating region may nevertheless be had, as will hereinafter more fully appear, with the above-mentioned variables so proportioned that the ambient air is not already locally ruptured prior to the introduction of the product to be treated into the region beneath the electrodes.

Considering now certain electrical actions taking place in that branch of the load circuit proceeding from electrode 92, it should first be noted that as a result of the potential difference between the extreme upper end and the extreme lower end of the electronic conduction devices 143 arrayed in the cylindrical formation 142, the gas, illustratively neon, within the devices becomes ionized (emitting, upon energization, a red-orange glow, as mentioned above, thus giving a visible indication of the proper operation of the particular device, the advantages of which are more particularly set forth above), and that the various electronic conduction devices become in effect fairly good conductors of electricity.

Ionization of electronic conduction devices 143 is productive of a number of interesting effects, one of which is an immediate collapse of the stray fields or leakage electrostatic fluxes adjacent the electronic conduction devices due to the greatly increased conductivity of the region localized by the electronic conduction devices. The partial elimination or reduction of leakage flux gives rise to a higher operating efficiency of the treating apparatus and permits a corresponding reduction in the operating power required, size and cost of equipment, and the like. Another effect produced as a result of the ionization of electronic conduction devices arrayed in a cylindrical formation is the partial collapse of the umbrella-like formations or tufts of corona streamers projecting downwardly from the extreme tip portions of the various electrode members associated with electrode 92. The partial collapse of the widespread tufts of corona streamers takes place largely in a direction radial to the common axis of electrode 92 and cylindrical array 142 of electronic conduction devices 143 due to the comparatively highly conductive effective wall formed by the cylindrical array of electronic conduction devices.

In the circumferential direction there will be a lesser tendency for the tufts of corona streamers to collapse, nevertheless, due to the proximity of the upper end of the effective cylinder of comparatively great conductivity there will be a partial collapse of the tufts of corona. The tufts of corona streamers projecting downwardly from the various electrode members associated with electrode 92 thus become somewhat fan-like or brush-like in shape terminating on the upper surface of the solid dielectric plate 68 as mentioned above.

These various somewhat fan-like or brush-like shaped corona formations are inclined to be somewhat unsymmetrical in shape and are further reduced in thickness in a radial direction or further collapsed and made more concentrated as a result of the relative locations in the circular paths or orbits described by the extreme tip portions of the inner and outer rings of electrode members with respect to the upper end of the effectively cylindrical array of electronic conduction devices; that is, as a result of the substantial alignment of the inner orbit of the extreme tip portions of the inner ring of electrode members with the inner effective cylindrical wall of the array of electronic conduction devices, and the outer orbit of the extreme tip portions of the outer ring of electrode members with the outer wall of the cylindrical array of electronic conduction devices. These effects are intensified as a result of the depressed upper end portion of the various electronic conduction devices since this construction tends to give more pronounced inner and outer upper edge portions of the effective conductive cylinder.

As a result of the use of the cylindrical array of electronic conduction devices positioned with respect to the various electrode members associated with electrode 92, all as more particularly set forth above, the brush-like tufts of corona streamers projecting downwardly from the various electrode members are greatly concentrated. Furthermore, the partial collapse of the broad umbrella-like or brush-like distribution gives a uniform field so that various cross sections taken in planes substantially parallel to the upper conveying surface of the conveyor belt at various points between the belt and the extreme tip portion of the electrode members are substantially equal in area; thus, the average current density of a tuft of corona streamers is substantially equal at various points taken along the perpendicular height of the tuft. Due to the highly concentrated nature of the tufts of corona streamers, and appreciable reduction of the stray or leakage fluxes, the current density of the corona discharge is substantially equal taken at various points in any one of the above-mentioned assumed cross-sections of a tuft of corona streamers.

Thus, as a result of the cooperation between the cylindrical array 142 of electronic conduction devices 143 and the concentric rings of electrode members 102 associated with electrode 92, a region is formed of two substantially concentric rings of individual tufts of corona streamers or intense brush-like electrostatic fields highly concentrated and of substantially uniform current density throughout. These substantially concentric rings of individual tufts of intense electrostatic fields projecting downwardly from the extreme tip portion of the concentric rings of electrode members associated with electrode 92 are rapidly rotated with the electrode illustratively at a peripheral speed of 4,500 feet per minute in a counter-clockwise direction looking down upon the conveyor, and forms one of the treating zones into which the product to be treated is conveyed for treatment.

The corona streamers projecting downwardly from the extreme sharp tip portion of the various electrode members largely appear during that portion of the cycle of the alternating impressed high potential when the electrode is at a negative potential and the electronic conduction devices are positive with respect thereto. When the cycle is reversed, that is, when the electrode members are positive with respect to the electronic conduction devices, positive beads appear on the sharp extreme tip portions of the electrode members. During this portion of the cycle when the electronic conduction devices are negative with respect to the electrode, corona streamers do not project downwardly from the electronic conduction devices since highly stressed regions of the air adjacent the upper ends of the electronic conduction devices, and consequently local rupture and corona formation, are preferably avoided by precluding the possibility of sharp conducting points or projections; this is effectively achieved in a simple, direct and economical manner by the use of the electronic conduction devices giving an upper conducting surface which is smooth and free from points as a result of the glazed inner wall surface confining the ionized gas.

Due to the persistence of vision, corona formation appears to the eye (the sharp tip portions of the electrode members are rendered alternately negative, illustratively 750 times per second, due to the application of a high potential, illustratively at 750 cycles per second) as a great number of fine streamers continuously reaching downwardly from the sharp tip portions of the electrode members, the major portion of which terminate at the upper surface of the solid dielectric, illustratively Pyrex glass, plate 68. In effect the tufts of corona discharge projecting downwardly from the tip portion of the various electrode members are conductors of electricity, the lower ends of which terminate in the upper surface of the solid dielectric plate 68.

Spaced immediately beneath the plate 68 with the ring formation of their upper ends in substantial alignment with the ring or rings traced by the lower terminals of the various points of corona discharge, is the cylindrical array of electronic conduction devices, which as mentioned above are comparatively good electrical conductors. In effect, then, there are two comparatively good conductors (the ring of individual tufts of corona discharge and the flat ring or cylinder of electronic conduction devices) separated by a thick sheet of solid dielectric material thus giving an effective condenser, a number of the advantages of which are pointed out hereinafter in considering treatment or sterilization of certain packages of product.

It may at this point be noted, however, that a relatively thick sheet of solid dielectric material, illustratively Pyrex glass or fused quartz, upon the upper surface of which the corona streamers terminate, enables the use of electronic conduction devices 143 having comparatively thin walled glass envelopes 152 thus permitting the ionized gas columns of adjacent electronic conduction devices to be spaced nearer together to form in effect a continuous conductive cylinder, and furthermore permitting the use of electronic conduction devices which may be simply and economically produced. The relatively thick solid dielectric plate is well adapted to withstand the high dielectric stresses resulting from the innumerable corona streamers upon its upper surface; the comparatively thin walled glass envelopes of the electronic conduction devices would soon crack and break under the continuous action of the heavy discharge of corona streamers. The Pyrex glass or fused quartz 68 is furthermore well adapted to withstand the direct heating action consequent to the many fine corona streamers incident upon its upper surface without burning, charring or otherwise deteriorating.

The above-mentioned effective condenser is directly in series with that branch of the load circuit proceeding from electrode 92 including, as mentioned above, the variable condenser 170. The capacity of the above-mentioned effective condenser (its capacity remaining substantially constant throughout changes in the character of the load and changes in the applied potential due to the substantially constant size of the effective condenser plates and the constant spacing between them) is comparable with that of the variable condenser 170 included in this branch of the load circuit; in fact, the variable condenser 170 is preferably dimensioned and initially set at the values illustratively set forth above so that its capacity is substantially equal to that of the effective condenser.

Moreover the impedance of the effective condenser and that of the variable condenser is suitably proportioned to that of the treating zone or region between the extreme tip portions of the electrode members and the upper surface of the conveyor belt, so that an efficient treatment zone of high current density is realized, nevertheless direct power discharge is effectively prevented.

By way of illustration, the various impedances of the load circuit are so proportioned that for the impressed potential of illustratively 150,000 volts there will be a potential drop of approximately one-half or 75,000 volts in the treatment zone, a 1,000 volt drop in the electronic conduction device rotor assembly, and a voltage drop of about 37,000 volts in each of the effective condenser or capacity and the variable condenser.

It is to be understood, however, that these figures are purely illustrative and that they may be individually varied or proportionately altered to suit particular conditions met with in use. For example, by increasing or decreasing the capacity of the variable condenser, in a manner more particularly set forth above, the voltage drop across this portion of the load circuit correspondingly decreases or increases and proportionately changes the potential drop occurring across the effective condenser and the treatment zone. For an assumed substantially constant high potential impressed across the load circuit, an increased potential drop across the variable condenser results in a decreased potential drop across the treatment zone, and likewise, a lower potential drop across the variable condenser results in a higher drop across the treatment zone; commensurately, the current within the treatment zone, as gauged by the cross-sectional area and average current density of the total number of tufts of corona discharge, decreases or increases. Many of the advantages of this control feature will appear more fully hereinafter in considering the electrical treatment or sterilization of various kinds and types of products met with in actual use.

These serially related capacities, that is, the above-mentioned effective condenser or capacity and the adjustable load condenser or capacity are so proportioned that they limit the current flow in the load circuit to a safe and proper operating value. Preferably these capacities in their serial relation are of sufficient dielectric strength to withstand the total high potential impressed across the load circuit; although the average potential gradient in the treatment zone or in the region immediately beneath the electrode is so high as to cause local rupture of the air within this region and consequent corona formation, as more particularly set forth above, the serially related condensers do not break down.

Considering now the field immediately beneath the moving electrode member with greater particularity, attention is directed to Figure 10 wherein an electrode member 102 is moving in a direction from left to right relative to a point in space indicated at X. As the electrode moves in the direction indicated with its upper portion in a leading position and its tip portions trailing, the potential gradient at the point X directly beneath the path of travel of the electrode member rapidly increases in value as the high potential surface of the electrode member comes nearer and nearer until local rupture of the air at the hypothetical point begins to take place, with the consequent formation of a few corona streamers, when, for example, a portion 102$^f$ of the electrode 102 is immediately above the point.

As the electrode continues in its motion toward the right, the distance between the high potential electrode surface and the point decreases (thus increasing the potential gradient at the point) and the local rupture grows giving rise to an increased number of corona streamers at an intermediate point 102$^e$. Further motion of the electrode in the direction indicated brings the relatively sharp extreme tip portion 102$^d$ of the electrode member immediately above point X subjecting the air at that point to a still higher potential gradient causing complete local rupture and innumerable fine corona streamers to permeate the air in the vicinity of the point. Further motion of the electrode member toward the right leaves the point X clear of the overhanging electrode which is accompanied by a corresponding decrease in the potential gradient at the point, a restoration of the ambient air, and a cessation of corona discharge in the vicinity of the point.

Thus, the corona formation at a point fixed in space immediately beneath the path of travel of the electrode member starts suddenly and as suddenly ceases. Viewed differently, the corona discharge may be considered as continuously projecting downwardly from the extreme tip portion of the electrode member and moving with it as it moves along its circular path. For the rotating electrode 92 and its associated concentric rings of electrode members 102 there are a multiplicity of brush-like corona discharge formations projecting downwardly from the electrode members and moving with them along prescribed circular paths above the upper surface of the conveyor belt supporting solid dielectric plate 68.

It may at this point be noted, as mentioned above, that the various electrode members are preferably slanted in the direction of motion so that a cross-section of the electrode member taken in a plane parallel to that of its extreme tip portion is substantially elliptical in form achieving a streamline effect. As more particularly set forth above, electrode member 102 rapidly moves through the ambient air creating a minimum disturbance and thus effectively minimizing rarefied air pockets adjacent the trailing edge of the electrode member and preventing undesired corona formation (which occurs at a lower potential gradient for rarefied air) resulting from the rapid motion of the high potential electrode member through the air.

Thus, the corona discharge from the high potential electrode member is largely confined to the extreme tip portion where it projects downwardly in a concentrated brush-like formation with a minimum stray or leakage flux, and permitting treatment or electrical sterilization of a product with maximum efficiency and economy of operation; the highly concentrated discharge being particularly effective in the destruction of insect life.

Referring back to the discussion of the treating zone established between the various tip portions of the concentric rings of electrode members 102 associated with electrode 92 and the upper surface of solid dielectric plate 68 which, as above-mentioned, is in the form of a number of individual brush-like corona discharge groups moving counter-clockwise in concentric circular paths at a high rate of speed described and controlled by the counter-clockwise rotation of electrode 92, beneath electrode 91 and rotating with it, illustratively in a clockwise direction, the purpose of which will appear more fully hereinafter in considering certain peculiarities in the treatment of a contaminated or infested product, are a number of individual groups or brush-like tufts of corona discharge streamers projecting downwardly from the extreme tip portions of the various electrode members 115 associated with electrode 91 and terminating on the upper surface of the solid dielectric plate 67.

Since electrodes 91 and 92 are preferably spaced above conveyor belt 28 an equal amount, or more particularly, since the extreme tip portions of electrode members 115 and 102 associated with these electrode members preferably lie in a common plane parallel to that of the upper surface of the conveyor belt 28, and likewise parallel to the upper surface of the solid dielectric belt supporting plates 67 and 68, the potential drops across the treatment zones associated with these electrodes (since, in addition to the above, the electrodes are maintained at a common potential) are substantially equal amounting to illustratively 75,000 volts as more particularly set forth above. Thus, those portions of the conveyor belt 28 falling within the above-mentioned treatment zones are at high potential with respect to ground, approximately 75,000 volts (150,000 volts between electrodes and ground less the drop of 75,000 volts across the treatment zones).

The length of conveyor belt between the first treatment zone or that associated with electrode 92, and the right-hand end of the conveyor as defined by the driven drum 29, preferably maintained at ground potential for reasons of safety and economy, is preferably sufficient to prevent appreciable electrical leakage in a direction taken along the belt thus tending to maintain a high over-all operating efficiency of the apparatus. Likewise the belt length between grounded driving drum 27, or more especially the grounded horizontal angle iron section 61 supporting one end of the conveyor belt supporting structure, and the treatment zone beneath and associated with electrode 91 is of a similar proportion.

The lower conveyor belt side, as above-mentioned, passes immediately beneath yokes 146 and 147 which are directly connected to condensers 171 and 170, respectively, and assumes, by induction, potentials limited to the drop across the condensers which, as above-mentioned, are considerably beneath those of the lower portions of the treatment zones through which the upper side of the conveyor belt passes. Thus, an adequate spacing between treatment zones and the nearest supporting drum or grounded belt support for the upper belt side assures adequate spacing for the lower belt side.

It may at this point be noted that the high resistance characteristics of the conveyor belt not only permit an improved operating efficiency as a result of the reduction of leakage along the length of the belt, but reduce local or eddy currents in the belt within the regions of the treatment zones (due to the potential differences between the upper surface and the lower surface of the belt within these zones since these surfaces do not lie within equal potential surfaces of the treatment zones), and the consequent reduction in local current losses, and permitting higher operating efficiency.

Likewise, the length of the illustratively cotton or asbestos belt 169, transmitting driving energy to the electronic conduction device rotor assemblies 141—144—146 and 142—145—147 between the grounded driving motor 168 and the nearest pulley or sheave associated with rack 144 forming part of the first mentioned electronic conduction device rotor assembly and maintained at the potential of the high side of condenser 171, is sufficient to prevent appreciable electrical leakage along the belt.

In order to give an over-all length of conveyor structure of inexcessive proportions, belt 28 is preferably made of a material having high electrical resistance characteristics, such as cotton, asbestos, canvas or the like, which in addition is sufficiently flexible and mechanically strong to assure a long life of continuous operation.

Conveyor belt 28 is maintained at a maximum high resistance by a heater generally shown at 229 (see Figures 13 and 14) preferably of the electrical induction type and conveniently including the belt conducting cylindrical surface $27^a$ of the driving drum 27. Driving drum 27, as above-mentioned, is preferably of cast iron having such magnetic and electrical resistive characteristics that it may be readily heated by hysteresis and eddy current losses within its interior upon being subjected to a heavy alternating magnetic field.

Preferably spaced within driving drum 27, adjacent the mid-section thereof, and conveniently mounted on the fixed horizontal shaft 26, is the induction heater 229. The field preferably includes, illustratively, a four-pole laminated iron core structure 230 held in assembled relation by end plates 231 and 232 and rivets 233.

End plates 231 and 232 are provided with central circular hole portions $231^a$ and $232^a$, respectively, which are adapted to snugly fit a sleeve 234 to which they are conveniently welded; end plate 232 preferably abutting a shoulder portion $234^a$ of the sleeve lending mechanical rigidity and strength to the assembly. Sleeve 234 is snugly received by horizontal shaft 26 to which it is fastened by a suitable set screw 235 threadedly received within the shoulder or collar portion $234^a$ of the sleeve thus rigidly mounting the induction heater core in a fixed position on the stationary horizontal shaft 26.

In order to minimize the weight of shaft 26 without in any way sacrificing the operating efficiency of the induction heater field, core 230 is preferably in the form of a ring, the inner periphery of which is conveniently cylindrical as shown at $230^a$, and the outer periphery of which is preferably stepped to form illustratively four poles $230^b$, $230^c$, $230^d$ and $230^e$ (see Figure 14) which are adapted to snugly receive the heater field coils $236^b$, $236^c$, $236^d$ and $236^e$, respectively, which are firmly secured thereto in any convenient manner.

Core 230 is preferably so dimensioned that the outer faces of poles $230^b$, $230^c$, $230^d$ and $230^e$ are curved to conform to the inner periphery of driving drum 27 being spaced therefrom a suitable amount providing an air gap therebetween indicated at G. Likewise, adequate clearance is provided between coils $236^b$, $236^c$, $236^d$ and $236^e$, respectively, and the inner periphery of the driving drum thus, there is assured free rotation of drum 27 with respect to the stationary induction heater field.

Induction heater field coils $236^b$, $236^c$, $236^d$ and $236^e$ are preferably so connected in series (see Figure 18) that adjacent coils are of opposite polarity and are connected by suitable conductors 237 and 238 to a source of alternating current preferably to one phase of the illustratively three-phase 220 volt 60 cycle source of commercial supply 202, in a manner more particularly described hereinafter; conductors 237 and 238 (see Figure 13) are taken outside of the rotating driving drum 27 through a suitable, preferably axial, channel $26^h$ provided in the shaft 26.

Upon exciting the field coils or winding, in a manner more fully set forth below, magnetic fields are produced within core 230 and within the mid-section of driving drum 27. For the illustrative 60 cycle alternating current supply, the polarity of the windings and consequently of the respective field poles associated with the coils will be reversed 120 times a second (two reversals occurring for each complete cycle of the alternating current).

Corresponding to the reversal of the polarity or magnetizing force of the coils, there is a reversal in the magnetic flux passing up (or down as the case may be) through the poles associated with the coils and along the relatively thin wall portion of the driving drum; the path for the magnetic flux for an assumed instant when pole $230^b$ is north, is out through this pole, across gap $G^1$, and into the iron driving drum where it flows in two branches, one toward the left or counter-clockwise circumferentially along the drum where it crosses gap $G^4$ and enters pole $230^e$ which is oppositely magnetized, and then along the core section between poles and back to pole $230^b$, (the other branch upon entering the driving drum flows toward the right or clockwise circumferentially along the drum, across gap $G^2$, and into pole $230^c$, which is oppositely magnetized, then through the core section between poles $230^c$ and $230^b$, back to pole $230^b$). Similarly, there are two paths of the magnetic flux emanating from the magnetic pole $230^d$ of the same polarity of pole 230$^b$ and flowing in two branches, one toward the left and the other toward the right circumferentially along the drum and into poles 230$^c$ and 230$^e$, respectively. Thus, there are illustratively four magnetic circuits circumferentially along the driving drum 27 through which the magnetic field is continuously and rapidly reversing. These rapid reversals of the magnetic fields cause high hysteresis losses (particularly large in cast iron) accompanied by the production of heat within the drum, and further, the production of eddy currents, (since the internal electrical resistance of the drum is relatively low) accompanied by the production of additional heat. These factors tend to raise the temperature of the drum, and particularly due to the relatively high heat conductivity of the drum transfer the heat to all portions of the cylindrical drum wall or that part in direct contact with conveyor belt 28 to which heat is transferred to keep it thoroughly dried out and free from absorbed moisture, thus assuring maximum electrical resistance and minimum electrical belt leakage. Excessive drum temperatures and localized heating of the drum are prevented respectively by the rapid transfer of heat to the conveyor belt and by the relative motion of the drum with respect to the above-mentioned magnetic circuits.

The assurance of maximum belt resistance permits a reduction in the over-all length of the conveyor structure, a reduction in the over-all size of the entire apparatus with a consequent saving in material and cost of manufacture, as well as a reduction in the floor space required for installation.

Considering now the introduction into the treatment zone of the product to be treated, illustratively corn-meal put up in packages or cartons of paste-board or heavy paper, and more particularly the immediate effect upon the high voltage load circuit, it may at this point be noted that the packaged product has an average permittivity that is considerably higher than that of the air which heretofore constituted the dielectric in the space between extreme tip portions of the electrode members and the solid dielectric plate supporting the product and its conveying belt within this region. As a result of the higher average permittivity of the product introduced into the treatment zone there is a reduction in the impedance of the zone and a consequent redistribution of the high potential impressed across the load circuit. Corona formation takes place at a somewhat lower point on the high potential wave form of the impressed potential with a consequent increase in the time duration of corona for each cycle of the impressed voltage.

Considering the electrical characteristics of the packaged product in greater detail, and more particularly the permittivity characteristics and the potential distributions there-across, it may first be noted that the permittivity of the upper and lower walls of the package or container, illustratively comprising paste-board or heavy paper, has an average permittivity that is considerably higher than the ambient air which it displaces and which prior to the introduction of the package into the treatment zone constituted that part of the dielectric of the treatment zone or region between the extreme tip portions of electrode members 102 associated with electrode 92 and the upper surface of the solid dielectric plate 68 (see Figure 8).

These upper and lower walls of the carton or package lie in planes substantially parallel with the upper surface of solid dielectric plate 68 and act as condenser dielectrics which become serially related with those of the effective condenser and the variable condenser for fixed and variable capacities in that branch of the load circuit. There is a resultant redistribution of potentials in the load circuit and more particularly within the treatment zone so that the potential drop across the upper and lower walls of the package or carton, conveniently considered as condenser dielectrics, is such that the potential gradient of the package or carton material is below the break-down or puncturing gradient and hence puncturing of the material of the carton is positively precluded.

Since aligned points on opposite surfaces of the four side walls of the container or carton lie in planes substantially parallel to the upper surface of solid dielectric plate 68 and to that of the extreme tip portions of electrode members 102 or lie in substantially equal potential surfaces of the treatment zone, the potential gradients across the side walls of the carton are extremely low and freedom from puncture is effectively assured.

It may next be noted that the product itself, illustratively corn-meal, forms a dielectric comprising the heterogeneous mass of small particles or grains of product constituting a dielectric of one permittivity, considerably higher than air, with the interspacings or interstices of air of another permittivity, namely unity.

For an assumed contaminated or infested product, the insect life, in the form of insects and/or their eggs, larvæ or pupæ, is of a high electrical permittivity and in fact is highly electrically conductive. When this heterogeneous dielectric enters the treatment zone, dielectrics of higher permittivity, or the particles of product, cause overstressing of the air dielectric resulting in local rupture and corona formation within the mass of product. Thus, the product is permeated with extremely fine discharges which virtually seek out the contaminating insect life, due to the highly conductive nature of the latter, giving rise to a high current density therein which effectively brings about the destruction of the insect life. The various particles of the product itself, due to their relatively low permittivity and relatively high dielectric strengths, withstand the dielectric stresses to which they are subjected without resultant damage or harm; thus contaminating insect life is effectively electrocuted or destroyed without in any way damaging the product or the carton in which it is illustratively contained.

The destruction of the insect life in its various forms or stages of development is intensified as a result of the use of an applied alternating potential of relatively high frequency giving a steep wave front causing innumerable sudden shocks which are peculiarly effective in the destruction of animal life.

In the above discussion, it is assumed that the output voltage of the high potential transformer, the spacing of the electrodes above the conveyor, and the setting of the variable capacities are such that corona discharge takes place from the extreme tip portions of the electrode members prior to the introduction of the product to be treated into the treatment zones so established. I may, however, so increase the spacing of the extreme tip portions of the electrode members above the conveyor belt, as by manipulating handwheel 139 in a manner more particularly set forth above, or decrease the transformer output voltage impressed across the load circuit, as by manipulating rheostat 208 as above-described, or by suitably adjusting variable condenser 171 as above set forth, so that local rupture of the ambient air, and the ensuing corona discharge, just fail to take place prior to the introduction of the product into this region. In spite of the absence of corona, the potential gradient is still within this region and substantially conforms in distribution to the treatment zone of corona discharge, as more particularly described above.

The electrostatic field between electrode 92, or more particularly between the extreme tip portions of electrode member 102 associated with electrode 92, and the conductive base plate 148 upon which are mounted electronic conduction devices 143 in cylindrical array 142, is substantially great or the potential gradient is sufficiently high to ionize the various electronic conduction devices which, as more particularly described above, cause a collapse of the stray or leakage fields and a concentration of the electrostatic flux in the form of concentric rings extending from the concentric ring formation of electrode members 102 and the upper surface of the solid dielectric plate 68.

As the product to be treated is moved into the region beneath moving electrode 92 it is brought into this highly concentrated dielectric flux. But, as above pointed out, the product as well as the paste-board or heavy paper carton in which it is illustratively packaged has an average permittivity that is considerably higher than the ambient air which heretofore constituted the dielectric between the electrode 92 and the dielectric plate 68. Due to the higher average permittivity of the packaged product there is brought about as it enters the region immediately beneath the extreme tip portions of electrode members 102 such a redistribution of the voltage drop across the various parts of this branch of the load circuit, as more particularly set forth above, that the air in this region immediately above the product is overstressed resulting in local rupture and corona discharge.

As more particularly described above the corona discharge permeates the packaged product and destroys the insect life contained therein, all without puncturing the carton or container where the product is packaged, and without in any way damaging or harming the product itself.

The apparatus is preferably operated, however, as first described above, namely with corona discharge taking place in the treatment zone prior to the introduction of the product therein. With this mode of operation a better regulation of the high potential transformer and the motor-generator set is obtained due to the comparatively slight change in the load where corona discharge is taking place prior to the introduction of the product into the region as compared with the situation where corona discharge is not taking place until after the product is introduced into the region; in one case, there is always substantially full load on the power apparatus, whereas in the other the load jumps from no load to full load upon the introduction of each separate package.

When it is found desirable to operate the apparatus in this latter fashion, that is, with corona discharge just failing to take place prior to the introduction of the product to be treated within the region, the voltage regulation of the power apparatus is preferably improved by setting condenser 170 with the branch of the load circuit associated with electrode 92 so that a lesser fraction of the total applied voltage occurs as a drop across the treatment zone.

A different kind of control of the discharge in the treatment zone may be had by varying the capacity of condenser 170, in a manner more particularly set forth above. For example, by increasing the capacity of the condenser, other factors remaining constant, there is caused the distribution of a greater amount of energy in the treatment zone making the individual corona streamers extending downwardly from the electrode members of a greater intensity. Under certain circumstances this may be desirable, but it is to be noted that the more intense the streamers are made to be, the less are they in number. The apparatus is preferably operated as initially described above, that is, with many fine corona streamers projecting from the electrode members thus achieving a more thorough permeation of the product undergoing treatment. The more intense corona streamers are particularly effective in the treatment of products of somewhat coarser particle or grain size than the illustrative cornmeal.

It is to be noted, however, that highly efficient and thorough destruction of insect life is obtained according to any of the above-mentioned modes of operation.

It is to be further noted that in any event it is desirable that the above-mentioned effective condenser and variable condenser are such that their respective dielectrics can safely withstand the potential of the system without rupture. For such rupture to take place, substantially the entire transformer voltage would be impressed upon the illustratively packaged product undergoing treatment with consequent puncturing of the carton or container and possible burning or scorching of the product itself. Also, the variable condenser is of such capacity that it effectively prevents breakdown of the solid dielectric plate 68 and the relatively short column of air in series with it of the above-mentioned effective condenser and thus, in preventing breakdown of that dielectric, protects the electronic conduction devices 143 against the overstressing and resulting damage to them in the event of a rupturing of the solid dielectric of the effective condenser.

The variable condenser in addition to lending great flexibility of control in the treating action of the apparatus, as partially indicated above and more fully indicated hereinafter, and in addition to assuring safe and dependable operation of the apparatus, permits the use of a minimum thickness of solid dielectric material in the above-mentioned effective condenser protecting the electronic conduction devices and thus, in avoiding the use of solid dielectric material of excessive thickness, achieves a more effective and more efficient concentrating action of the electronic conduction devices 143.

While in the above discussions reference is had to the right-hand branch of the load circuit (extending from electrode 92 (see Figure 1) with its associated electrode members 102 and including electronic conduction device rotor assembly 142—145—147 and adjustable condenser 170), and the establishing of a treatment zone and the action of this zone upon packaged product is dealt with, it will be understood in view of certain references and interjections included in the above discussions concerning the left-hand branch of the load circuit (proceeding from the electrode 91 and its associated electrode members 115 and including the electronic conduction device rotor assembly 141—144—146 and condenser 171), a similar treatment zone is similarly established within this branch of the circuit which cooperates with the action of the first treatment zone, in a manner presently described, to assure a thorough, efficient and rapid treatment of the contaminated product.

As mentioned above, the treatment zone produced beneath electrode 92 comprising a multiplicity of brush-shaped concentrated electrostatic fields, illustratively arranged in two concentric circles, is rotated in a counter-clockwise direction, as seen looking down on the conveyor, at a high rate of speed illustratively, 4,500 feet per minute, while a similar treatment zone associated with electrode 91 is similarly rotated in a clockwise direction.

These two treatment zones are diagrammatically indicated in Figures 19 and 20. In Figure 19 there is indicated at A by a series of arrows, arranged counter-clockwise in a circle, the first treatment zone or that associated with the rotating electrode 92 and its associated electrode members 102. At 28 there is diagrammatically shown a fragment of the conveyor belt moving in a direction from right to left transporting product to be treated, illustratively in the form of packaged material as mentioned above. For analytical purposes the product is shown as being conveyed by a portion of the conveyor belt lying to the right of the center line of the belt as seen looking along the belt in the direction of motion. It will be understood, however, in view of the above discussion relative to the transportation of product to be treated by the conveyor belt that the product is moved in illustratively two parallel paths, one spaced on either side of the center line of the conveyor belt. At $C^1$ the packaged product is seen entering the first treatment zone, and at $C^2$ the package is seen as it emerges from the zone.

In Figure 20 there is diagrammatically shown by a series of arrows B, arranged clockwise in a circle, a second treatment zone associated with the rotating electrode 91 and its related electrode members 115. There is diagrammatically shown at 28 a fragmentary portion of the conveyor belt moving in a direction from right to left and transporting product to be treated into the second treatment zone. A package to be treated is shown at $C^3$ as it enters the treatment zone, and at $C^4$ as it leaves the zone. The diagrammatic showings of Figures 19 and 20 are to be taken together in considering the electrical treatment or sterilization of illustratively packaged product as it is moved along by the conveyor belt consecutively into the illustratively two treatment zones established.

Considering first the treating action received by the packaged product in the entering side of the first treatment zone, illustratively in a position diagrammatically shown at $C^1$, it will be noted that the packaged product is crossed by the electrode members rapidly moving in a direction from left to right, as seen from the right of Figure 19 looking along the direction of motion of the conveyed product, and consequently the brush-like formations or tufts of corona streamers associated with each of the electrode members, as more particularly set forth above, brush across and through the packaged product moving slantwise across the product in a direction from near left to far right.

In the position $C^2$ the packaged product is brushed across and through with tufts of corona streamers rapidly moving slantwise back across the product in a direction from near right to far left. In the position $C^3$ as indicated in Figure 20, the product is brushed across and through by tufts of corona discharge rapidly moving slantwise across the product in a direction from far right to near left, as seen looking along the direction of motion of the conveyed product, while in the position $C^4$ it is brushed across by the brush-like corona formation moving back across the product in a slantwise direction from far left to near right.

The treating actions received by the packaged product in each of the above positions is particularly important, as will presently appear, to assure a thorough treatment of all parts of the packaged product in spite of certain possible electrical effects resulting from certain peculiar coactions between the rapidly moving tufts or corona discharge and the side and end walls of the package or carton containing the product.

Due to such factors as electrostatic flux refraction and reflection there is a tendency for the electrostatic flux or corona discharge, as it encounters the wall of the carton or package containing the product, to be delayed in its passage across and through the packaged product. In effect then there is the possibility of a persistence of the electrostatic flux or corona discharge along a dielectric surface upon which the sides of the tufts of corona streamers are incident in their rapid movement across the packaged product. As a result of this peculiar electrical effect, the movement of the rapidly rotating electrostatic fields is possibly discontinuous being delayed by the persistence of the electrostatic flux along the approach side of the dielectric to become re-established on the other side of the dielectric at a point spaced therefrom a distance depending upon numerous factors among which are the nature and character of the dielectric material, the intensity of the electrostatic field, and the speed with which it is moved across the dielectric.

Viewed differently, the electrostatic flux or corona discharge is drawn out due to the combined action of the discharge along the approach side of the dielectric and the continuous rapid movement of the electrode members until the impedance of the path pursued becomes excessive, or until the potential gradient along the path falls to a value beyond which corona discharge is not maintained, only to be re-established in a position extending downwardly from the extreme tip portion of the electrode member in its then occupied position spaced from the solid dielectric a distance dependent upon numerous factors, a number of which are above indicated. In any event, it is possible that the region immediately adjacent the far surface of the dielectric wall is not subjected to the intense electrostatic field and consequently the product or material to be treated adjacent this wall escapes treatment, or at least receives inadequate treatment.

Thus, the packaged product in the position $C^1$ is thoroughly permeated and effectively treated by the intense electrostatic field moving slantwise across it at a high rate of speed in all parts except within a region immediately adjacent the left side wall $l$ and adjacent the back wall $b$; with respect to both of these walls there is a tendency for the electrostatic flux to persist along the outer surface against which it impinges.

As the conveyed product is moved along by the conveyor belt into the position indicated at C² it receives treatment in all regions except those immediately adjacent the right-hand side wall r and the back wall b which as above-mentioned escape treatment, or receive inadequate treatment, due to various electrical actions resulting in the persistence or concentration of electrostatic flux along the outside surface of the package wall approached by the electrostatic flux as it is moved in a direction across the package.

It is to be noted that the product in the region immediately adjacent the left-hand side wall l which escapes treatment in position C¹ receives adequate treatment in position C². There is, however, a region adjacent the back wall b which still remains untreated, or at least inadequately treated, since this region escapes treatment in positions C¹ and C².

The packaged product is conveyed along by the conveyor belt where it enters the approach side of the treatment zone diagrammatically indicated at B (see Figure 20) passing through a position C³. As the product passes through this side of the second treatment zone it receives a thorough and adequate sterilization in all parts except those immediately adjacent the front wall f and the right-hand side wall r which, due to the above-mentioned electrical effects escape the desired action of the electrostatic flux.

It is to be noted that the region of product immediately adjacent the back wall b of the carton or package receives treatment in this position except for a column of the material adjacent the back right-hand corner of the package which escapes treatment as a result of the over-lapping of the untreated regions of positions C¹, C² and C³. Further movement of the packaged product into the position indicated at C⁴ brings it into the departure side of the second treatment zone where a thorough and adequate treatment of the product is achieved in all regions except those immediately adjacent the front end wall f and the left side wall l. In this position effective treatment is given that portion of the product adjacent the right rear corner which has heretofore escaped treatment, or at least received inadequate treatment, in passing through both parts of the first treatment zone and the first part of the second zone as described in connection with the packaged product in positions C¹, C² and C³.

Thus, in passing the product consecutively through, illustratively, two treatment zones each including a multiplicity of intense electrostatic fields rapidly moving in a circular path across the product, as it passes through one side of the zone, and back, as it passes through the other, a highly efficient, thorough and dependable treatment is achieved in spite of numerous possible interferences resulting from the dielectric character of the paste-board or heavy paper carton in which the product is packaged.

It is to be understood, however, that insofar as certain other features of my invention are concerned, the electrodes need not rotate in opposite directions and also that insofar as certain other features of my invention are concerned, the electrodes, where provided with an adequate number of electrode members need not rotate at all. However, with the above-described rotating electrode construction many important practical advantages are achieved, a number of which are above set forth.

In the above discussions electrical treatment or sterilization is given a packaged product as it is conveyed consecutively through, illustratively two treatment zones along a uni-directional prescribed path lying off to the right of the center of the treatment zones. It will be understood in view of the foregoing that thorough and highly efficient treatment is had in a similar fashion of packaged product transported by the conveyor consecutively through the treatment zones along a prescribed path lying off to the left of their centers.

While in the above discussion it is assumed, for analytical purposes, that the packaged product is aligned rectilinearly with the conveyor belt, it will be understood, in view of the general nature of the analysis above set forth, that thorough treatment is had where the packaged product is not in alignment with the belt (that is, with the packaged product canted to the conveyor with its side walls oblique to the direction of motion), and although the analysis is carried out for an assumed rectangular packaged product, thorough treatment is had of the product put up in a round, oval, square or other form of container.

While for the most part a thorough, reliable and highly efficient sterilizing treatment is given all parts of the product, it is possible that under certain circumstances, the nature of which will appear more fully hereinafter, a portion of the product adjacent the base or lower surface of the carton or container will escape treatment.

In considering this possibility and the manner of overcoming it, attention is now directed to Figure 10. At Y there is shown an assumed point in space illustratively located immediately above the upper surface of the solid dielectric plate 68 and midway between adjacent electronic conduction devices 143. With electronic conduction devices 143 maintained in fixed position with respect to the solid dielectric plate 68 and with the electronic devices spaced from each other an appreciable distance, illustratively equal to their diameters, it is possible, due to the high concentrating effect of the electronic conduction devices upon the electrostatic field emanating from the extreme tip portion of the high potential electrode member 102, all as more particularly set forth above, the potential gradient at a point Y fails to reach a value sufficiently high to cause local rupture and the attendant corona formation at that point.

Thus, at the point Y it is possible that due to the above-mentioned high field concentration action of the electronic conduction devices 143 upon their becoming ionized, as more particularly described above, and the tendency for the brush-like corona discharge formation to reach out toward the ionized device that this brush-like discharge draws out or stretches as the electrode member rapidly moves in a path above the ring of electronic conduction devices to a place where it suddenly ceases, to immediately re-establish itself between the electrode member and the next successive electronic conduction device, thus causing a region of discontinuity at the point Y between adjacent electronic conduction devices and in alignment with the path of travel. This region of electrostatic flux density about the point Y is, in section, in the form of an inverted V so that the product to be treated, moving along a path perpendicular to the plane of the paper as seen in Figure 10 possibly escapes treatment, or possibly receives inadequate treatment, along an inverted V region extending the length of the lowermost portions of the product. Between other adjacent electronic conduction devices there is the possibility of a similar region with comparatively low electrostatic flux density so that it is possible that a product in receiving electrical treatment or sterilization escapes treatment or at least receives inadequate treatment throughout parallel inverted V-shaped regions spaced along the lowermost portion of the product. The possibility of the product receiving inadequate treatment in these regions is conveniently reduced by so spacing the cylindrical array of electronic conduction devices that the gaps between adjacent electronic conduction devices on opposite sides of the cylindrical array are not in alignment when taken in a direction parallel to the prescribed path of travel of the product to be treated. Thus, the possible deficiencies in the treatment received by the product in passing through one side of the treatment zone are partially compensated for in the other side of the treatment zone.

To assure a complete and thorough treatment of the product adjacent the lowermost portion, however, the cylindrical array of electronic conduction devices is conveniently rotated, preferably in a direction opposed to the rotation of the electrode with which it is associated, all as more particularly set forth above.

Thus, referring to Figure 21, the cylindrical array 142 of electronic conduction devices associated with the rotating electrode 92 is rotated in a clockwise direction as diagrammatically represented at C by a series of dotted arrows, arranged in a circle. As the conveyor belt transports the illustratively packaged product in a direction from right to left, as indicated in Figure 21, the cylindrical array of electronic conduction devices is rotated beneath the prescribed path of travel of the product in a transverse direction. The packaged product then in passing through the first side of the first treatment zone, one stage of the passage of which is indicated by the package at $C^1$, has its entire interior (except possibly for the region adjacent the left side wall and rear end wall as more particularly described above), including its lowermost portions, swept through by corona streamers rapidly moving in a direction from near left to far right, as indicated in Figure 19 and as more particularly described above, the lowermost portions of which possibly move discontinuously, as more particularly described above; the regions of intense fields and intervening regions of discontinuity moving relatively slowly across the lowermost portion of the product in an opposite direction or from far right to near left as indicated in Figure 21.

This movement of possibly discontinuous regions of the treatment zone, although slow as compared with the rapidly rotating electrode members, is appreciably greater than the rate at which the product is transported through the treatment zones by the conveyor belt so that localized regions of reduced flux density through which the product passes, and hence regions of insufficient treatment, extending along the lowermost portion of the product in the direction of its motion are positively precluded since the regions of high flux density adjacent the lowermost portion of the product sweep across the path of travel a great many times as the product is conveyed through one side of the treatment zone.

Thus, a highly efficient and thoroughly reliable electrical treatment or sterilization is given the product as it passes through one side of the first treatment zone, a stage of which is indicated at $C^1$, in all regions except those immediately adjacent the left-hand side wall $l$ and the rear end wall $b$ as seen looking along the package in the direction of travel. The packaged product in passing through the second side of the first treatment zone, in spite of possible discontinuities adjacent the base of the product, receives full and complete treatment in all parts (except those immediately adjacent the right-hand side wall $r$ and the rear end wall $b$ which possibly escape treatment due to certain peculiar actions more particularly dealt with above) since localization of these regions is prevented by moving them slantwise across the path of travel of the product to be treated, conveniently in a direction from far left to near right.

Likewise, as diagrammatically indicated in Figure 22, the product in passing through both sides of the second treatment zone receives thorough treatment (in all parts except those immediately adjacent the front and right-hand side walls $f$ and $r$ in the position $C^3$ and the front and left-hand side walls $f$ and $l$ in the position $C^4$) in spite of certain above-mentioned possible discontinuities in the treatment zone adjacent the lowermost portion of the path of travel which are rotated in a counter-clockwise direction diagrammatically indicated by a circular series of dotted arrows shown at D, moving slantwise across the lowermost portion of the product as it is transported along its prescribed path of travel.

A thorough, reliable and highly efficient electrical treatment or sterilization of illustratively packaged product is thus realized in spite of numerous possible preventive or interfering actions of the packaged walls as more particularly outlined above, and of certain possible regions of low flux density or discontinuities in the treatment zones immediately adjacent the upper belt supporting surface of the solid dielectric plates beneath the rotating electrodes.

Although preferably, as above-indicated, the electronic conduction device rotor assemblies are rotated in directions opposite to those of the electrodes with which they are associated (thus giving a maximum speed of rotation of the treatment zones with respect to the electronic conduction device rotor assemblies and a consequent reduction in the time duration of individual possible discontinuities in the treatment zones), it is to be understood that insofar as other features of my invention are concerned, the electronic conduction device rotor assemblies may be rotated in the same directions as their respective rotating electrodes, or a variation of these two may be employed wherein one electronic conduction device rotor assembly rotates in the same direction as its associated rotating electrode, and the other electronic conduction device rotor assembly rotates in a direction opposite to that of its associated electrode.

While many practical advantages are obtained by rotating the electronic conduction device rotor assemblies, as more clearly described above it will be understood that a complete and highly efficient destruction of insect life is achieved where local regions of reduced electrostatic flux density are completely avoided, as by spacing the electronic conduction devices so close together, or spacing them with respect to each other and to the distance between their upper ends and the upper surface of the solid dielectric plate lying immediately above them, that there is an effective over-lapping of the field concentrating actions of the electronic conduction devices.

By rotating the electronic conduction device rotor assemblies efficient electrical treatment or sterilization of products is had using electronic conduction devices widely spaced apart, thus permitting a reduction in the total number of comparatively expensive electronic conduction devices employed and a consequent reduced manufacturing expense.

The establishment and use of, illustratively, two treatment zones each forming a part of parallel branches of a load circuit, in addition to assuring a thorough electrical treatment of the product, as more particularly described above, assure safety of operation under certain extreme conditions met with in actual use. For example, should a batch or package of material undergoing treatment have an excessive or unusually high permittivity as would be the case if it were wet, it would act as a direct short-circuit of the treatment zone upon entering the region immediately beneath the first successive rotating electrode thus immediately lowering the total impedance of that branch of the load circuit and permitting load current of an increased value to flow. The magnitude of this current is limited by the serial capacities of the effective condenser and the variable condenser in this branch of the load circuit to a safe value which with a single condenser of increased capacity in series with both branches of the load circuit would be found dangerously excessive.

In the above-discussions, electrical treatment or sterilization is given a food product, illustratively packaged corn-meal. Let it be assumed, for example, that flour is to be sterilized instead of the illustratively described corn-meal. Flour requires a higher voltage than does the corn-meal and this higher treating potential is preferably obtained by suitably manipulating the field rheostat 208 in a manner more particularly described above. The higher treating voltage is also obtained by suitably adjusting the variable condensers 170 and 171, as more particularly described above, so as to increase their electrical capacities and accordingly effect a redistribution of the potential drops across the various parts of the load circuit making available greater potential drops in the treatment zones to supply the peculiar requirements of the flour to be treated.

Similarly for a product put up in a different size or shape of container, for example, in a thicker carton than the above-assumed carton of a 2 inch thickness, electrodes 91 and 92 are raised a suitable height above the conveyor belt 28 by proper manipulation of hand-wheel 139, in a manner more particularly set forth above, to accommodate the additional height of packaged product.

In order to maintain proper voltage gradient within the treatment zones in view of the increased height of the zones, the total potential available for the treatment zones, or the potential drop across these zones, is increased as by raising the output voltage of the high potential transformer as by properly controlling rheostat 208 and/or by suitably increasing the capacities of condensers 170 and 171, all as more particularly described above, to effect a redistribution in the potential drops across various portions of the load circuit. Thus, a wide variety of conditions encountered in actual practice such as various kinds and qualities of products to be treated put up in a wide selection of shapes and sizes of containers can be effectively met to assure complete and thorough treatment of the product. This wide flexibility and general adaptability of the apparatus is of considerable practical importance in that it extends the useful range of the apparatus in a simple and economical manner without in any way sacrificing numerous advantages set forth above, or detracting from the highly efficient and complete destruction of the insect life contaminating the product.

In the operation of the electrical treating or sterilizing apparatus, the many fine corona streamers formed, in a manner more particularly described above, cause the formation of ozone in and about the treatment zones which is gradually dissipated throughout the surrounding atmosphere. Ozone, due to its peculiarly pungent odor, may be found objectionable in the workroom in which the apparatus is set up and operated so that measures are preferably taken to remove the objectionable gases so formed, as will hereinafter more fully appear.

For the above-mentioned and other reasons, a number of which are set forth below, the fabricated framework of the apparatus is preferably covered with suitable sheet metal, illustratively sheet-iron, properly cut and conveniently fastened to the various vertical and horizontal angle-iron sections by screws or bolts to form a reasonably air-tight and dust-tight casing for the apparatus.

Thus, referring to Figure 2, the rear slanting side walls of the casing or housing for the apparatus are formed of suitable, illustratively, sheet-iron sections 239 (conveniently fastened to vertical angle-iron sections $15^b$ and $15^i$ and upper and lower horizontal angle-iron sections $19^a$ and $10^a$, see Figure 1) and 240 (similarly fastened to angle-iron sections $15^g$ and $15^l$ and upper and lower horizontal angle-iron sections $19^b$ and $10^c$), and door sections 258 (suitably hung between vertical angle-iron sections $15^a$ and $15^i$ and the horizontal angle-iron sections $10^a$ and $19^a$) and 259 suitably hung between angle-iron sections $15^h$ and $15^l$ and horizontal angle-iron sections $10^c$ and $19^b$; the manner of hanging and fastening the doors is considered more fully hereinafter in connection with certain safety control features of the apparatus.

The front slanting side walls of the casing or housing are preferably formed of similar sheet metal, a section 241 for the left-hand front wall (as seen in Figure 2) being fastened by suitable screws or bolts to the vertical angle-iron sections $15^c$ and $15^j$ and lower horizontal angle-iron section $10^d$ with a door 242 suitably hung between the vertical angle-iron sections $15^d$ and $15^l$ and the upper and lower horizontal angle-iron sections $19^c$ (Figure 5) and $10^d$ as described more fully hereinafter. The right-hand slanting front wall section includes the sheet-like section 243 suitably fastened to vertical angle-iron sections $15^f$ and $15^k$ and horizontal angle-iron section $10^h$ with a door 244 suitably hung between vertical angle-iron sections $15^e$ and $15^k$ and upper and lower horizontal angle-iron sections $19^d$ (Figure 5) and $10^f$.

Rear and front wall sections are completed by the sheet metal sections 172 and 173, more particularly described above, forming parts of the load variable condensers 170 and 171, respectively, while right and left end sections are completed by the sheet-like members 80 and 90 more particularly described above in connection with the mountings for the product-receiving shelf 83 and chute 73 for the end section 80 and discharge chute 86 and shelf 87 for the end section 90.

The central top portion of the housing is conveniently formed of two side wall sheets 245 and 246 (see Figure 1) extending crosswise of the housing suitably fastened to horizontal angle iron sections $18^a$—$22^c$ and $18^b$—$22^d$, respectively, a substantially square top section 247 properly cut to fit the cylindrical tank 183 of transformer 182 and conveniently fastened to the horizontal angle-iron sections $22^a$, $22^b$, $22^c$ and $22^d$, and the slanting roof sections 248 and 249 (see Figure 3) suitably fastened to horizontal angle-iron sections $22^a$—$21^a$ and slanting angle-iron sections $23^a$—$23^b$ (for the roof section 248) and horizontal angle-iron sections $21^b$—$22^b$ and slanting sections $23^c$—$23^d$ for the roof section 249. The more remote top sections of the housing include the horizontal sheet-iron section 225, as more particularly described above with reference to the mounting of the housing 224 for the filter coil and the loading coil and a similar section 250 positioned on the opposite side of the above-mentioned top portion and suitably fastened to horizontal angle-iron sections $17^e$ and $17^f$, and $19^b$ and $19^d$ fastened to these frame sections prior to the mounting of motor-generator set 203 and rheostat 208 thereon. The top of the casing is completed by the slanting top and end sections 251 and 252 suitably fastened to horizontal angle-iron sections $17^a$—$17^c$ and $17^d$—$17^f$, respectively.

The housing or casing structure is completed by sheet metal sections 253, 254 and 255 suitably fastened to the base of the fabricated frame by screws or bolts; the section 253 being fastened to angle-iron sections $10^a$, $10^d$, $10^i$ and $10^m$; the section 254 being secured to sections $10^b$, $10^e$, $10^j$ and $10^k$, and the section 255 is fastened to sections $10^c$, $10^f$, $10^l$ and $10^n$.

To give the casing or housing a more finished and workman-like appearance and to eliminate sharp protruding edges upon which, for example, the clothes of the workmen about the apparatus might catch, the edges and corners of the housing are covered with a relatively thin sheet angle-iron material or molding suitably fastened to the latter sheet sections at their adjoining edges and to the angle-iron sections to which these sheet sections are related by suitable screws or bolts.

Thus, a comparatively dust-tight, dirt-tight and reasonably gas-tight housing is provided for the electrical treating or sterilizing apparatus having illustratively four doors through which access may be had to the apparatus for purposes of adjustment, repair or replacement and two apertures $80^a$ and $90^a$ in the end sections through which the product to be treated is introduced into the apparatus and discharged therefrom after having received treatment, all in a manner more particularly set forth above.

In order to clear the air within the housing and to prevent the objectionable leakage of ozone out through the apertures in the casing, a light current of air is caused to flow into the housing through both of these apertures by a blower 256 (see Figure 5) illustratively mounted on the top section 225 of the casing and fastened thereto by suitable bolts, the intake of which, $256^a$, is taken through the vertical wall section 245 of the central top portion of the housing. The exhaust $256^b$ of the blower is connected by way of suitable, illustratively, sheet metal pipe sections (not shown) to a point of exhaust outside of the workroom.

Blower 256 is conveniently driven by an electric motor 257 illustratively of the three-phase induction type which is preferably mounted on a common base with the blower and directly coupled thereto by motor drive shaft $257^a$.

Upon energization of the blower motor 257 conveniently from the three-phase 220 volt 60 cycle commercial source of supply 202, in a manner more particularly described hereinafter, the blower 256 causes light currents of air to flow in through the apertures in the opposite ends of the housing and up through the mid portion of the housing through and above the regions of the treatment zones carrying with it the heated air and ozone formed within these zones into the blower intake and out through the blower exhaust to some point beyond the workroom. The upward flow of air in the region immediately above the treating zones and the rotating electrodes is aided, in a measure by the rising currents of warm air from the treatment zones and from the electrodes; the incoming fresh air cooling the electrodes as it passes over them. Thus, in a simple and direct manner certain objectionable odors incident to the operation of the electrical treating apparatus are effectively prevented from entering the workroom.

In order to assure a construction of maximum operative safety and of fool-proof design, the high potential electrical apparatus is preferably rendered operative only during such time as the illustratively four doors, by which access may be made to the interior of the casing or housing, are firmly closed and latched, and is rendered completely inoperative immediately upon the opening of any one of the doors.

Considering now the construction of one of the casing doors in detail, attention is directed to Figures 15, 16 and 17 wherein, for purposes of illustration, there is shown a door 244 comprising a double thickness of, illustratively, sheet-iron material (see Figure 16) conveniently hung by, illustratively, three hinges 260, 261 and 262 suitably fastened to the vertical angle-iron section $15^e$ and to the inner surface of the door 244 adjacent one edge by screws or bolts. The door is preferably so proportioned that it swings closed into contacting position with upper and lower horizontal sections $19^d$ and $10^f$ (see Figure 17) and the vertical angle-iron section $15^k$ (see Figure 16); the opening edges of the door are preferably received within a frame formed by the molding by which the sheet metal sections comprising adjacent parts of the housing are held to the fabricated frame sections in a workman-like and finished manner.

Door 244 is conveniently latched into a closed position by the upper and lower vertical, illustratively, half-round rods 263 and 264 slidably received within upper and lower blocks 265 and 266 conveniently welded to the door (see Figures 15 and 17); the latching action being controlled by a door handle 267 rotatably mounted in a bearing member 268 conveniently bolted to the door and a block 269 (see Figure 16) conveniently welded to the door and receiving adjacent ends of the upper and lower vertical latching rods 263 and 264 preferably cam-operated (not shown) by the handle 267. In opening the door from the closed position shown in the drawings, handle 267 is swung clockwise into a vertical position wherein, by the above-mentioned cam action not shown, vertical rods 263 and 264 are retracted so that their remote ends clear upper and lower angle-iron sections 19$^d$ and 10$^f$ thus allowing the door to open freely. In closing the door, handle 267 is maintained in an upright vertical position until the opening edges of the door are in firm contact with upper and lower angle iron sections 19$^d$ and 10$^f$ and the vertical angle-iron section 15$^k$ after which the handle is moved counter-clockwise into the horizontal position indicated in Figures 15 and 16 wherein the edges of the door are firmly held against the door frame by the remote ends of vertical rods 263 and 264 moved by the cam action of the door handle into engaging relation with horizontal angle-iron sections 19$^d$ and 10$^f$ of the door frame.

Positioned adjacent the door handle and latch operating mechanism is an electric switch generally indicated at 270 preferably provided with a horizontal plunger 271 by which the switch is actuated, as will appear more fully hereinafter. One end of the plunger 271 is conveniently bent over as at 271$^a$ (see Figure 16) to ride on the surface of a cam 272, the position of which is preferably controlled by the door handle 267 being conveniently riveted to the rotatable horizontal portion of the door handle.

Switch 270 preferably includes the box-like metallic housing 273 conveniently provided with feet portions 273$^a$ and 273$^b$ (see Figure 15) by which the housing is mounted on the vertical angle iron section 15$^k$ and is fastened thereto by suitable screws.

A mercury tumbler switch 274, illustratively comprising an elongated glass envelope partially filled with mercury, and having two sealed-in electrodes 274$^a$ and 274$^b$ is tiltably mounted in a substantially horizontal position by a spring cradle 275 (see also Figure 17) pivotally mounted conveniently on an elongated screw 276 threadedly engaging the rear face of the housing; the cradle 275 is maintained in spaced relation to the rear face of the housing by suitable bushing 277. The position of mercury switch 274 is controlled by an extended arm portion 275$^a$ of the supporting cradle, the upper end of which is slotted as at 275$^b$ to receive a pin 278 (see also Figure 16) suitably fastened to plunger 271.

Plunger 271 is suitably supported in switch housing 273 so as to allow free movement in a direction along the length of the plunger and hence to assure a free and easy control of switch 274. A relatively stiff spring 279, one end of which abuts a wall of the switch housing, the other abutting a shoulder portion of plunger 271 urges the plunger toward the left as seen in Figure 15 and into intimate contact with the door handle controlled cam 272, thus urging the mercury switch 274 into a tilted or open-circuit position.

Excessive travel of plunger 271 under the influence of spring 279 is effectively prevented by a stop 280 received within a grooved portion 271$^b$ of the plunger and conveniently bolted to the rear face of switch housing 273, one end of which interrupts the expansion of spring 279 after sufficient movement has been allowed cradle arm 275$^a$ to bring the mercury switch into a circuit open position; further movement of the plunger 271 is prevented by a pin 281 coming into engagement with a side wall of the housing by which the plunger is partially supported. Stop 280 in addition to serving as a means for preventing excessive action of spring 279, aids in slidably supporting the plunger 271 in proper position to assure a free and positive control of the mercury switch.

Upon unlatching door 244 as by moving handle 267 clockwise into a vertical position, as more particularly set forth above, plunger 271 under the action of spring 279 moves toward the left following the surface of cam 272. In accordance with this motion the switch supporting cradle 275 and hence the supported mercury switch 274 are moved counter-clockwise about the pivotal support 276 bringing the switch into a tilted position allowing the mercury to flow into the lower end breaking contact between terminals 274$^a$ and 274$^b$; excessive travel of plunger 271 into a position where it would not be properly engaged by cam 272 latching the door in a closed position is effectively prevented in a manner more particularly set forth above.

As a safety measure, proper operation of mercury switch 274 and its associated control elements is preferably observed through a small window in the wall section 243 of the apparatus casing including a glass 282 received within a frame 283 conveniently fastened to the outer vertical wall section 243 by suitable screws, illustratively engaging the open edge of switch box 273.

Replacement of a defective mercury switch is quickly achieved by removing glass 282 and its mounting frame 283 permitting access to the interior of switch box 273 and after disconnecting conductors 284 and 285 from switch terminals 274$^a$ and 274$^b$, respectively, lifting mercury switch 274 out of its spring cradle 275, the arms of which (see Figure 17) are fashioned to hold it in a spring clip grasp. A substitute mercury switch is then placed into the supporting cradle connected to conductors 284 and 285 and then closed over and protected by the glass plate 282 and its mounting frame 283, all in a manner carried out in a substantially reverse order to that of the removal of the defective switch. To minimize the burning out of mercury switches, there is preferably included in series therewith a circuit interrupter, illustratively in the form of a fuse block 286 suitably mounted within the switch box 273 and preferably exposed to view through the glass window 282.

Included in the circuit of conductor 284 connected with switch terminal 274$^a$ is a fuse link 287 suitably supported and connected into conductor 284 by terminals 286$^a$ and 286$^b$. Likewise, included in conductor 285 connected with switch terminal 274$^b$ is a fuse link 288 similarly supported and connected into the conductor by terminals 286$^c$ and 286$^d$ mounted on fuse block 286. A blown-out fuse 287 (or 288) may be readily observed through the window 282 and after removal of the window, in a manner more particularly set forth above, the blown out fuse may be quickly replaced.

Thus, associated with the treating apparatus casing door 244, there is an electrical safety switch 270 which is maintained in a circuit closing position during such time as the door is closed and latched, and is in an open circuit position during such time as the door 244 is unlatched, improperly latched or in an open position. It will be understood in view of what has been said above that a similar electrical safety switch is associated with each of the remaining casing doors 242, 258 and 259 diagrammatically indicated at 289, 290 and 291 (see Figure 18).

Considering now the control of the various parts of the electrical treating or sterilizing apparatus by which there is obtained an ease and simplicity of control coupled with a safety of operation both to the operator and to the apparatus, attention is directed to Figure 18 wherein the entire electrical and mechanical operation of the apparatus is controlled by the, illustratively, four push button switch units diagrammatically indicated at 292, 293, 294 and 295 suitably mounted on the outside of the apparatus casing or housing at about the height of the operator's shoulder to permit quick and easy access thereto.

As mentioned above for reasons of simplicity and economy in construction, installation and operation of the apparatus, electrical energy for supplying the various parts of the apparatus is preferably taken from a single source of commercial alternating current, preferably three-phase 60 cycle at 220 volts diagrammatically indicated at 202 connected by way of the three-phase line conductors 296, 297 and 298, as will presently appear, to the push button controlled switches associated with the various parts of the apparatus to be energized.

The illustratively three-phase conveyor belt drive motor 42 and the blower drive motor 257 are preferably connected by way of the three-phase line conductors 299—300—301 and 302—303—304, respectively, and a common three-phase line 305—306—307 connected to one side of three of the four poles of the push button controlled switch diagrammatically indicated at 308, the other side being connected by way of conductors 309—310—311 to the three-phase line 296—297—298. Switch 308 is normally maintained in an open position in a manner not shown since the switch per se forms no part of the present invention, and it is preferably actuated to a circuit closing position upon energizing the actuating coil 308$^a$ controlled by the push button unit 292.

Upon depressing the start button 292$^r$ of the push button control unit, the energization circuit for switch actuating coil 308$^a$ is completed. This circuit may be traced as follows: From one phase of the three-phase source 202, by way of line conductor 296, conductor 309, conductor 312, stop and start push button contacts 292$^t$ and 292$^r$ of the push button control unit 292, and by way of conductor 314, conducting link 308$^b$ of the four pole switch, and conductor 311 and line conductor 298 back to the three-phase source 202.

Energization of the actuating coil 308$^a$ effects a closure of the four pole switch 308 whereby the three-phase conveyor drive motor 42 and blower motor 257 are directly connected to the three-phase source of supply 202 by way of the three-phase line conductors 296—297—298, conductors 309—310—311, switch 308, conductors 305—306—307 and by way of conductors 299—300—301 to the conveyor belt drive motor 42 (and by way of conductors 302—303—304 to the blower drive motor 257). These motors then drive the conveyor belt and blower, all as more particularly set forth above.

After switch 308 is closed and the conveyor and blower have been started up, the start button 292$^r$ is released, the circuit of the switch actuating coil 308$^a$ being then maintained from the stop control button 292$^t$ by way of conductor 315, switch 308, conducting switch link 308$^b$, conductor 311, and three-phase line conductor 292 back to the three-phase source 202. Thus, a mere depression of start button 292$^r$ of the push button control unit 292 starts up the conveyor and blower of the treating apparatus after which the start button may be released leaving these parts in the continuous run position and so permitting the operator to direct his attention elsewhere. Conveyor and blower may, however, be quickly stopped or shut-down by a mere depression of the stop button 292$^t$ of the push button control unit 292, thus interrupting the energization circuit of the switch actuating coil 308$^a$, de-energizing the coil, and allowing the switch to return to its normal open circuit position breaking the three-phase power circuit between the source 202 and conveyor and blower motors 42 and 257.

It is to be noted that de-energization of switch actuating coil 308$^a$, and consequent interruption of the flow of three-phase power to the conveyor and blower motors, is effected either when these motors are operating upon a depressed position of the start button 292$^r$ or a released position of this button since the stop control is located in the branch of the control circuit that is common to both the start and run branches of the control circuit thus assuring immediate shut-down of these parts of the apparatus irrespective of the stage operation of the push button control unit.

After shut-down of conveyor and blower motors by depressing stop button 292$^t$, as mentioned above, these motors are started up again in the manner indicated above, that is, by depressing and holding down start button 292$^r$ until switch 308 and motors 42 and 257 are started and then releasing for the run position.

In order to protect the conveyor and blower driving motors 42 and 257 against damage rising from excessive current flow under possible overload conditions resulting from, for example, possible catching or sticking of the conveyor belt or possible jamming of the blower, overload relays, illustratively two, 316 and 317 are connected with their actuating coils in series with conductors 306 and 307 respectively of the three-phase power supply circuit to the motors and with their circuit interrupting contacts in series and included in conductor 312 of the switch control circuit connected to switch actuating coil 308$^a$.

Upon the current in the motor supply lines rising to excessive values, either or both overload relays 316 and 317 are actuated to cause an interruption of the switch control circuit in conductor 312, thus de-energizing the switch actuating coil 308$^a$ and permitting the switch 308 to return to its normal circuit open position and interrupting the supply of energy to motors 42 and 257. After the faulty condition has been removed or repaired, the conveyor and blower may be restored to service upon starting the apparatus as above described.

Assuming now that the belt conveyor and the blower are being driven by their respective motors, all as more particularly described above, the conveyor belt induction heater, the exciting winding of which is diagrammatically indicated at 236, is next conveniently energized by depressing the start button 293$^r$ of the push button control unit 293 thus completing the energization circuit for the actuating coil 318$^a$ of the three pole switch 318, the circuit of which may be traced as follows: From the source of commercial three-phase supply 202 by way of line conductor 297, conductor 310, conveyor and blower switch 308, conductor 306, conductor 319, switch actuating coils 318$^a$, conductor 320, contacts of stop button 293$^t$, contacts of start button 293$^r$ and by way of conductor 321, switch link 318$^b$, conductor 322 to the conductor 298 of the three-phase line back to the source of supply 202.

Energization of the switch actuating coil 318ª brings the three pole switch 318 (normally in an open circuit position) into a closed circuit position, thus establishing a single phase power connection from the source 202, three-phase line conductor 297, conductor 323, switch 318, conductor 237 to the induction heater exciting winding 236 and by way of conductor 238, switch 318 conductor 322 and line conductor 298 back to the source of supply 202.

It may at this point be noted that actuation of heater switch 318 is dependent upon the switch control circuit being established through the conveyor and blower switch 308. Thus, in a simple and direct manner the operation of the conveyor belt heater is effectively prevented during such times when the conveyor is not in operation thus directly preventing local heating of the belt and its consequent scorching or burning. Furthermore, an opening of conveyor and blower motor switch 308, as illustratively described above, is accompanied by an interruption of the control circuit including the actuating coil 318ª of the heater switch 318 thus immediately permitting this switch to return to its normal open circuit position and so disconnect the conveyor belt induction heater exciting winding 236 from the source of supply 202.

Returning now to the more detailed discussion of the operation of the heater switch 318, after closing of the switch in the manner described above, start button 293ʳ is released thus breaking the start contacts of the push button control unit 293. Switch 318, however, remains in a closed circuit position due to the continued energization of the switch actuating coil 318ª, the energization circuit of which is maintained from this point beyond the contacts of stop button 293ᵗ by way of conductor 324, switch 318, switch link 318ᵇ and thence by way of conductor 322 and line conductor 298 back to the source of supply 202.

The conveyor belt heater may be stopped at any time, however, by merely depressing the stop button 293ᵗ of the push button control unit, thus interrupting the energization circuit of switch actuating coil 318ª (effective with the start button 293ʳ either in the depressed or released position since, as mentioned in connection with the discussion of the stop push button control of conveyor and blower motors, the stop button is in that part of the circuit common to both the start and run branches) and permitting heater switch 318 to return to its normal open-circuit position totally disconnecting the heater from the source of supply energy.

Damage to the conveyor belt induction heater winding 236 as a result of overload or excessive currents in the winding is effectively prevented by, illustratively, two overload relays 325 and 326, the actuating coils of which are included in the power conductors 237 and 238, respectively (included in the circuit between heater winding 236 and the source of supply 202, as more particularly described above), and the circuit interrupting contacts of which are serially connected and included in conductor 319 forming a part of the energization circuit of switch actuating coil 318ª, all as more particularly set forth above.

As the current in the power circuit for the heater winding rises to excessive values, one or both of the overload relays 325 and 326 are actuated, interrupting the energization circuit for the switch actuating coil 318ª and so permitting the heater switch 318 to return to its normal open-circuit position, thus effectively disconnecting the conveyor belt heater winding from the source of supply. Energization of the heater winding after its has been disconnected from the source of supply is achieved in a manner more particularly set forth above, that is, by depressing the start button 293ʳ of the push button control unit 293 and releasing it only after the switch 318 has been brought into a closed circuit position.

Next, conveniently, in starting up the electrical treating or sterilizing apparatus, electrical energy is supplied the driving motors associated with electrodes 91 and 92 by way of circuits more particularly described above including the insulating transformer 192 and its outside terminals 186 and 187 connected by way of suitable circuits, as will presently appear, to one phase of the three-phase source of electrical energy 202. Energization of the drive motors associated with electrodes 91 and 92 is preferably push button controlled by the push button unit 294. The drive motors are started by depressing the start button 294ʳ of the push button control unit thus completing the energization circuit of a switch actuating coil 327ª which may be traced from the source of commercial supply 202, by way of conductor 297 of the three-phase line, conductors 328 and 329 to the switch actuating coil 327ª and by way of conductor 330, stop and start contacts of push buttons 294ᵗ and 294ʳ of the push button control unit and by way of conductor 331, conducting switch link 327ᵇ, conductor 332, conductor 296 of the three-phase line back to the source of supply 202.

Energization of the switch actuating coil 327ª brings switch 327 (normally maintained in an open circuit position, as described above in considering switches 308 and 318) into a closed circuit position, thus completing the power circuit between the commercial source of supply 202 and the insulating transformer terminals 186 and 187 connected, as more particularly described above, with the driving motors associated with electrodes 91 and 92.

Connections are established between the source of supply and the transformer terminals connected to the electrode driving motors by way of conductor 297 of the three-phase power supply line, conductor 328, switch 327, conductor 333 to the transformer terminal 187, thence in a manner more particularly described above, by way of insulating transformer 192 to the driving motors associated with electrodes 91 and 92 and back to transformer terminal 186 connected by way of conductor 334, switch 327, conductor 332, and three-phase line conductor 296 back to the source of supply 202.

After starting the electrode drive motors as above described, start button 294ʳ of the push button control unit is released, switch 327 being maintained in a closed-circuit position by switch actuating coil 327ª, the energization circuit of which is completed from the contacts of stop button 294ᵗ, by way of conductor 335, switch 327, conducting switch link 327ᵇ, and thence by way of conductor 332 and three-phase line conductor 296 back to the commercial source of supply 202. The electrode motors may be stopped at any time by depressing the stop button 294ᵗ thus interrupting the energization circuit of the switch actuating coil 327ª allowing switch 327 to return to its normal open-circuit position and completely disconnecting the driving motors associated with electrodes 91 and 92 and the source of supply.

Excessive load current in the driving motor windings and in the insulating transformer included in the driving motor circuit due, for example, to the catching or binding of the rotating electrodes, is effectively prevented by the inclusion of overload relays, illustratively two, 336 and 337 in the supply circuit to the electrode motors, the actuating coils of which are respectively included in the lower line conductors 333 and 334 and the circuit interrupting contacts of which are serially connected and included in conductor 329 of the energization circuit for switch actuating coil 327$^a$.

Upon the current within power conductors 333 and 334 supplying the electrode driving motors with electrical energy reaching predetermined or excessive values, overload relays 336 and 337 are actuated to interrupt the energization circuit of switch actuating coil 327$^a$ thus de-energizing the switch actuating coil and permitting switch 327 to return to its normal open circuit position and so completely disconnecting the electrode driving motors from the source of commercial supply.

In starting the electrical treating apparatus, in order to place it in condition for a thorough treatment or sterilization of food or other products to completely and dependably free them from contaminating inset life, the establishing and maintaining of the electrodes at a high electrical potential is conveniently brought about as a final step.

As more particularly described above, high potential electrical energy is supplied the electrodes by the high potential transformer generally indicated at 182 which is supplied with electrical energy at the relatively high frequency of 750 cycles per second, at approximately 550 volts by a motor-generator set generally indicated at 203, the motor 207 of which preferably of the three-phase induction type is conveniently supplied with electrical energy from the commercial source of supply 202, the manner of which will now be considered.

In order to prevent the application of high electrical potential to the electrodes at a time when an operator is working on the apparatus, as for example, making changes or adjustments of various parts in which case one or more of the doors (by which access is had to the interior of the apparatus casing) is in an open position, an electric safety switch is associated with each of these doors, all as more particularly described above, effectively preventing the operation of the motor-generator set or the application of high potential electrical energy to the electrodes during such time as any door is open. Thus, before the motor-generator set 203 may be started up, and before high potential electrical energy may be supplied the rotating electrodes 91 and 92, all of the illustratively four doors 242, 244, 258 and 259 of the apparatus housing must be securely closed and latched, and so closing safety switches 289, 270, 290 and 291 respectively associated with these doors, all as more particularly set forth above.

Motor-generator set 207 may now be started up and high potential electrical energy supplied electrodes 91 and 92 by depressing start button 295$^r$ of the push button control unit 295 which completes the energization circuit for the actuating coil 338$^a$ of the motor-generator set and high potential disconnecting switch 338, the energization circuit of which may be traced as follows: From the source of commercial supply 202, by way of line conductor 298, conductor 339, door switch 291, conductor 340, door switch 290, conductor 341, door switch 289, conductor 285, door switch 270, conductor 284, switch actuating coil 338$^a$, conductor 342, contacts of stop button 295$^t$ and start button 295$^r$ of the push button control unit 295, and by way of conductor 343, conducting switch link 338$^b$ and line conductor 296 back to the source of supply 202.

Switch 338 is normally maintained in an open-circuit position (conveniently by mechanical means not shown; the switch per se forms no part of the present invention) and upon energization of the switch actuating coil 338$^a$ being achieved, the switch is then moved into a closed circuit position thus completing the power supply line to the motor-generator set (from the source of three-phase electrical energy 202 by way of the three-phase line 296—297—298, switch 338, three-phase line 344—345—346 to the terminal board 207$^a$ of the three-phase induction motor 207 driving the motor-generator set 203) and the high frequency supply circuit to high potential transformer 182 (by completing the circuit of conductor 213), all as more particularly described above.

After the motor-generator set is started up, start button 295$^r$ is released, motor-generator set switch 338 remaining, however, in a closed circuit position due to the continued energization of switch actuating coil 338$^a$, the circuit energization of which is now completed from the contacts of stop button 295$^t$ of the push button control unit 295, by way of conductor 347, switch 338, conducting switch link 338$^b$ and three-phase line conductor 296 back to the source of supply energy.

The high frequency electrical energy supplied transformer 182 and the continued operation of motor-generator set 203, may be immediately interrupted by depressing the stop button 295$^t$ of the push button control unit 295, thus breaking the energization circuit (between conductors 342 and 343 for the depressed position of the start button 295$^r$ and between conductors 343 and 347 for the released or run position of the start button) of the switch actuating coil 338$^a$ thus permitting switch 338 to return to its normal open-circuit position and so interrupting the three-phase power circuit to the motor-generator set and the high frequency supply circuit (by breaking conductor 213) from the motor-generator set to the high potential transformer.

It may at this point be noted that the actuation of switch 338 into the open-circuit position immediately disconnects high potential transformer 182 from its source of supply (the motor-generator set 203), and so cuts off the supply of high potential high frequency electrical energy to the rotating electrodes of the apparatus thus permitting immediate access to the electrodes or their high voltage circuits; due to such factors as the inertia of the rotating parts of the motor-generator set, the residual magnetism of the set generator and that of the set exciter, the generator output potential is not reduced to zero until the elapse of an appreciable time after the depression of the stop button 295$^t$ and the opening of switch 338, and the continued supply of this potential to the high potential transformer, and the consequent application of high potential to the electrodes, would render dangerous the adjustment or repair of the apparatus for a considerable time after the apparatus is actually shut-down.

Should a workman attempt to adjust or repair the apparatus inside the casing without first having cut off the high potential supply circuit, the first step, that of unlatching and opening one of the doors in order to gain access to the interior of the casing, interrupts the energization circuit of the switch actuating coil 338ᵃ at the safety switch associated with the particular door opened, thus permitting switch 338 to return to its normal open-circuit position and so, immediately disconnecting the high potential transformer from its source of supply and shutting down the motor-generator set, all as more particularly described above. These safety features are particularly important where electrical energy at dangerously high potentials is used and where the apparatus is often operated by unskilled persons. Damage to the high potential power apparatus including high potential transformer 182 and the motor-generator set 203 as a result of extreme conditions causing excessively high currents in the power supply line to the motor-generator set, is effectively prevented by the inclusion of, illustratively, two overload relays 348 and 349 in the switch circuit with their respective actuating coils included illustratively, in power line conductors 344 and 346, and with their circuit interrupting conductors serially included in conductor 284 of the energization circuit of switch actuating coil 338ᵃ.

Upon the current rising in the power line conductors to predetermined dangerous or excessive values, one or both of the relays 348 and 349 are actuated to interrupt the energization circuit of the switch actuating coil 338ᵃ, thus permitting the switch 338 to return to its normal open-circuit position and so disconnecting the high potential transformer from its supply generator, and shutting down the motor-generator set.

After the power apparatus is disconnected and shut-down it is again put into operation in a manner more particularly described above in connection with the initial starting of the power apparatus.

With the motor-generator set 203 started and connections established between the motor-generator set and the high potential transformer 182, the high potential applied to the rotating electrodes 91 and 92 of the sterilizing apparatus is set to a proper or desired value by suitably adjusting the generator field rheostat 208 and observing the applied potential at volt meter 226, all as more particularly set forth above.

While for illustrative purposes the various electrical units of the sterilizing apparatus have been started up in a certain sequence of operation, it is to be understood that (except for the preferred starting of the conveyor belt drive motor prior to the energization of the conveyor belt heater for the reasons above given) this is purely by way of illustration and that any convenient sequence may be resorted to.

It will thus be seen that there has been provided an art and apparatus in which the various objects hereinbefore set forth, together with many thoroughly practical advantages, are successfully achieved.

As many possible embodiments may be made of the mechanical features of the above invention, and as the art herein described might be varied in various parts, all without departing from the scope of the invention, it is to be understood that all matter hereinabove set forth or shown in the accompanying drawings, is to be interpreted as illustrative and not in a limiting sense.

I claim:

1. In electrical sterilizing apparatus, in combination, a conveyor, and a high voltage circuit including a source, a pair of rotating electrodes coaxially spaced on opposite sides of said conveyor, and an air condenser capable of withstanding the potential of said circuit without breakdown.

2. In electrical sterilizing apparatus, in combination, a conveyor, a high voltage circuit including a source, a rotating electrode so spaced from said conveyor as to rotate in a plane substantially parallel therewith, and a second electrode comprising a plurality of electronic conduction tubes positioned on the opposite side of said conveyor substantially coaxially with said first mentioned electrode, and means forming an electrical capacity of a value incapable of breakdown at the potentials effective in said circuit.

3. In electrical sterilizing apparatus, in combination, a rotatable high potential electrode means comprising a plurality of downwardly extending discharge portions adapted, upon rotation, to define substantially a single plane, a second rotatable electrode means comprising a plurality of electronic conduction devices, the ends of which are adapted, upon rotation, to define substantially a single plane parallel to said first mentioned plane, means mounting said two electrode means to rotate about substantially the same axis, and a conveyor adapted to pass between said electrodes.

4. In electrical sterilizing apparatus, in combination, means forming a high potential circuit including a high voltage source and spaced electrode means between which electric discharge takes place, a conveyor belt passing between said electrode means for carrying products to be treated into the discharge, and means for preventing moisture from being retained by said belt.

5. In electrical sterilizing apparatus, in combination, means forming a high potential circuit including a high voltage source and spaced electrode means between which electric discharge takes place, a conveyor belt passing between said electrode means for carrying products to be treated into the discharge, a metal member having a relatively large surface into contact with which said belt passes, and means for heating said metal member.

6. In electrical sterilizing apparatus, in combination, means forming a high potential circuit including a high voltage source and spaced electrode means between which electric discharge takes place, a conveyor belt passing between said electrode means for carrying products to be treated into the discharge, a metal member having a relatively large surface into contact with which said belt passes, and means subjecting said metal member to varying magnetic flux whereby eddy currents and hysteresis losses are produced in said metal member to heat the latter.

7. In electrical sterilizing apparatus, in combination, means forming a high potential circuit including a high voltage source and spaced electrode means between which electric discharge takes place, a pair of drums over which said belt passes, one of said drums having a metallic cylindrical portion directly contacting said belt, and means for heating said metallic cylindrical portion.

8. In electrical sterilizing apparatus, in combination, means forming a high potential circuit including a high voltage source and spaced electrode means between which electric discharge takes place, a pair of drums over which said belt passes, one of said drums having a metallic cylindrical portion directly contacting said belt, and means for producing a varying magnetic field that is cut by said cylindrical metallic member as the latter rotates whereby eddy currents and hysteresis losses therein produce heat to dry said belt.

9. In electrical sterilizing apparatus, in combination, a high voltage transformer having a downwardly extending high voltage terminal; capacity-forming means connected to the high voltage side of said transformer and including electrode means from which discharge can take place and means onto which said discharge impinges; a frame for supporting said transformer, and means for insulating one of said means from said frame and including a solid dielectric member in the form of a large diametered tube surrounding said terminal and having portions of its side walls cut away in such a manner that the shortest leakage path along said insulating means is greater than the shortest straight-line distance between said frame and the means supported by said insulating means.

10. In electrical sterilizing apparatus, in combination, a high voltage transformer having a downwardly extending high voltage terminal; capacity-forming means connected to the high voltage side of said transformer and including electrode means from which discharge can take place and means onto which said discharge impinges; a frame for supporting said transformer, said electrode means comprising a plurality of electrode structures; and means for insulatingly supporting said electrode structures from said frame comprising a ring-shaped member of insulating material of relatively large diameter positioned substantially co-axially with said high voltage terminal and having said electrode structures spaced thereabout, said ring-shaped member having insulating struts extending to said frame, each strut being shaped to have a length longer than the shortest straight-line distance between said ring-shaped member and the point of attachment of said struts to said frame.

11. In electrical sterilizing apparatus, in combination, a high voltage transformer having a downwardly extending high voltage terminal; capacity-forming means connected to the high voltage side of said transformer and including electrode means from which discharge can take place and means onto which said discharge impinges; a frame for supporting said transformer, said electrode means comprising a plurality of electrode structures; means for insulatingly supporting said electrode structures from said frame comprising a ring-shaped member of insulating material of relatively large diameter positioned substantially co-axially with said high voltage terminal and having said electrode structures spaced thereabout, and means securing said ring-shaped member to said frame.

12. In electrical sterilizing apparatus, in combination, a high voltage transformer having a downwardly extending high voltage terminal; capacity-forming means connected to the high voltage side of said transformer and including electrode means from which discharge can take place and means onto which said discharge impinges; a frame for supporting said transformer, said electrode means comprising a plurality of electrode structures; and means for insulatingly supporting said electrode structures from said frame comprising a ring-shaped member of insulating material of relatively large diameter positioned substantially co-axially with said high voltage terminal and having said electrode structures spaced thereabout, said ring-shaped member forming part of a tubular member whose upper portions are secured to said frame and whose intervening portions are cut away so that the shortest leakage path from said electrode structures to the points of attachment of said upper portions to said frame is longer than the shortest straight-line distance therebetween.

13. In electrical sterilizing apparatus, in combination, a source of high potential; capacity-forming means connected thereto and including a plurality of electrode structures from which discharge can take place and means onto which said discharge impinges; means for passing a product to be treated into the region of said discharge; and means for insulatingly supporting said electrode structures spaced along the path of movement of said product-passing means, said supporting means including a substantially ring-shaped member of insulating material at spaced points in the periphery of which said electrode structures are positioned.

14. In electrical sterilizing apparatus, in combination, a source of high potential; means forming an electric circuit therefor including electrode means, electronic conduction means spaced therefrom, and a metal plate-like member supporting said conduction means at those portions thereof remote from said electrode means, and a plate-like member spaced from said first mentioned plate-like member and adapted to form therewith a capacity; and means for passing a product to be treated through the space between said electrode means and said electronic conduction means, the capacity between said two plate members being sufficient to prevent complete breakdown in said circuit while permitting local rupture through the product.

15. In electrical sterilizing apparatus, in combination, a source of high potential; means forming an electric circuit therefor including electrode means, electronic conduction means spaced therefrom, and a metal plate-like member supporting said conduction means at those portions thereof remote from said electrode means, and a plate-like member spaced from said first mentioned plate-like member and adapted to form therewith a capacity, said electrode means including a plurality of discharge points distributed throughout a substantial area; means rotatably mounting said first plate-like member; means for rotating said first plate-like member to bodily move said conduction means; and means for passing a product to be sterilized betwen said discharge points and said conduction means, the spacing between the latter with the product therebetween being such that local rupture through the product takes place, and the capacity between said two plate-like members being sufficiently great to prevent complete breakdown in said circuit.

16. In electrical sterilizing apparatus, in combination, a source of high potential; means forming an electric circuit therefor including electrode means, electronic conduction means spaced therefrom, and a metal plate-like member supporting said conduction means at those portions thereof remote from said electrode means, and a plate-like member spaced from said first-mentioned plate-like member and adapted to form therewith a capacity, said electrode means comprising a rotatable discharge point spaced from its axis of rotation; means for rotating said discharge point; means mounting said first mentioned plate member for rotation, said electronic conduction means being spaced from the axis of rotation by a distance commensurate with the spacing of said electrode point from its axis of rotation; means for rotating said first mentioned plate-like member; and means for passing a product to be sterilized through the space between said discharge point and said conduction means, the spacing therebetween being small enough to effect local rupture through the product, and the capacity between said two plate-like members being sufficiently large to prevent complete breakdown in said circuit.

17. In electrical sterilizing apparatus, in combination, a source of high potential; means forming an electric circuit therefor including electrode means, electronic conduction means spaced therefrom, and a metal plate-like member supporting said conduction means at those portions thereof remote from said electrode means, and a plate-like member spaced from said first-mentioned plate-like member and adapted to form therewith a capacity, said electrode means comprising two discharge points mounted for rotation about a given axis but spaced from said axis by radii of different lengths; means for rotating said discharge points; said electronic conduction means including a tube of a width substantially equal to the difference between said radii; means rotatably mounting said first plate-like member, said conduction means being spaced from the axis of rotation by a distance substantially the mean of said radii; means for passing a product to be treated through the space between said discharge points and said conduction means, the spacing being sufficiently small to cause local rupture through the product, the capacity between said two plate-like members being sufficiently large to prevent complete breakdown in said circuit.

18. An apparatus according to claim 17 in which the electronic conduction tube, with its under facing between said discharge points, is shaped so that the column of conductive medium therein presents a concaved face toward said discharge points.

19. In electrical sterilizing apparatus, in combination, a source of high potential; a housing having an inlet opening and an outlet opening; a conveyor means for transporting a product to be sterilized from the inlet opening to the outlet opening; disruptive conduction apparatus within said housing and related to said conveyor means to subject the product thereon to high potential electric discharges and connected in circuit with said high potential source; and means for conducting out of and away from said housing gases that result from the operation of said disruptive discharge apparatus.

20. In electrical sterilizing apparatus, in combination, a source of high potential; a housing having an inlet opening and an outlet opening; a conveyor means for transporting a product to be sterilized from the inlet opening to the outlet opening; disruptive conduction apparatus within said housing and related to said conveyor means to subject the product thereon to high potential electric discharges and connected in circuit with said high potential source; a door in said housing for giving access to the apparatus therein; and means controlled by said door for removing the high potential from said apparatus when the door is opened.

21. In electrical sterilizing apparatus, in combination, means forming a high potential circuit including a high voltage source and spaced electrode means between which electric discharge takes place, a conveyor belt for carrying products to be treated into the region affected by said discharge, means for driving said conveyor belt, means for heating said conveyor belt to prevent moisture from being retained thereby, and means whereby said heating means is dependent upon the operation of said belt-driving means thereby to prevent heating of said belt when stationary.

22. In electrical sterilizing apparatus, in combination, means forming a high potential circuit including a high voltage source and spaced electrode means between which electric discharge takes place, a conveyor belt for carrying products to be treated into the region affected by said discharge, an electric motor for driving said belt, a power circuit for furnishing energy to said motor, and means dependent upon the condition of said power circuit for heating said belt, thereby to prevent heating of said belt while stationary.

23. In electrical sterilizing apparatus, in combination, means forming a high potential circuit including a high voltage source and spaced electrode means between which electric discharge takes place, a conveyor belt for carrying products to be treated into the region affected by said discharge, means for driving said conveyor belt, electro-responsive means for heating said belt at a certain point in its travel, and means whereby said electro-responsive heating means is dependent upon the operation of said belt-driving means.

24. An apparatus according to claim 5 in which there is means for driving the conveyor belt, and means responsive to stopping of the drive of the conveyor belt by said driving means for stopping the heating of the metal member.

25. In electrical sterilizing apparatus, in combination, means forming a high potential circuit including a high voltage source and spaced electrode means between which electric discharge takes place, a conveyor belt for carrying products to be treated into the region affected by said discharge, an electric motor for driving said belt, a power circuit for said motor, electroresponsive means operative at a certain point in the path of travel of said belt for heating the belt, and means controlled by said power circuit for permitting operation of said electro-responsive means only when said power circuit is operative.

26. In electrical sterilizing apparatus, in combination, means forming a high potential circuit including a high voltage source and spaced electrode means between which electric discharge takes place, a conveyor belt for carrying products to be treated into the region affected by said discharge, a source of power, means supplied with energy from said source of power for driving said conveyor belt, a metal member having a relatively large surface into contact with which said belt passes, and means affected by the energy supplied from said source of power to said belt-driving means for heating said metal member.

27. In electrical sterilizing apparatus, in combination, means forming a high potential circuit including a high voltage source and spaced electrode means between which electric discharge takes place, a conveyor belt for carrying products to be treated into the region affected by said discharge, a source of power, means supplied with energy from said source of power for driving said conveyor belt, a metal member having a relatively large surface into contact with which said belt passes, an electric heater for said metal member, and means whereby the energy flowing to said electric heater is controlled by the energy supplied from said source of power to said belt-driving means.

28. In electrical sterilizing apparatus, in combination, means forming a high potential circuit including a high voltage source and spaced electrode means between which electric discharge takes place, one of said electrode means comprising a rotary member having thereon and rotated thereby an electronic conduction device, and means forming an electrical capacity of a value incapable of breakdown at the potentials effective in said circuit; means for rotating said member; and means for bringing a product to be treated into the electric discharge between said electrode means.

29. In electrical sterilizing apparatus, in combination, a conveyor belt; a high voltage circuit having included therein a source of high voltage, a pair of spaced electrode means, one above and the other below said belt, whereby products carried by said belt are brought into the space between said electrode means, and plate means extending with its plane substantially at right angles to the plane of said belt and spaced from one of said electrode means sufficiently to form an air condenser capable of withstanding the potential of said circuit without breakdown while permitting local rupture between said spaced electrode means; and means for driving said belt.

30. In electrical sterilizing apparatus, in combination, a conveyor belt; a high voltage circuit having included therein a source of high voltage, a pair of spaced electrode means, one above and the other below said belt, whereby products carried by said belt are brought into the space between said electrode means, and two plate means, one on each side of said conveyor belt and each extending with its plane substantially vertical, said plate means being respectively spaced from one of said electrode means by a distance sufficiently great to form therebetween air condensers capable of withstanding the potential of said circuit without breakdown while permitting local rupture between said electrode means; and means for driving said belt.

31. In electrical sterilizing apparatus, in combination, a conveyor, a plurality of discharge electrodes spaced above said conveyor and lengthwise thereof, a plurality of electrode means underneath said conveyor and spaced lengthwise thereof, each electrode means comprising a rotary member carrying an electronic conduction device, the effective portion of which, when said member is rotated, moves in a plane substantially parallel to the plane of said conveyor, means for rotating the members of said electrode means, and means including a source of relatively high potential for effecting disruptive conduction from said discharge electrodes to said electrode means.

32. In electrical sterilizing apparatus, in combination, a conveyor, a plurality of discharge electrodes spaced above said conveyor and lengthwise thereof, a plurality of electrode means underneath said conveyor and spaced lengthwise thereof, each electrode means comprising a rotary member carrying an electronic conduction device, the effective portion of which, when said member is rotated, moves in a plane substantially parallel to the plane of said conveyor, means for rotating the members of said electrode means in opposite directions relative to one another, and means including a source of relatively high potential for effecting disruptive conduction between said discharge electrodes and said rotating electrode means.

33. In electrical sterilizing apparatus, in combination, means forming a high potential circuit including a high voltage source and spaced electrode means between which electric discharge takes place, each of said electrode means comprising a rotary member carrying an electrode device, and means forming an electrical capacity of a value incapable of breakdown at the potentials effective in said circuit while permitting local rupture to take place between said electrode devices; means for rotating said rotary members thereby to cause said electrode devices each to describe a circle; and means for bringing a product to be treated into the electric discharge between said electrode devices.

34. In electrical sterilizing apparatus, in combination, means forming a high potential circuit including a high voltage source and spaced electrode means between which electric discharge takes place, each of said electrode means comprising a rotary member carrying an electrode device, and means forming an electrical capacity of a value incapable of breakdown at the potentials effective in said circuit while permitting local rupture to take place between said electrode devices; means for driving one of said rotary members at a relatively high speed, thereby to cause its electrode device to move at relatively high linear speed throughout a circular path; means for driving the other rotary member at a relatively low speed, thereby to cause its electrode device to move at relatively low linear speed throughout a circular path, and means for bringing a product to be treated into the electric discharge between said electrode devices.

35. In electrical sterilizing apparatus, in combination, means forming a high potential circuit having included therein a high potential source and spaced electrode means between which electric discharge takes place, one of said electrode means comprising a rotary member having thereon a plurality of discharge electrodes spaced from the axis of rotation of said rotary member by radii of different lengths, and means forming an electrical capacity of a value incapable of breakdown at the potentials effective in said circuit while permitting discharge between said electrode means; means for rotating said member; and means for bringing a product to be treated into the electric discharge between said rotating discharge electrodes and the other of said electrode means.

36. In electrical sterilizing apparatus, in combination, means forming a high potential circuit having included therein a high potential source and spaced electrode means between whch electric discharge takes place, one of said electrode means comprising a rotary member having thereon a plurality of discharge electrodes spaced from the axis of rotation of said rotary member by radii of different lengths, and the other of said electrode means having an effective discharge-receiving means for coaction with the substantially annular area defined by said discharge electrodes when rotated by said rotary member, and means forming an electrical capacity of a value incapable of breakdown at the potentials effective in said circuit while permitting discharge between said rotating discharge electrodes and said discharge-receiving means; means for rotating said member; and means for bringing a product to be treated into said electric discharge.

37. In electrical sterilizing apparatus, in combination, means forming a high potential circuit having included therein a high potential source and spaced electrode means between which electric discharge takes place, one of said electrode means comprising a rotary member having thereon a plurality of discharge electrodes spaced from the axis of rotation of said rotary member by radii of different lengths, and the other of said electrode means comprising a rotary member having thereon an electronic conduction device for coaction with said discharge electrodes, and means forming an electrical capacity of a value incapable of breakdown at the potentials effective in said circuit while permitting local discharge to take place between said discharge electrodes and said device; means for rotating said rotary members and means for bringing a product to be treated into the electric discharge between said rotating discharge electrodes and said rotating conduction device.

38. In electrical sterilizing apparatus, in combination, means forming a high potential circuit having included therein a high potential source and spaced electrode means between which electric discharge takes place, one of said electrode means comprising a rotary member having thereon a plurality of discharge electrodes spaced from the axis of rotation of said rotary member by radii of different lengths, and the other of said electrode means comprising a rotary member having thereon an electronic conduction device for coaction with said discharge electrodes, and means forming an electrical capacity of a value incapable of breakdown at the potentials effective in said circuit while permitting local discharge to take place between said discharge electrodes and said device means for driving said first-mentioned rotary member at a relatively high speed; means for driving said second-mentioned rotary member at a relatively low speed; and means for bringing a product to be treated into said electric discharge.

39. In electrical sterilizing apparatus, in combination, means forming a high potential circuit having included therein a high potential source and spaced electrode means between which electric discharge takes place, one of said electrode means comprising a rotary member having thereon a plurality of discharge electrodes spaced from the axis of rotation of said rotary member by radii of different lengths, and the other of said electrode means comprising a rotary member having thereon a plurality of electronic conduction tubes; means for driving said first-mentioned rotary member at a relatively high speed; means for driving said second-mentioned rotary member at a relatively low speed; and means for bringing a product to be treated into the electric discharge between said rotating discharge electrodes and said rotating conduction devices.

40. In electrical sterilizing apparatus, in combination, means forming a high potential circuit having included therein a high potential source and spaced electrode means between which electric discharge takes place, one of said electrode means comprising a rotary member having thereon a discharge electrode, said rotary member with said discharge electrode being maintained at high potential; means for bringing a product to be treated into the electric discharge between said electrode means; an alternating current motor for driving said rotary member, said motor being at substantially the same potential as said rotary member; a source of alternating current; and means for insulating the circuit of said motor comprising a transformer interposed between said source of alternating current and said motor, said transformer being insulated for substantially said high potential.

41. In electrical sterilizing apparatus, in combination, means forming a high potential circuit having included therein a high potential source and spaced electrode means between which electric discharge takes place, one of said electrode means comprising a rotary member having thereon a discharge electrode, said rotary member with said discharge electrode being maintained at high potential; means for bringing a product to be treated into the electric discharge between said electrode means; an alternating current motor for driving said rotary member, said motor being at substantially the same potential as said rotary member; means for physically insulating said motor and said rotary member for said high potential comprising an insulating support for said motor constructed to withstand said high potential; and means for insulating the circuit of said motor comprising a transformer interposed between said motor and its source of alternating current energy, said transformer being internally insulated for substantially said high potential.

42. In electrical sterilizing apparatus, in combination, means forming a high potential circuit including a high potential source and spaced electrode means between which discharge takes place, and means for holding a product to be treated in the region affected by said discharge; one of said electrode means comprising a plurality of electronic conduction devices, a rotatable carrier for holding said devices, a source of driving power, and a driving connection between the latter and said carrier, said driving connection including means for insulating the source of driving power from said electronic conduction devices.

43. In electrical sterilizing apparatus, in combination, means forming a high potential circuit including a high potential source and spaced electrode means between which discharge takes place, and means for holding a product to be treated in the region affected by said discharge; one of said electrode means comprising a plurality of electronic conduction devices, a rotatable carrier for holding said devices, a source of driving power, and a belt of non-conductive material for driving said carrier from said source of power and for substantially insulating one from the other.

44. In electrical sterilizing apparatus, in combination, means forming a high potential circuit including a high potential source and spaced electrode means between which discharge takes place, and means for holding a product to be treated in the region affected by said discharge; one of said electrode means comprising a plurality of electronic conduction devices, a rotatable carrier, means for detachably supporting said devices in said carrier, and means for rotating said carrier.

FRANKLIN S. SMITH.